US012591062B2

(12) United States Patent
Park

(10) Patent No.: US 12,591,062 B2
(45) Date of Patent: Mar. 31, 2026

(54) LiDAR DEVICE

(71) Applicant: SOS LAB Co., Ltd., Gwangju (KR)

(72) Inventor: Sang Woo Park, Seoul (KR)

(73) Assignee: SOS LAB Co., Ltd., Gwangju (KR)

( * ) Notice: Subject to any disclaimer, the term of this patent is extended or adjusted under 35 U.S.C. 154(b) by 1174 days.

(21) Appl. No.: 17/497,328

(22) Filed: Oct. 8, 2021

(65) Prior Publication Data

US 2022/0146682 A1 May 12, 2022

(30) Foreign Application Priority Data

Nov. 12, 2020 (KR) ......................... 10-2020-0151370
Nov. 12, 2020 (KR) ......................... 10-2020-0151371

(51) Int. Cl.
| | |
|---|---|
| *G01S 17/894* | (2020.01) |
| *G01S 7/481* | (2006.01) |
| *G01S 7/4863* | (2020.01) |
| *G01S 7/4865* | (2020.01) |
| *G01S 17/10* | (2020.01) |

(52) U.S. Cl.
CPC .......... *G01S 17/894* (2020.01); *G01S 7/4816* (2013.01); *G01S 7/4863* (2013.01); *G01S 17/10* (2013.01); *G01S 7/4865* (2013.01)

(58) Field of Classification Search
CPC ....... G01S 17/894; G01S 17/10; G01S 7/4865
See application file for complete search history.

(56) References Cited

U.S. PATENT DOCUMENTS

| | | | | |
|---|---|---|---|---|
| 3,916,371 | A * | 10/1975 | Broding ................... | G01V 1/22 367/78 |
| 10,317,529 | B2 | 6/2019 | Shu et al. | |
| 11,204,425 | B2 * | 12/2021 | Mano ...................... | G01S 17/89 |

(Continued)

FOREIGN PATENT DOCUMENTS

| | | |
|---|---|---|
| JP | 2019-078602 A | 5/2019 |
| JP | 2020-153797 A | 9/2020 |

(Continued)

OTHER PUBLICATIONS

JP 2019078602 A English (Year: 2019).*

(Continued)

*Primary Examiner* — Yuqing Xiao
*Assistant Examiner* — Jempson Noel
(74) *Attorney, Agent, or Firm* — Knobbe, Martens, Olson & Bear, LLP

(57) ABSTRACT

A LiDAR device for determining a distance information of an object, the LiDAR device comprising: a laser emitting unit configured to emit a laser aperiodically at a controlled emitting time; a detecting unit configured to detect a laser which is emitted from the laser emitting unit and reflected by the object aperiodically during at a controlled detecting window, and to generate detecting signals; and a processor configured to control the laser emitting unit to emit at least a first laser at a first emitting time, a second laser at a second emitting time and a third laser at a third emitting time. A first time gap between the first emitting time and the second emitting time is different from a second time gap between the second emitting time and the third emitting time.

18 Claims, 52 Drawing Sheets

(56)               References Cited

U.S. PATENT DOCUMENTS

| | | | |
|---|---|---|---|
| 2010/0045965 A1* | 2/2010 | Meneely | G01S 17/10 |
| | | | 356/5.01 |
| 2015/0131080 A1* | 5/2015 | Retterath | G01S 7/4815 |
| | | | 356/5.01 |
| 2016/0139243 A1 | 5/2016 | Send et al. | |
| 2016/0274589 A1* | 9/2016 | Templeton | G01S 17/86 |
| 2018/0156907 A1* | 6/2018 | Cegla | G01S 15/105 |
| 2018/0259645 A1* | 9/2018 | Shu | G01S 7/497 |
| 2018/0299554 A1* | 10/2018 | Van Dyck | G01S 17/894 |
| 2018/0329061 A1 | 11/2018 | Pacala et al. | |
| 2019/0250257 A1 | 8/2019 | Finkelstein et al. | |
| 2020/0300984 A1 | 9/2020 | Matsuura et al. | |
| 2021/0181316 A1* | 6/2021 | Zhu | G01S 17/894 |
| 2023/0204735 A1* | 6/2023 | Lei | G01S 17/08 |
| | | | 356/5.1 |

FOREIGN PATENT DOCUMENTS

| | | |
|---|---|---|
| KR | 10-2011-0114795 A | 10/2011 |
| KR | 10-2019-0131050 A | 11/2019 |

OTHER PUBLICATIONS

PCT International Search Report and Written Opinion, PCT Application No. PCT/KR2020/018091, Aug. 6, 2021, 15 pages.
Korean Office Action, KR Application No. 10-2020-0151370, dated Feb. 27, 2024.
Korean Office Action, KR Application No. 10-2020-0151371, dated Feb. 27, 2024.

\* cited by examiner

DETERMINING A LASER EMITTING TIME POINT ⟋ S5110

GENERATING A HISTOGRAM DATA BASED
ON THE RESULT OF THE DETECTING A PHOTON ⟋ S5120

DETERMINING A DETECTING PARAMETER
BASED ON THE HISTOGRAM DATA ⟋ S5130

DETERMINING A CHARACTERISTIC OF THE OBJECT BASED
ON THE HISTOGRAM DATA ANT THE DETECTING PARAMETER ⟋ S5140

(a)                                        (b)

LiDAR DEVICE

CROSS-REFERENCE TO RELATED APPLICATIONS

This application claims priority to and the benefit of Korean Patent Application No. 10-2020-0151371, filed on Nov. 12, 2020 and Korean Patent Application No. 10-2020-0151370, filed on Nov. 12, 2020 the disclosure of which are incorporated herein by reference in their entirety.

TECHNICAL FIELD

The present disclosure relates to a light detection and ranging (LiDAR) device, and more specifically, to a device which measures a distance by minimizing interference due to disturbances and a device which measures a distance in each region by varying a detecting parameter according to an environment for each region.

BACKGROUND

Recently, with interest in an autonomous automobile and a driverless automobile, light detection and ranging (LiDAR) is in the spotlight. The LiDAR is a device that acquires surrounding distance information using laser, and is applied not only to an automobile, but also to various fields such as a drone, an aircraft, and the like due to an advantage in that precision and resolution are excellent and an object can be grasped in three dimensions.

Meanwhile, a problem of reducing interference by other lasers other than a LiDAR device is becoming an issue. Since the problem of reducing interference is related to accurate distance measurement, a distance can be distorted by lasers other than LiDAR devices. Accordingly, for accurate distance measurement, it is important to minimize interference due to disturbances.

SUMMARY OF THE INVENTION

The present disclosure relates to a laser emission timing of a laser emitting unit for minimizing interference due to disturbances.

The present disclosure relates to a device which increases the accuracy of distance measurement in each region by varying a detecting parameter according to an environment for each region.

According to an embodiment, a LiDAR device for determining a distance information of an object, the LiDAR device comprising: a laser emitting unit configured to emit a laser aperiodically at a controlled emitting time; a detecting unit configured to detect a laser which is emitted from the laser emitting unit and reflected by the object aperiodically during at a controlled detecting window, and to generate detecting signals; and a processor configured to: control the laser emitting unit to emit at least a first laser at a first emitting time, a second laser at a second emitting time and a third laser at a third emitting time, wherein a first time gap between the first emitting time and the second emitting time is different from a second time gap between the second emitting time and the third emitting time, control the detecting unit to: detect a first set of photons during a first detecting time window and generate a first set of signals, detect a second set of photons during a second detecting time window and generate a second set of signals, and detect a third set of photons during a third detecting time window and generate a third set of signals, wherein a start time of the first detecting time window is synchronized with the first emitting time such that a time gap between the start time of the first detecting time and the first emitting time has a predetermined value, wherein a start time of the second detecting time window is synchronized with the second emitting time such that a time gap between the start time of the second detecting time and the second emitting time has the predetermined value, and wherein a start time of the third detecting time window is synchronized with the third emitting time such that a time gap between the start time of the third detecting time and the third emitting time has the predetermined value; and determine the distance information of the object based on at least the first set of signals, the second set of signals and the third set of signals.

Solutions of the present disclosure are not limited to the above-mentioned solutions, and solutions that have not been mentioned will be clearly understood by those skilled in the art from the following description and the accompanying drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 27 is a diagram for describing an optic unit according to one embodiment;

FIG. 36 is a diagram for describing a configuration of the semi-flash LiDAR according to one embodiment;

DETAILED DESCRIPTION OF EXEMPLARY EMBODIMENTS

Figure 1:
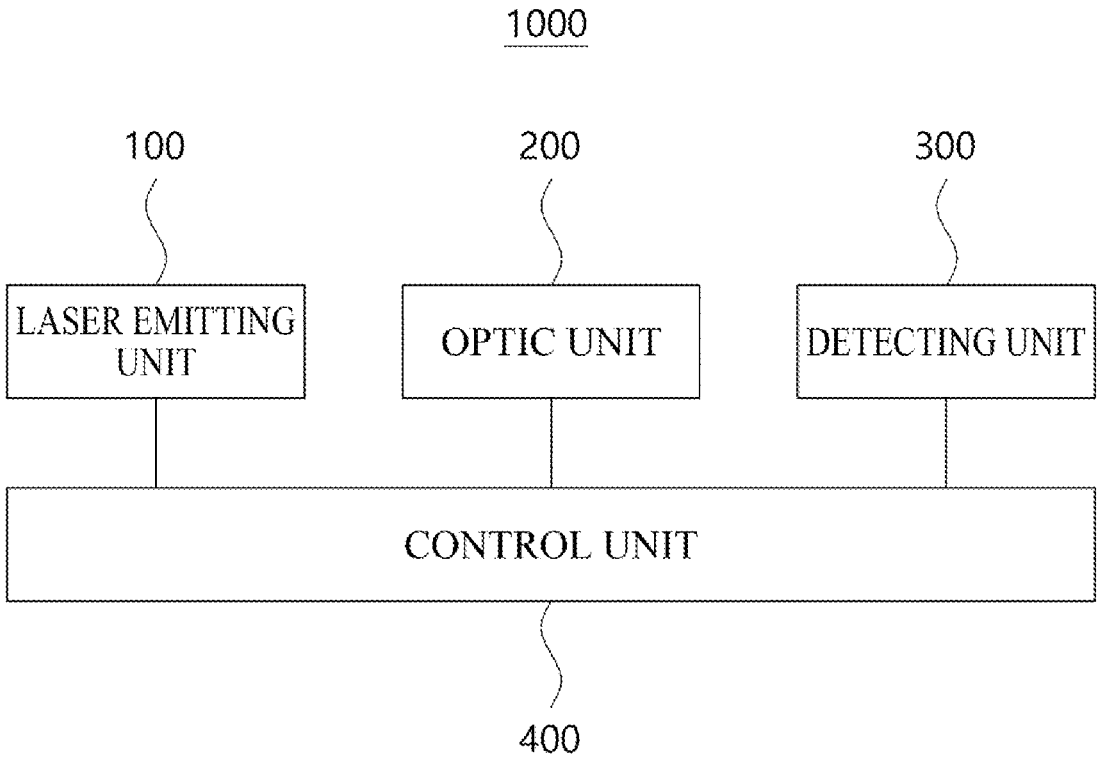
FIG. 1 is a diagram for describing a light detection and ranging (LiDAR) device according to one embodiment.

Embodiments described in this specification are intended to clearly explain the spirit of the invention to those skilled in the art. Therefore, the present disclosure is not limited by the embodiments, and the scope of the present disclosure should be interpreted as encompassing modifications and variations without departing from the spirit of the invention.

Terms used in this specification are selected from among general terms, which are currently widely used, in consideration of functions in the present disclosure and may have meanings varying depending on intentions of those skilled in the art, customs in the field of art, the emergence of new technologies, or the like. If a specific term is used with a specific meaning, the meaning of the term will be described specifically. Accordingly, the terms used in this specification should not be defined as simple names of the components but be defined based on the actual meaning of the terms and the whole context throughout the present specification.

The accompanying drawings are to facilitate the explanation of the present disclosure, and the shape in the drawings may be exaggerated for the purpose of convenience of explanation, so the present disclosure should not be limited by the drawings.

When it is determined that detailed descriptions of well-known elements or functions related to the present disclosure may obscure the subject matter of the present disclosure, detailed descriptions thereof will be omitted herein as necessary.

According to an embodiment, a LiDAR device for determining a distance information of an object, the LiDAR device comprising: a laser emitting unit configured to emit a laser aperiodically at a controlled emitting time; a detecting unit configured to detect a laser which is emitted from the laser emitting unit and reflected by the object aperiodically during at a controlled detecting window, and to generate detecting signals; and a processor configured to: control the laser emitting unit to emit at least a first laser at a first emitting time, a second laser at a second emitting time and a third laser at a third emitting time, wherein a first time gap between the first emitting time and the second emitting time is different from a second time gap between the second emitting time and the third emitting time, control the detecting unit to: detect a first set of photons during a first detecting time window and generate a first set of signals, detect a second set of photons during a second detecting time window and generate a second set of signals, and detect a third set of photons during a third detecting time window and generate a third set of signals, wherein a start time of the first detecting time window is synchronized with the first emitting time such that a time gap between the start time of the first detecting time and the first emitting time has a predetermined value, wherein a start time of the second detecting time window is synchronized with the second emitting time such that a time gap between the start time of the second detecting time and the second emitting time has the predetermined value, and wherein a start time of the third detecting time window is synchronized with the third emitting time such that a time gap between the start time of the third detecting time and the third emitting time has the predetermined value; and determine the distance information of the object based on at least the first set of signals, the second set of signals and the third set of signals.

Here, the processor is configured to control the laser emitting unit to emit the first laser, the second laser, and the third laser consecutively.

Here, the processor is configured to control the laser emitting unit not to emit a laser during a period between the first emitting time and the second emitting time, and not to emit a laser during a period between the second emitting time and the third emitting time.

Here, at least one of the first set of photons, the second set of photons and the third set of photons includes a photon derived from the laser emitting unit and a photon derived from another device.

Here, the start time of the first detecting time window is apart from the first emitting time by the predetermined value, wherein the start time of the second detecting time window is apart from the second emitting time by the predetermined value, and wherein the start time of the third detecting time window is apart from the third emitting time by the predetermined value.

Here, the start time of the first detecting time window is later than the first emitting time by the predetermined value, wherein the start time of the second detecting time window is later than the second emitting time by the predetermined value, and wherein the start time of the third detecting time window is later than the third emitting time by the predetermined value.

Here, the predetermined value is 0, and whereby the start time of the first detecting time window is same as the first emitting time, the start time of the second detecting time window is same as the second emitting time, and the start time of the third detecting time window is same as the third emitting time. Here, the processor is configured to transmit trigger signals to the laser emitting unit to operate the laser emitting unit.

Here, the processor is configured to generate the trigger signals at equal time intervals, and provide a jitter to each of the trigger signals to delay a time each of the trigger signals is received by the laser emitting unit and whereby the first time gap between the first emitting time and the second emitting time is different from the second time gap between the second emitting time and the third emitting time.

Here, the processor is further configured to generate a histogram data based on at least the first set of signals, the second set of signals and the third set of signals, and wherein the distance information of the object is determined based on the histogram.

Here, the laser emitting unit includes a VCSEL, and wherein the detecting unit includes a SPAD.

Hereinafter, a LiDAR device of the present disclosure will be described.

A LiDAR device is a device for detecting a distance to an object and the location of an object using a laser. For example, a LiDAR device may emit a laser beam. When the emitted laser beam is reflected by an object, the LiDAR device may receive the reflected laser beam and measure a distance between the object and the LiDAR device and the location of the object. In this case, the distance from the object and the location of the object may be expressed in a coordination system. For example, the distance from the object and the location of the object may be expressed in a spherical coordinate system $(r, \theta, \varphi)$. However, the present disclosure is not limited thereto, and the distance and location may be expressed in a Cartesian coordinate system $(X, Y, Z)$ or a cylindrical coordinate system $(r, \theta, z)$.

Also, the LiDAR device may use laser beams output from the LiDAR device and reflected by an object in order to measure a distance from the object.

The LiDAR device according to an embodiment may use a time of flight (TOF) of a laser beam, which is the time taken by a laser beam to be detected after being emitted, in order to measure the distance from the object. For example, the LiDAR device may measure the distance from the object using a difference between a time value based on an emitting time of an emitted laser beam and a time value based on a detection time of a detected laser beam reflected by the object.

Also, the LiDAR device may measure the distance from the object using a difference between a time value at which an emitted laser beam is detected immediately without reaching an object and a time value based on a detection time of a detected laser beam reflected by the object.

There may be a difference between a time point at which the LiDAR device transmits a trigger signal for emitting a laser beam using a control unit and an actual emission time point, which is a time when the laser beam is actually emitted from a laser beam output element. Actually, no laser beam is emitted in a period between the time point of the trigger signal and the actual emission time point. Thus, when the period is included in the ToF of the laser beam, precision may be decreased.

The actual emission time point of the laser beam may be used to improve the precision of the measurement of the TOF of the laser beam. However, it may be difficult to determine the actual emission time point of the laser beam. Therefore, a laser beam should be directly delivered to a detecting unit as soon as or immediately after the laser beam is emitted from the laser emitting element without reaching the object.

For example, an optic may be disposed on an upper portion of the laser emitting element, and thus the optic may enable a laser beam emitted from the laser emitting element to be detected by a detecting unit immediately without reaching an object. The optic may be a mirror, a lens, a prism, a metasurface, or the like, but the present disclosure is not limited thereto. The optic may include one optic or a plurality of optics.

Also, for example, a detecting unit may be disposed on an upper portion of the laser emitting element, and thus a laser beam emitted from the laser emitting element may be detected by the detecting unit immediately without reaching an object. The detecting unit may be spaced a distance of 1 mm, 1 μm, 1 nm, or the like from the laser emitting element, but the present disclosure is not limited thereto. Alternatively, the detecting unit may be adjacent to the laser emitting element with no interval there between. An optic may be present between the detecting unit and the laser emitting element, but the present disclosure is not limited thereto.

Also, the LiDAR device according to an embodiment may use a triangulation method, an interferometry method, a phase shift measurement, and the like rather than the TOF method to measure a distance to an object, but the present disclosure is not limited thereto.

A LiDAR device according to an embodiment may be installed in a vehicle. For example, the LiDAR device may be installed on a vehicle's roof, hood, headlamp, bumper, or the like.

Also, a plurality of LiDAR devices according to an embodiment may be installed in a vehicle. For example, when two LiDAR devices are installed on a vehicle's roof, one LiDAR device is for monitoring an area in front of the vehicle, and the other one is for monitoring an area behind the vehicle, but the present disclosure is not limited thereto. Also, for example, when two LiDAR devices are installed on a vehicle's roof, one LiDAR device is for monitoring an area to the left of the vehicle, and the other one is for monitoring an area to the right of the vehicle, but the present disclosure is not limited thereto.

Also, the LiDAR device according to an embodiment may be installed in a vehicle. For example, when the LiDAR device is installed in a vehicle, the LiDAR device is for recognizing a driver's gesture while driving, but the present disclosure is not limited thereto. Also, for example, when the LiDAR device is installed inside or outside a vehicle, the LiDAR device is for recognizing a driver's face, but the present disclosure is not limited thereto.

A LiDAR device according to an embodiment may be installed in an unmanned aerial vehicle. For example, the LiDAR device may be installed in an unmanned aerial vehicle (UAV) System, a drone, a remotely piloted vehicle (RPV), an unmanned aircraft system (UAS), a remotely piloted air/aerial vehicle (RPAV), a remotely piloted aircraft system (RPAS), or the like.

Also, a plurality of LiDAR devices according to an embodiment may be installed in an unmanned aerial vehicle. For example, when two LiDAR devices are installed in an unmanned aerial vehicle, one LiDAR device is for monitoring an area in front of the unmanned aerial vehicle, and the other one is for monitoring an area behind the unmanned aerial vehicle, but the present disclosure is not limited thereto. Also, for example, when two LiDAR devices are installed in an unmanned aerial vehicle, one LiDAR device is for monitoring an area to the left of the aerial vehicle, and the other one is for monitoring an area to the right of the aerial vehicle, but the present disclosure is not limited thereto.

A LiDAR device according to an embodiment may be installed in a robot. For example, the LiDAR device may be installed in a personal robot, a professional robot, a public service robot, or other industrial robots or manufacturing robots.

Also, a plurality of LiDAR devices according to an embodiment may be installed in a robot. For example, when two LiDAR devices are installed in a robot, one LiDAR device is for monitoring an area in front of the robot, and the other one is for monitoring an area behind the robot, but the present disclosure is not limited thereto. Also, for example, when two LiDAR devices are installed in a robot, one LiDAR device is for monitoring an area to the left of the robot, and the other one is for monitoring an area to the right of the robot, but the present disclosure is not limited thereto.

Also, a LiDAR device according to an embodiment may be installed in a robot. For example, when the LiDAR device is installed in a robot, the LiDAR device is for recognizing a human face, but the present disclosure is not limited thereto.

Also, a LiDAR device according to an embodiment may be installed for industrial security. For example, the LiDAR device may be installed in a smart factory for the purpose of industrial security.

Also, a plurality of LiDAR devices according to an embodiment may be installed in a smart factory for the purpose of industrial security. For example, when two LiDAR devices are installed in a smart factory, one LiDAR device is for monitoring an area in front of the smart factory, and the other one is for monitoring an area behind the smart factory, but the present disclosure is not limited thereto. Also, for example, when two LiDAR devices are installed in a smart factory, one LiDAR device is for monitoring an area to the left of the smart factory, and the other one is for monitoring an area to the right of the smart factory, but the present disclosure is not limited thereto.

Also, a LiDAR device according to an embodiment may be installed for industrial security. For example, when the LiDAR device is installed for industrial security, the LiDAR device is for recognizing a human face, but the present disclosure is not limited thereto.

Various embodiments of elements of the LiDAR device will be described in detail below.

FIG. 1 is a diagram illustrating a LiDAR device according to an embodiment.

Referring to FIG. 1, a LiDAR device 1000 according to an embodiment may include a laser emitting unit 100.

In this case, the laser emitting unit 100 according to an embodiment may emit a laser beam.

Also, the laser emitting unit 100 may include one or more laser emitting elements. For example, the laser emitting unit 100 may include a single laser emitting element and may include a plurality of laser emitting elements. Also, when the laser emitting unit 100 includes a plurality of laser emitting elements, the plurality of laser emitting elements may constitute one array.

Also, the laser emitting unit 100 may include a laser diode (LD), a solid-state laser, a high power laser, a light-emitting diode (LED), a vertical-cavity surface-emitting laser (VC-SEL), an external cavity diode laser (ECDL), and the like, but the present disclosure is not limited thereto.

Also, the laser emitting unit 100 may output a laser beam of a certain wavelength. For example, the laser emitting unit 100 may output a laser beam with a wavelength of 905 nm or a laser beam with a wavelength of 1550 nm. Also, for example, the laser emitting unit 100 may output a laser beam with a wavelength of 940 nm. Also, for example, the laser emitting unit 100 may output a laser beam with a plurality of wavelengths ranging between 800 nm and 1000 nm. Also, when the laser emitting unit 100 includes a plurality of laser emitting elements, some of the plurality of laser emitting elements may output a laser beam with a wavelength of 905 nm, and the others may output a laser beam with a wavelength of 1500 nm.

Referring to FIG. 1 again, the LiDAR device 1000 according to an embodiment may include an optic unit 200.

Herein, the optic unit may be variously expressed as a steering unit, a scanning unit, etc., but the present disclosure is not limited thereto.

In this case, the optic unit 200 according to an embodiment may change a flight path of a laser beam. For example, the optic unit 200 may change a flight path of a laser beam such that a laser beam emitted from the laser emitting unit 100 is directed to a scanning region. Also, for example, the optic unit 200 may change a flight path of laser beam such that a laser beam reflected by an object located in the scanning region is directed to a detecting unit.

In this case, the optic unit 200 according to an embodiment may change a flight path of laser beam by reflecting a laser beam. For example, the optic unit 200 may change flight path of a laser beam by reflecting a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to reflect laser beams. For example, the optic unit 200 may include a mirror, a resonance scanner, a micro-electromechanical system (MEMS) mirror, a voice coil motor (VCM), a polygonal mirror, a rotating mirror, or a galvano mirror, and the like, but the present disclosure is not limited thereto.

Also, the optic unit 200 according to an embodiment may change a flight path of laser beam by refracting laser beams. For example, the optic unit 200 may change a flight path of laser beam by refracting a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to refract laser beams. For example, the optic unit 200 may include lenses, prisms, microlenses, or microfluidic lenses, but the present disclosure is not limited thereto.

Also, the optic unit 200 according to an embodiment may change a flight path of laser beam by changing the phase of a laser beam. For example, the optic unit 200 may change a flight path of laser beam by changing the phase of a laser beam emitted from the laser emitting unit 100 such that the laser beam is directed to the scanning region. Also, for example, the optic unit 200 may change a flight path of laser beam such that a laser beam reflected by an object located in the scanning region is directed to the detecting unit.

Also, the optic unit 200 according to an embodiment may include various optic means to change the phase of a laser beam. For example, the optic unit 200 may include an optical phased array (OPA), a metalens, a metasurface, or the like, but the present disclosure is not limited thereto.

Also, the optic unit 200 according to an embodiment may include one or more optic means. Also, for example, the optic unit 200 may include a plurality of optic means.

Referring to FIG. 1 again, the LiDAR device 1000 according to an embodiment may include a detecting unit 300.

Herein, the detecting unit may be variously expressed as a light receiving unit, a sensor unit, etc., but the present disclosure is not limited thereto.

In this case, the detecting unit 300 according to an embodiment may detect laser beams. For example, the detecting unit may detect a laser beam reflected by an object located in the scanning region.

Also, the detecting unit 300 according to an embodiment may receive a laser beam and generate an electric signal based on the received laser beam. For example, the detecting unit 300 may detect a laser beam reflected by an object located in the scanning region and generate an electric signal based on the received laser beam. Also, for example, the detecting unit 300 may receive a laser beam reflected by an object located in the scanning region through one or more optical means and generate an electric signal based on the received laser beam. Also, for example, the detecting unit

300 may receive a laser beam reflected by an object located in the scanning region through an optical filter and generate an electric signal based on the received laser beam.

Also, the detecting unit 300 according to an embodiment may detect the laser beam based on the generated electric signal. For example, the detecting unit 300 may detect the laser beam by comparing the magnitude of the generated electric signal to a predetermined threshold, but the present disclosure is not limited thereto. Also, for example, the detecting unit 300 may detect the laser beam by comparing the rising edge, falling edge, or the median of the rising edge and the falling edge of the generated electric signal to a predetermined threshold, but the present disclosure is not limited thereto. Also, for example, the detecting unit 300 may detect the laser beam by comparing the peak value of the generated electric signal to a predetermined threshold, but the present disclosure is not limited thereto.

Also, the detecting unit 300 according to an embodiment may include various detecting elements. For example, the detecting unit 300 may include a PN photodiode, a phototransistor, a PIN photodiode, an avalanche photodiode (APD), a single-photon avalanche diode (SPAD), silicon photomultipliers (SiPM), a time-to-digital converter (TDC), a comparator, a complementary metal-oxide-semiconductor (CMOS), a charge-coupled device (CCD), or the like, but the present disclosure is not limited thereto.

For example, the detecting unit 300 may be a two-dimensional (2D) SPAD array, but the present disclosure is not limited thereto. Also, for example, the SPAD array may include a plurality of SPAD units, and each SPAD unit may include a plurality of SPAD pixels.

In this case, the detecting unit 300 may generate a histogram by accumulating a plurality of data sets based on output signals of the detecting elements N times using the 2D SPAD array. For example, the detecting unit 300 may use the histogram to detect a reception time point of a laser beam that is reflected by an object and received.

For example, the detecting unit 300 may use the histogram to determine the peak time point of the histogram as the reception time point at which the laser beam reflected by the object is received, but the present disclosure is not limited thereto. Also, for example, the detecting unit 300 may use the histogram to determine a time point at which the histogram is greater than or equal to a predetermined value as the reception time point at which the laser beam reflected by the object is received, but the present disclosure is not limited thereto.

Also, the detecting unit 300 according to an embodiment may include one or more detecting elements. For example, the detecting unit 300 may include a single detecting element and may also include a plurality of detecting elements.

Also, the detecting unit 300 according to an embodiment may include one or more optical elements. For example, the detecting unit 300 may include an aperture, a microlens, a converging lens, a diffuser, or the like, but the present disclosure is not limited thereto.

Also, the detecting unit 300 according to an embodiment may include one or more optical filters. The detecting unit 300 may detect a laser beam reflected by an object through an optical filter. For example, the detecting unit 300 may include a band-pass filter, a dichroic filter, a guided-mode resonance filter, a polarizer, a wedge filter, or the like, but the present disclosure is not limited thereto.

Referring to FIG. 1 again, the LiDAR device 1000 according to an embodiment may include a processor 400.

Herein, the processor may be variously expressed as a processor or the like, but the present disclosure is not limited thereto.

In this case, the processor 400 according to an embodiment may control the operation of the laser emitting unit 100, the optic unit 200, or the detecting unit 300.

Also, the processor 400 according to an embodiment may control the operation of the laser emitting unit 100.

For example, the processor 400 may control an emission time point of a laser emitting from the laser emitting unit 100. Also, the processor 400 may control the power of the laser emitting from the laser emitting unit 100. Also, the processor 400 may control the pulse width of the laser emitting from the laser emitting unit 100. Also, the processor 400 may control the cycle of the laser emitting from the laser emitting unit 100. Also, when the laser emitting unit 100 includes a plurality of laser emitting elements, the processor 400 may control the laser emitting unit 100 to operate some of the plurality of laser emitting elements.

Also, the processor 400 according to an embodiment may control the operation of the optic unit 200.

For example, the processor 400 may control the operating speed of the optic unit 200. In detail, the optic unit 200 may control the rotational speed of a rotating mirror when including the rotating mirror and may control the repetition cycle of a MEMS mirror when including the MEMS mirror, but the present disclosure is not limited thereto.

Also, for example, the processor 400 may control the operation status of the optic unit 200. In detail, the optic unit 200 may control the operation angle of a MEMS mirror when including the MEMS mirror, but the present disclosure is not limited thereto.

Also, the processor 400 according to an embodiment may control the operation of the detecting unit 300.

For example, the processor 400 may control the sensitivity of the detecting unit 300. In detail, the processor 400 may control the sensitivity of the detecting unit 300 by adjusting a predetermined threshold, but the present disclosure is not limited thereto.

Also, for example, the processor 400 may control the operation of the detecting unit 300. In detail, the processor 400 may control the turn-on and -off of the detecting unit 300, and when including a plurality of detecting elements, the processor 400 may control the operation of the detecting unit 300 to operate some of the plurality of detecting elements.

Also, the processor 400 according to an embodiment may determine a distance from the LiDAR device 1000 to an object located in a scanning region based on a laser beam detected by the detecting unit 300.

For example, the processor 400 may determine the distance to the object located in the scanning region based on a time point at which the laser beam is emitted from the laser emitting unit 100 and a time point at which the laser beam is detected by the detecting unit 300. Also, for example, the processor 400 may determine the distance to the object located in the scanning region based on a time point at which a laser beam emitted from the laser beam is detected by the detecting unit 300 immediately without reaching the object and a time point at which a laser beam reflected by the object is sensed by the detecting unit 300.

There may be a difference between a time point at which the LiDAR device 1000 transmits a trigger signal for emitting a laser beam using a processor 400 and an actual emission time point, which is a time when the laser beam is actually emitted from a laser emitting element. Actually, no laser beam is emitted in a period between the time point of the trigger signal and the actual emission time point. Thus, when the period is included in the ToF of the laser beam, precision may be decreased.

The actual emission time point of the laser beam may be used to improve the precision of the measurement of the TOF of the laser beam. However, it may be difficult to determine the actual emission time point of the laser beam. Therefore, a laser beam should be detected to the detecting unit 300 as soon as or immediately after the laser beam is emitted from a laser emitting element without reaching an object.

For example, an optic may be disposed on an upper portion of the laser emitting element, and thus the optic may enable a laser beam emitted from the laser emitting element to be detected by the detecting unit 300 directly without reaching an object. The optic may be a mirror, a lens, a prism, a metasurface, or the like, but the present disclosure is not limited thereto. The optic may include one optic or a plurality of optics.

Also, for example, the detecting unit 300 may be disposed on an upper portion of the laser emitting element, and thus a laser beam emitted from the laser emitting element may be detected by the detecting unit 300 directly without reaching an object. The detecting unit 300 may be spaced a distance of 1 mm, 1 μm, 1 nm, or the like from the laser emitting element, but the present disclosure is not limited thereto. Alternatively, the detecting unit 300 may be adjacent to the laser emitting element with no interval therebetween. An optic may be present between the detecting unit 300 and the laser emitting element, but the present disclosure is not limited thereto.

In detail, the laser emitting unit 100 may emit a laser beam, and the processor 400 may acquire a time point at which the laser beam is emitted from the laser emitting unit 100. When the laser beam emitted from the laser emitting unit 100 is reflected by an object located in the scanning region, the detecting unit 300 may detect a laser beam reflected by the object, and the processor 400 may acquire a time point at which the laser beam is detected by the detecting unit 300 and may determine a distance to the object located in the scan region based on the emission time point and the detection time point of the laser beam.

Also, in detail, the laser beam may be emitted from the laser emitting unit 100, and the laser beam emitted from the laser emitting unit 100 may be detected by the detecting unit 300 directly without reaching the object located in the scanning region. In this case, the processor 400 may acquire a time point at which the laser beam is detected without reaching the object. When the laser beam emitted from the laser emitting unit 100 is reflected by the object located in the scanning region, the detecting unit 300 may detect the laser beam reflected by the object, and the processor 400 may acquire the time point at which the laser beam is detected by the detecting unit 300. In this case, the processor 400 may determine the distance to the object located in the scanning region based on the detection time point of the laser beam that does not reach the object and the detection time point of the laser beam that is reflected by the object.

Figure 2:
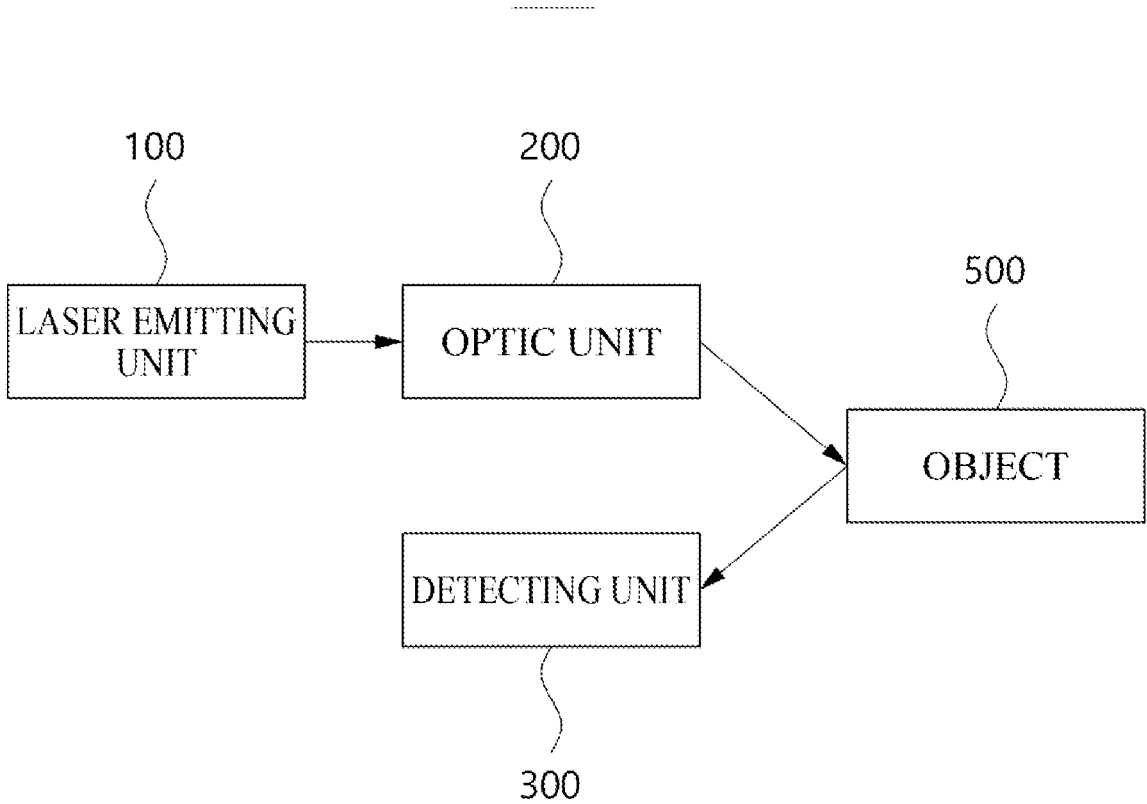
FIG. 2 is a diagram illustrating a LiDAR device according to one embodiment.

FIG. 2 is a diagram showing a LiDAR device according to an embodiment.

Referring to FIG. 2, a LiDAR device 1100 according to an embodiment may include a laser emitting unit 100, an optic unit 200, and a detecting unit 300.

The laser emitting unit 100, the optic unit 200, and the detecting unit 300 have been described with reference to FIG. 1, and thus a detailed description thereof will be omitted.

A laser beam emitted from the laser emitting unit 100 may pass through the optic unit 200. In addition, the laser beam passing through the optic unit 200 may be irradiated toward an object 500. Further, the laser beam reflected from the object 500 may be received by the detecting unit 300.

Figure 3:
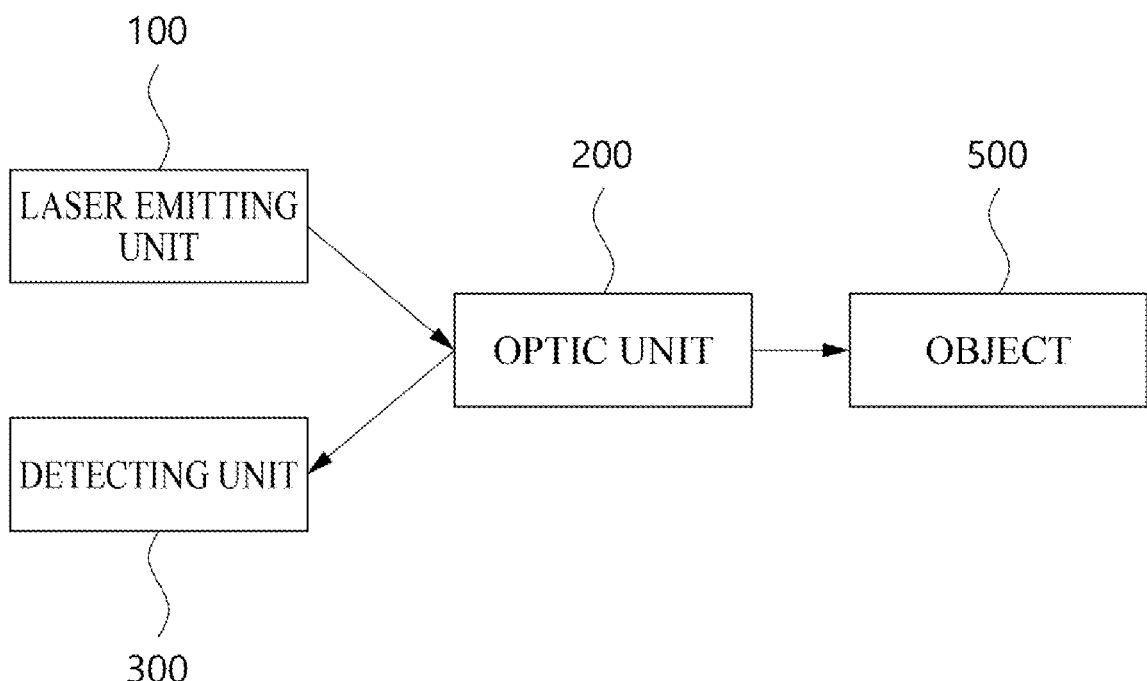
FIG. 3 is a diagram illustrating a LiDAR device according to another embodiment.

FIG. 3 is a diagram illustrating a LiDAR device according to another embodiment.

Referring to FIG. 3, a LiDAR device 1150 according to another embodiment may include a laser emitting unit 100, an optic unit 200, and a detecting unit 300.

The laser emitting unit 100, the optic unit 200, and the detecting unit 300 have been described with reference to FIG. 1, and thus detailed descriptions thereof will be omitted.

A laser beam emitted from the laser emitting unit 100 may pass through the optic unit 200. In addition, the laser beam passing through the optic unit 200 may be irradiated toward an object 500. In addition, the laser beam reflected from object 500 may pass through the optic unit 200 again.

At this point, the optic unit, through which the laser beam before being irradiated to the object has passed, and the optic unit, through which the laser beam that is reflected from the object has passed, may be physically the same optic unit, but may be physically different optic units.

The laser beam passing through the optic unit 200 may be received by the detecting unit 300.

Hereinafter, various embodiments of a laser emitting unit including a vertical-cavity-surface-emitting laser (VCSEL) will be described in detail.

Figure 4:
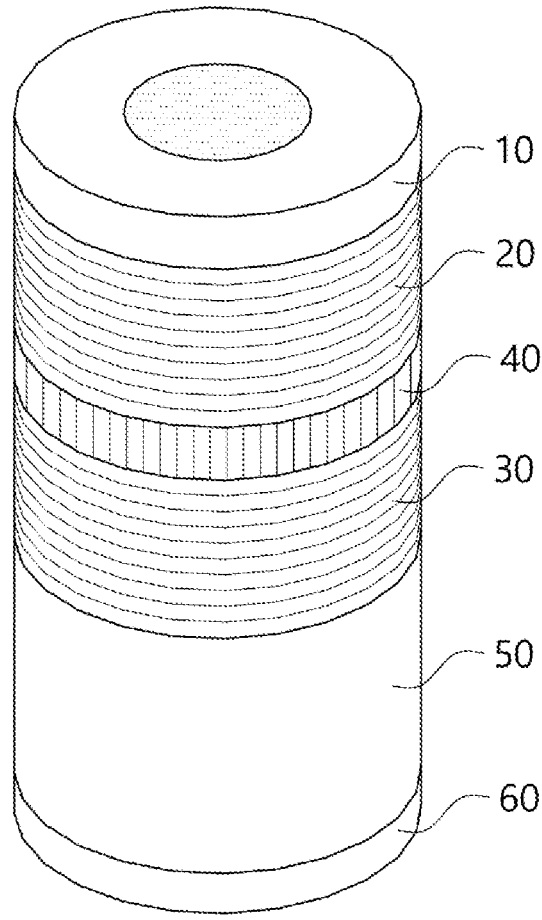
FIG. 4 is a diagram illustrating a laser emitting unit according to one embodiment.

FIG. 4 is a diagram showing a laser beam output unit according to an embodiment.

Referring to FIG. 4, a laser emitting unit 100 according to an embodiment may include a VCSEL emitter 110.

The VCSEL emitter 110 according to an embodiment may include an upper metal contact 10, an upper distributed Bragg reflector (DBR) layer 20, an active layer 40 (quantum well), a lower DBR layer 30, a substrate 50, and a lower metal contact 60.

Also, the VCSEL emitter 110 according to an embodiment may emit a laser beam perpendicularly to an upper surface. For example, the VCSEL emitter 110 may emit a laser beam perpendicularly to the surface of the upper metal contact 10. Also, for example, the VCSEL emitter 110 may emit a laser beam perpendicularly to the active layer 40.

The VCSEL emitter 110 according to an embodiment may include the upper DBR layer 20 and the lower DBR layer 30.

The upper DBR layer 20 and the lower DBR layer 30 according to an embodiment may include a plurality of reflective layers. For example, the plurality of reflective layers may be arranged such that a reflective layer with high reflectance alternates with a reflective layer with low reflectance. In this case, the thickness of the plurality of reflective layers may be a quarter of the wavelength of the laser beam emitted from the VCSEL emitter 110.

Also, the upper DBR layer 20 and the lower DBR layer 30 according to an embodiment may be doped in n-type or p-type. For example, the upper DBR layer 20 may be doped in p-type, and the lower DBR layer 30 may be doped in n-type. Alternatively, for example, the upper DBR layer 20 may be doped in n-type, and the lower DBR layer 30 may be doped in p-type.

Also, according to an embodiment, the substrate 50 may be disposed between the lower DBR layer 30 and the lower metal contact 60. The substrate 50 may be a p-type substrate when the lower DBR layer 30 is doped in p-type, and the substrate 50 may be an n-type substrate when the lower DBR layer 30 is doped in n-type.

The VCSEL emitter 110 according to an embodiment may include the active layer 40.

The active layer 40 according to an embodiment may be disposed between the upper DBR layer 20 and the lower DBR layer 30.

The active layer 40 according to an embodiment may include a plurality of quantum wells that generate laser beams. The active layer 40 may emit laser beams.

The VCSEL emitter 110 according to an embodiment may include a metal contact for electrical connection to a power source or the like. For example, the VCSEL emitter 110 may include the upper metal contact 10 and the lower metal contact 60.

Also, the VCSEL emitter 110 according to an embodiment may be electrically connected to the upper DBR layer 20 and the lower DBR layer 30 through the metal contact.

For example, when the upper DBR layer 20 is doped in p-type and the lower DBR layer 30 is doped in n-type, p-type power may be supplied to the upper metal contact 10 to electrically connect the VCSEL emitter 110 to the upper DBR layer 20, and n-type power may be supplied to the lower metal contact 60 to electrically connect the VCSEL emitter 110 to the lower DBR layer 30.

Also, for example, when the upper DBR layer 20 is doped in n-typeand the lower DBR layer 30 is doped in p-type, n-type power may be supplied to the upper metal contact 10 to electrically connect the VCSEL emitter 110 to the upper DBR layer 20, and p-type power may be supplied to the lower metal contact 60 to electrically connect the VCSEL emitter 110 to the lower DBR layer 30.

The VCSEL emitter 110 according to an embodiment may include an oxidation area. The oxidation area may be disposed on an upper portion of the active layer.

The oxidation area according to an embodiment may have electrical insulation. For example, an electrical flow to the oxidation area may be restricted. For example, an electrical connection to the oxidation area may be restricted.

Also, the oxidation area according to an embodiment may serve as an aperture. In detail, since the oxidation area has electrical insulation, a beam generated from the active layer 40 may be emitted to only areas other than the oxidation area.

The laser emitting unit according to an embodiment may include a plurality of VCSEL emitters 110.

Also, the laser emitting unit according to an embodiment may turn on the plurality of VCSEL emitters 110 at once or individually.

The laser emitting unit according to an embodiment may emit laser beams of various wavelengths. For example, the laser emitting unit may emit a laser beam with a wavelength of 905 nm. Also, for example, the laser emitting unit may emit a laser beam with a wavelength of 1550 nm.

Also, the wavelength of the laser beam emitted from the laser emitting unit according to an embodiment may vary depending on the surrounding environment. For example, as the temperature of the surrounding environment increases, the wavelength of the laser beam emitted from the laser emitting unit may increase. Alternatively, for example, as the temperature of the surrounding environment decreases, the wavelength of the laser beam emitted from the laser emitting unit may decrease. The surrounding environment may include temperature, humidity, pressure, dust concentration, ambient light amount, altitude, gravity, acceleration, and the like, but the present disclosure is not limited thereto.

The laser emitting unit may emit a laser beam perpendicularly to a support surface. Alternatively, the laser emitting unit may emit a laser beam perpendicularly to an emission surface.

Figure 5:
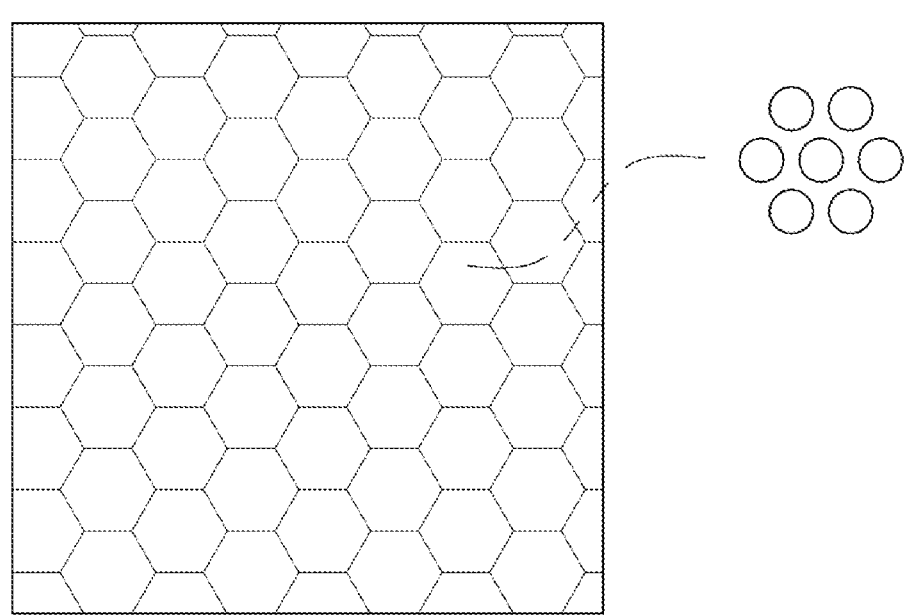
FIG. 5 is a diagram illustrating a vertical-cavity-surface-emitting laser (VCSEL) unit according to one embodiment.

FIG. 5 is a diagram showing a VCSEL unit according to an embodiment.

Referring to FIG. 5, a laser emitting unit 100 according to an embodiment may include a VCSEL unit 130.

The VCSEL unit 130 according to an embodiment may include a plurality of VCSEL emitters 110. For example, the plurality of VCSEL emitters 110 may be arranged in a honeycomb structure, but the present disclosure is not limited thereto. In this case, one honeycomb structure may include seven VCSEL emitters 110, but the present disclosure is not limited thereto.

Also, the VCSEL emitters 110 included in the VCSEL unit 130 according to an embodiment may be oriented in the same direction. For example, 400 VCSEL emitters 110 included in one VCSEL unit 130 may be oriented in the same direction.

Also, the VCSEL unit 130 may be distinguished by the direction in which the laser beam is emitted. For example, when N VCSEL emitters 110 emit laser beams in a first direction and M VCSEL emitters 110 emit laser beams in a second direction, the N VCSEL emitters 110 may be distinguished as first VCSEL units, and the M VCSEL emitters 110 may be distinguished as second VCSEL units.

Also, the VCSEL unit 130 according to an embodiment may include a metal contact. For example, the VCSEL unit 130 may include a p-type metal and an n-type metal. Also, for example, a plurality of VCSEL emitters 110 included in the VCSEL unit 130 share the metal contact.

Figure 6:
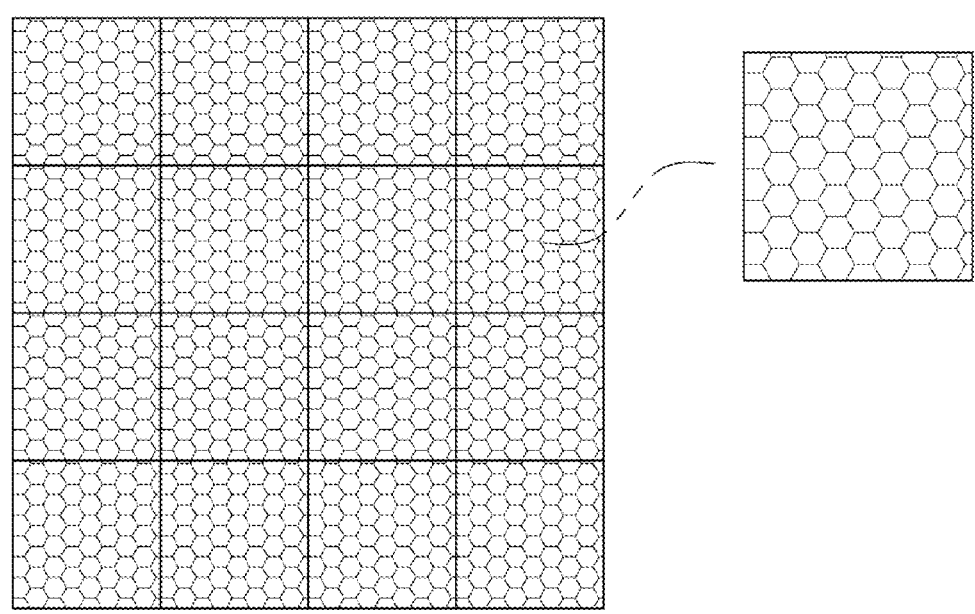
FIG. 6 is a diagram illustrating a VCSEL array according to one embodiment.

FIG. 6 is a diagram showing a VCSEL array according to an embodiment.

Referring to FIG. 6, a laser emitting unit 100 according to an embodiment may include a VCSEL array 150. FIG. 6 shows 8×8 VCSEL arrays, but the present disclosure is not limited thereto.

The VCSEL array 150 according to an embodiment may include a plurality of VCSEL units 130. For example, the plurality of VCSEL units 130 may be arranged in a matrix structure, but the present disclosure is not limited thereto.

For example, the plurality of VCSEL units 130 may be an N×N matrix, but the present disclosure is not limited thereto. Also, for example, the plurality of VCSEL units 130 may be an N×M matrix, but the present disclosure is not limited thereto.

Also, the VCSEL array 150 according to an embodiment may include a metal contact. For example, the VCSEL array 150 may include a p-type metal and an n-type metal. In this case, the plurality of VCSEL units 130 may share the metal contacts or may have respective metal contacts rather than sharing the metal contacts.

Figure 7:
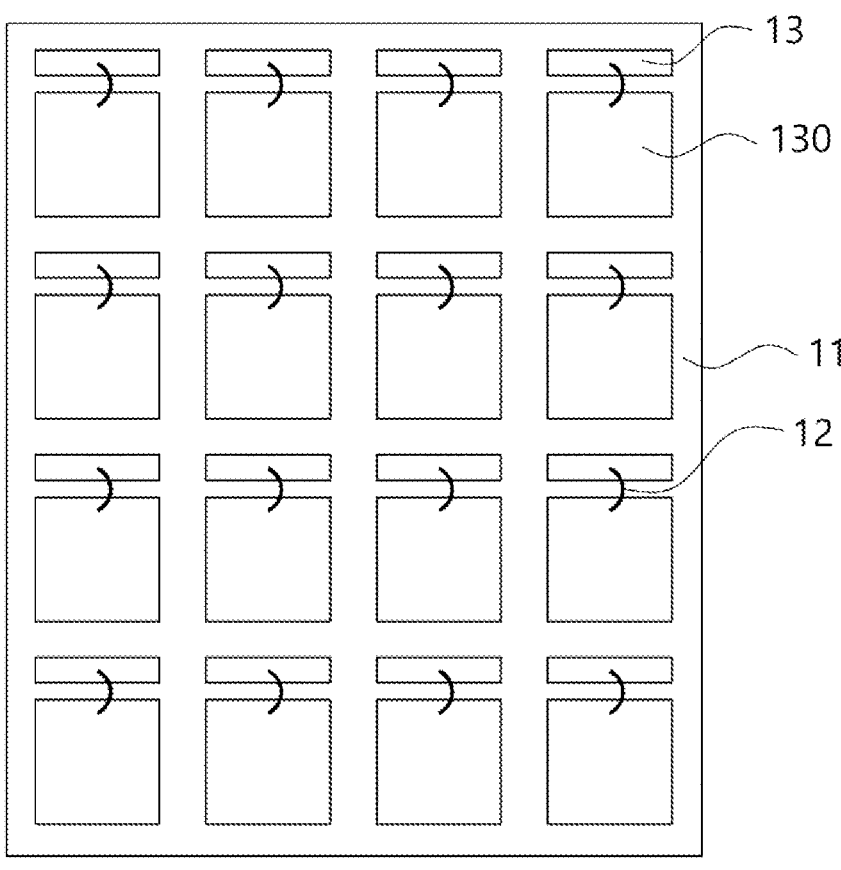
FIG. 7 is a side view illustrating a VCSEL array and a metal contact according to one embodiment.

FIG. 7 is a diagram showing a VCSEL array and a metal contact according to an embodiment.

Referring to FIG. 7, a laser emitting unit 100 according to an embodiment may include a VCSEL array 151. FIG. 7 shows 4×4 VCSEL arrays, but the present disclosure is not limited thereto. The VCSEL array 151 may include a first metal contact 11, a wire 12, a second metal contact 13, and a VCSEL unit 130.

The VCSEL array 151 according to an embodiment may include a plurality of VCSEL units 130 arranged in a matrix structure. In this case, the plurality of VCSEL units 130 may be connected to the metal contacts independently. For example, the plurality of VCSEL units 130 may be connected to the first metal contact 11 together because the VCSEL units 130 share the first metal contact 11. However, the plurality of VCSEL units 130 may be connected to the second metal contact independently because the VCSEL units 130 do not share the second metal contact 13. Also, for example, the plurality of VCSEL units 130 may be connected to the first metal contact 11 directly and may be connected to the second metal contact 13 through wires 12. In this case, the number of wires 12 required may be equal to the number of VCSEL units 130. For example, when the VCSEL array 151 includes a plurality of VCSEL units 130 arranged in an N×M matrix structure, the number of wires 12 may be N*M.

Also, the first metal contact 11 and the second metal contact 13 according to an embodiment may be different from each other. For example, the first metal contact 11 may be an n-type metal, and the second metal contact 13 may be a p-type metal. On the contrary, the first metal contact 11 may be a p-type metal, and the second metal contact 13 may be an n-type metal.

Figure 8:
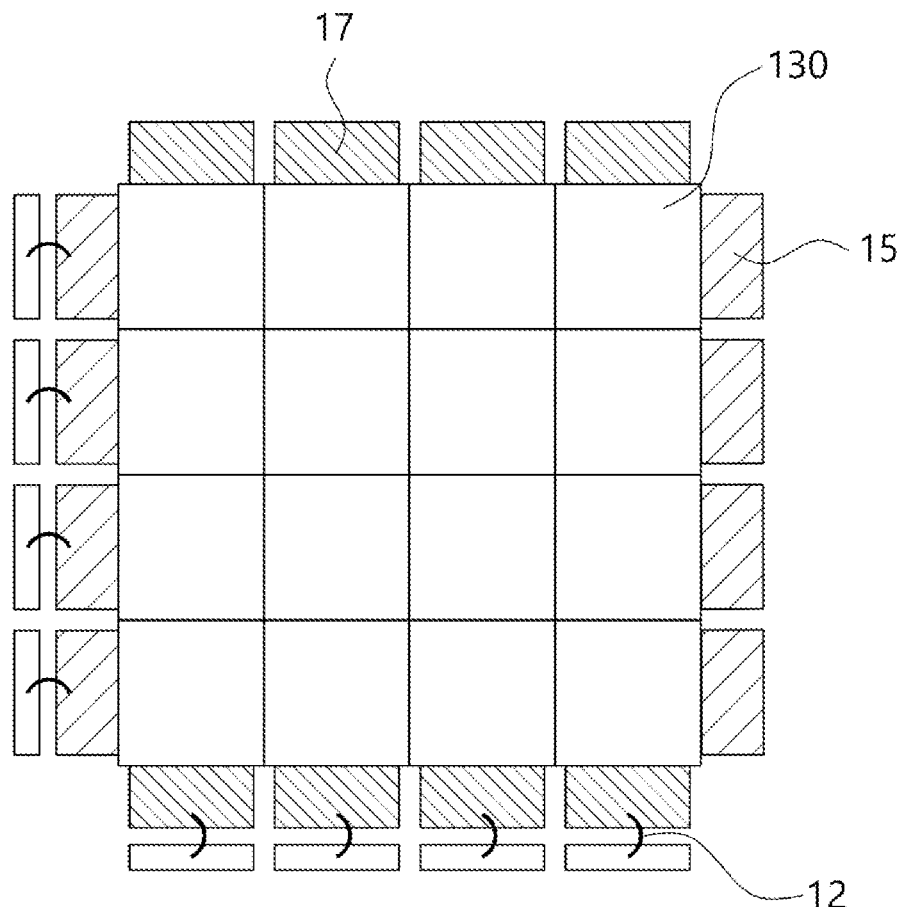
FIG. 8 is a diagram illustrating a VCSEL array according to one embodiment.

FIG. 8 is a diagram showing a VCSEL array according to an embodiment.

Referring to FIG. 8, a laser emitting unit 100 according to an embodiment may include a VCSEL array 153. FIG. 8 shows 4×4 VCSEL arrays, but the present disclosure is not limited thereto.

The VCSEL array 153 according to an embodiment may include a plurality of VCSEL units 130 arranged in a matrix structure. In this case, the plurality of VCSEL units 130 may share a metal contact or may have respective metal contacts rather than sharing a metal contact. For example, the plurality of VCSEL units 130 may share a first metal contact 15 in units of rows. Also, for example, the plurality of VCSEL units 130 may share a second metal contact 17 in units of columns.

Also, the first metal contact 15 and the second metal contact 17 according to an embodiment may be different from each other. For example, the first metal contact 15 may be an n-type metal, and the second metal contact 17 may be a p-type metal. On the contrary, the first metal contact 15 may be a p-type metal, and the second metal contact 17 may be an n-type metal.

Also, the VCSEL unit 130 according to an embodiment may be electrically connected to the first metal contact 15 and the second metal contact 17 through wires 12.

The VCSEL array 153 according to one embodiment may operate to be addressable. For example, the plurality of VCSEL units 130 included in the VCSEL array 153 may operate independently of the other VCSEL units.

For example, when power is supplied to the first metal contact 15 in a first row and the second metal contact 17 in a first column, the VCSEL unit in a first row and first column may operate. In addition, for example, when power is supplied to the first metal contact 15 in the first row and the second metal contacts 17 in the first and third columns, the VCSEL unit in the first row and first column and the VCSEL unit in the first row and third column may operate.

According to one embodiment, the VCSEL units 130 included in the VCSEL array 153 may operate with a predetermined pattern.

For example, the VCSEL units 130 may operate with a predetermined pattern, such as, after the VCSEL unit in the first row and first column operates, the VCSEL unit in a first row and second column, the VCSEL unit in the first row and third column, the VCSEL unit in a first row and fourth column, the VCSEL unit in a second row and first column, the VCSEL unit in a second row and second column, and the like operate in this order, and the VCSEL unit in a fourth row and fourth column operates at the last.

Further, for example, the VCSEL units 130 may operate with a predetermined pattern, such as, after the VCSEL unit in the first row and first column operates, the VCSEL unit in the second row and first column, the VCSEL unit in a third row and first column, the VCSEL unit in a fourth row and first column, the VCSEL unit in the first row and second column, the VCSEL unit in the second row and second column, and the like operate in this order, and the VCSEL unit in the fourth row and fourth column operates at the last.

According to another embodiment, the VCSEL units 130 included in the VCSEL array 153 may operate with an irregular pattern. Alternatively, the VCSEL units 130 included in the VCSEL array 153 may operate without having a pattern.

For example, VCSEL units 130 may operate randomly. When the VCSEL units 130 operate randomly, interference between the VCSEL units 130 may be prevented.

There may be various methods of directing a laser beam emitted from a laser emitting unit to an object. Among the methods, a flash scheme uses a laser beam spreading toward an object through the divergence of the laser beam. In order to direct a laser beam to an object located at a remote distance, the flash scheme requires a high-power laser beam. The high-power laser beam requires a high voltage to be applied, thereby increasing power. Also, the high-power laser beam may damage human eyes, and thus there is a limit to the distance that can be measured by a LiDAR device using the flash scheme.

A scanning scheme is a scheme for directing a laser beam emitted from a laser emitting unit in a specific direction. The scanning scheme can reduce laser power loss by causing a laser beam to travel in a specific direction. Since the laser power loss can be reduced, the scanning scheme may have a longer distance that can be measured by a LiDAR device than the flash scheme even when the same laser power is used. Also, since the scanning scheme has lower laser power required to measure the same distance than the flash scheme, it is possible to improve safety for human eyes.

Laser beam scanning may include collimation and steering. For example, the laser beam scanning may collimate a laser beam and then steer the collimated laser beam. Also, for example, the laser beam scanning may steer a laser beam and then collmate the steered laser beam.

Various embodiments of an optic unit including a Beam Collimation and Steering Component (BCSC) will be described in detail below.

Figure 9:
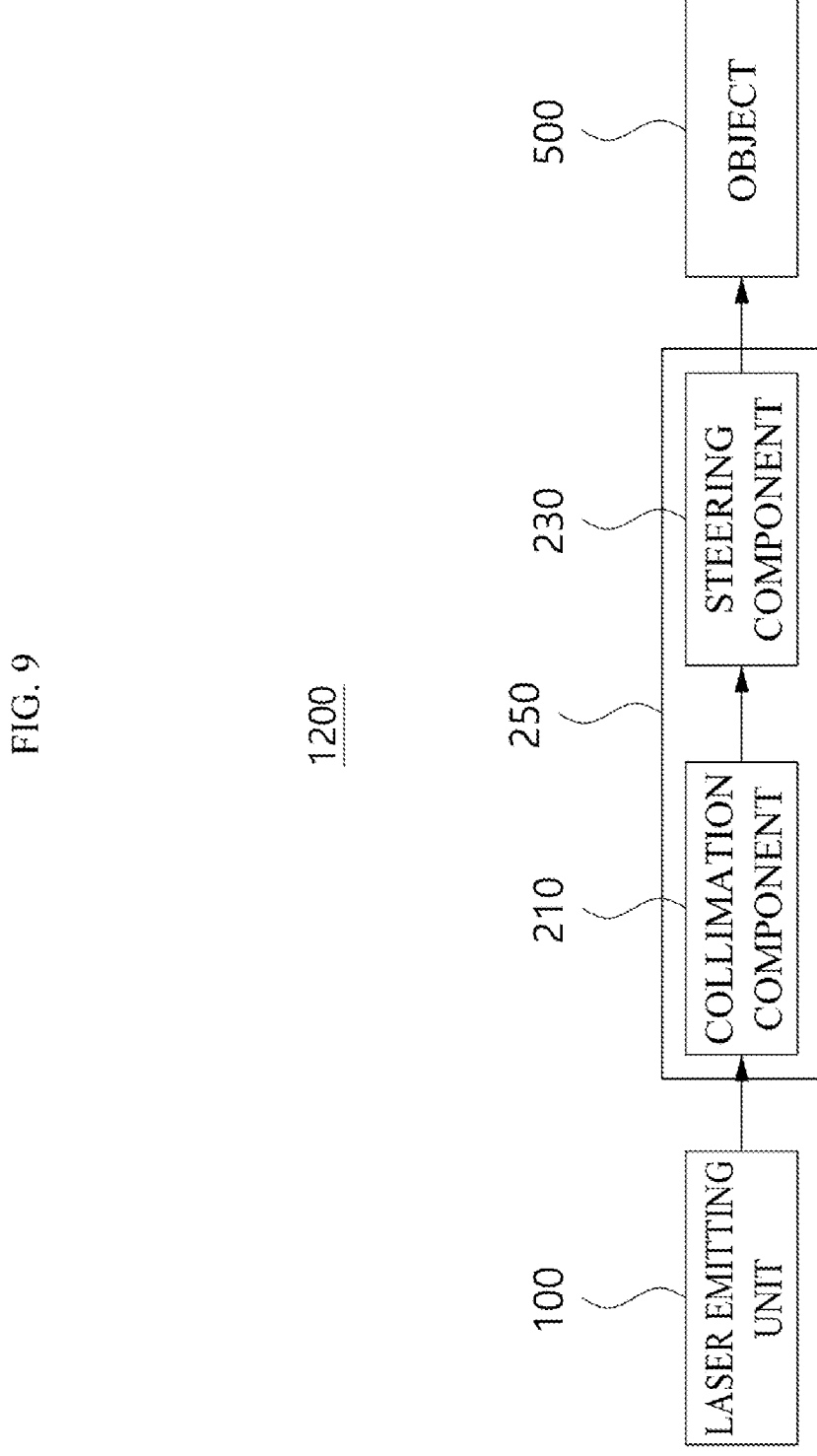
FIG. 9 is a diagram for describing a LiDAR device according to one embodiment.

FIG. 9 is a diagram illustrating a LiDAR device according to an embodiment.

Referring to FIG. 9, a LiDAR device 1200 according to an embodiment may include a laser emitting unit 100 and an optic unit. In this case, the optic unit may include a BCSC 250. Also, the BCSC 250 may include a collimation component 210 and a steering component 230.

The BCSC 250 according to an embodiment may be configured as follows. The collimation component 210 may collimate a laser beam first, and then the collimated laser beam may be steered through the steering component 230. Alternatively, the steering component 230 may steer a laser beam first, and then the steered laser beam may be collimated through the collimation component 210.

Also, an optical path of the LiDAR device 1200 according to an embodiment is as follows. A laser beam emitted from the laser emitting unit 100 may be directed to the BCSC 250. The laser beam directed to the BCSC 250 may be collimated by the collimation component 210 and directed to the steering component 230. The laser beam directed to the steering component 230 may be steered and directed to an object. The laser beam directed to the object 500 may be reflected by the object 500 and directed to the detecting unit.

Even though laser beams emitted from the laser emitting unit have directivity, there may be some degree of divergence as the laser beams go straight. Due to the divergence, the laser beams emitted from the laser emitting unit may not be incident on the object, or even if the laser beams are incident, a very small number of laser beams may be incident.

When the degree of divergence of the laser beams is large, the amount of laser beam incident on the object decreases, and the amount of laser beam reflected by the object and directed to the detecting unit becomes very small due to the divergence. Thus, a desired measurement result may not be obtained. Alternatively, when the degree of divergence of the laser beams is large, a distance that can be measured by a LiDAR device may decrease, and thus a distant object may not be subjected to measurement.

Accordingly, by reducing the degree of divergence of a laser beam emitted from a laser emitting unit before the laser beam is incident on an object, it is possible to improve the efficiency of a LiDAR device. A collimation component of the present disclosure can reduce the degree of divergence of a laser beam. A laser beam having passed through the collimation component may become parallel light. Alternatively, a laser beam having passed through the collimation component may have a degree of divergence ranging from 0.4 degrees to 1 degree.

When the degree of divergence of a laser beam is reduced, the amount of light incident on an object may be increased. When the amount of light incident on an object is increased, the amount of light reflected by the object may be increased and thus it is possible to efficiently receive the laser beam. Also, when the amount of light incident on an object is increased, it is possible to measure an object at a great distance with the same beam power compared to before the laser beam is collimated.

Figure 10:
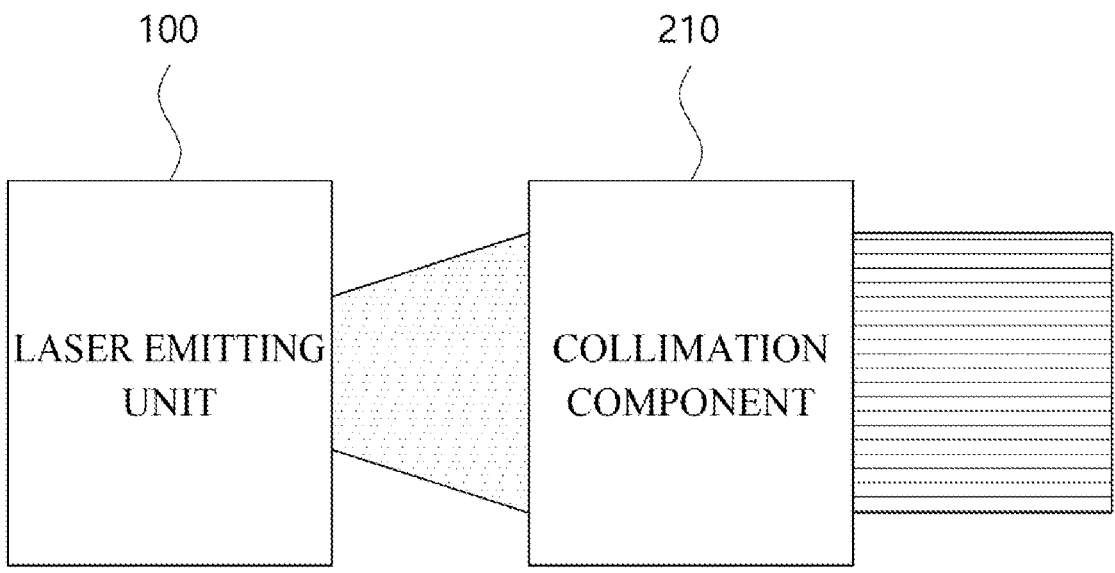
FIG. 10 is a diagram for describing a collimation component according to one embodiment.

FIG. 10 is a diagram illustrating a collimation component according to an embodiment.

Referring to FIG. 10, a collimation component 210 according to an embodiment may be disposed in a direction in which a laser beam emitted from a laser emitting unit 100 emits. The collimation component 210 may adjust the degree of divergence of a laser beam. The collimation component 210 may reduce the degree of divergence of a laser beam.

For example, the angle of divergence of a laser beam emitted from the laser emitting unit 100 may range from 16 degrees to 30 degrees. In this case, after the laser beam emitted from the laser emitting unit 100 passes through the collimation component 210, the angle of divergence of the laser beam may range from 0.4 degrees to 1 degree.

Figure 11:
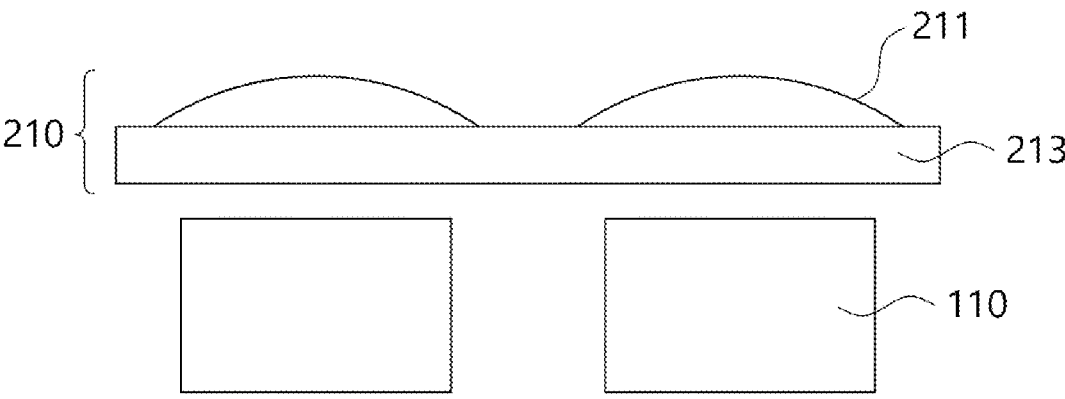
FIG. 11 is a diagram for describing a collimation component according to one embodiment.

FIG. 11 is a diagram illustrating a collimation component according to an embodiment.

Referring to FIG. 11, a collimation component 210 according to an embodiment may include a plurality of microlenses 211 and a substrate 213.

The microlenses may have a diameter of millimeters (mm), micrometers (μm), nanometers (nm), picometers (pm), but the present disclosure is not limited thereto.

The plurality of microlenses 211 according to an embodiment may be disposed on the substrate 213. The plurality of microlenses 211 and the substrate 213 may be disposed above a plurality of VCSEL emitters 110. In this case, one of the plurality of microlenses 211 may correspond to one of the plurality of VCSEL emitters 110, but the present disclosure is not limited thereto.

Also, the plurality of microlenses 211 according to an embodiment may collimate a laser beams emitted from the plurality of VCSEL emitters 110. In this case, a laser beam emitted from one of the plurality of VCSEL emitters 110 may be collimated by one of the plurality of microlenses 211. For example, the angle of divergence of a laser beam emitted from one of the plurality of VCSEL emitters 110 may be decreased after the laser beam passes through one of the plurality of microlenses 211.

Also, the plurality of microlenses according to an embodiment may be a gradient index lens, a micro-curved lens, an array lens, a Fresnel lens, or the like.

Also, the plurality of microlenses according to an embodiment may be manufactured by a method such as molding, ion exchange, diffusion polymerization, sputtering, and etching.

Also, the plurality of microlenses according to an embodiment may have a diameter ranging from 130 µm to 150 µm. For example, the diameter of the plurality of lenses may be 140 µm. Also, the plurality of microlenses may have a thickness ranging from 400 µm to 600 µm. For example, the thickness of the plurality of microlenses may be 500 µm.

Figure 12:
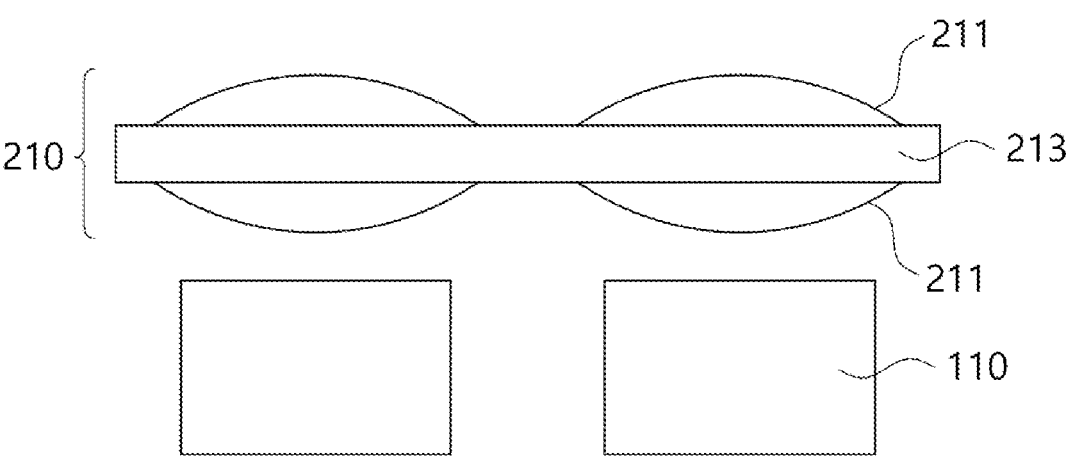
FIG. 12 is a diagram for describing a collimation component according to one embodiment.

FIG. 12 is a diagram illustrating a collimation component according to an embodiment.

Referring to FIG. 12, a collimation component 210 according to an embodiment may include a plurality of microlenses 211 and a substrate 213.

The plurality of microlenses 211 according to an embodiment may be disposed on the substrate 213. For example, the plurality of microlenses 211 may be disposed on the front surface and the rear surface of the substrate 213. In this case, the optical axis of microlenses 211 disposed on the front surface of the substrate 213 may match the optical axis of microlenses 211 disposed on the rear surface of the substrate 213.

Figure 13:
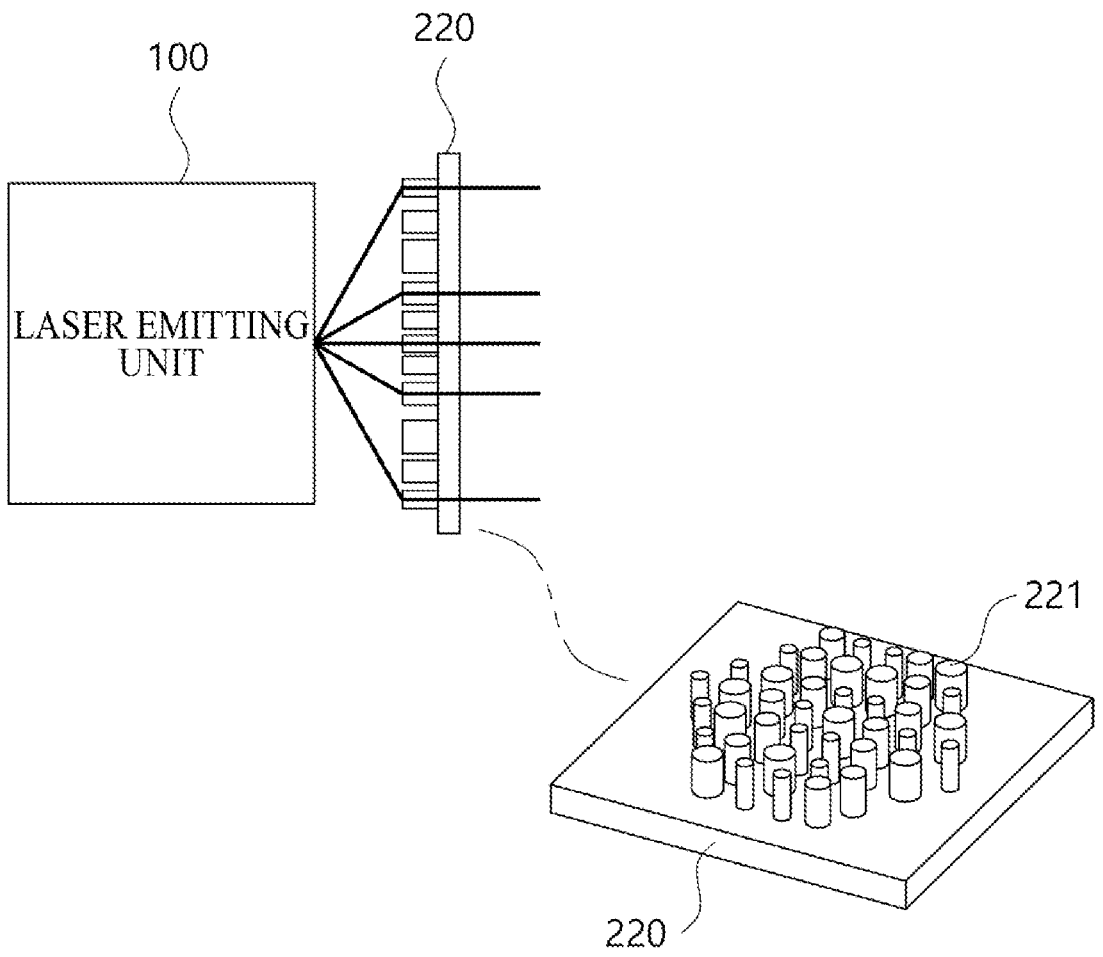
FIG. 13 is a diagram for describing a collimation component according to one embodiment.

FIG. 13 is a diagram illustrating a collimation component according to an embodiment.

Referring to FIG. 13, the collimation component according to an embodiment may include a metasurface 220.

The metasurface 220 according to an embodiment may include a plurality of nanopillars 221. For example, the plurality of nanopillars 221 may be disposed on one side of the metasurface 220. Also, for example, the plurality of nanopillars 221 may be disposed on both sides of the metasurface 220.

The plurality of nanopillars 221 may have a subwavelength size. For example, a pitch between the plurality of nanopillars 221 may be less than the wavelength of a laser beam emitted from the laser emitting unit 100. Alternatively, the width, diameter, and height of the nanopillars 221 may be less than the size of the wavelength of the laser beam.

By adjusting the phase of a laser beam emitted from the laser emitting unit 100, the metasurface 220 may refract the laser beam. The metasurface 220 may refract laser beams emitted from the laser emitting unit 100 in various directions.

The metasurface 220 may collimate a laser beam emitted from the laser emitting unit 100. Also, the metasurface 220 may reduce the angle of divergence of a laser beam emitted from the laser emitting unit 100. For example, the angle of divergence of a laser beam emitted from the laser emitting unit 100 may range from 15 degrees to 30 degrees, and the angle of divergence of a laser beam having passed the metasurface 220 may range from 0.4 degrees to 1.8 degrees.

The metasurface 220 may be disposed on the laser emitting unit 100. For example, the metasurface 220 may be disposed to the side of the emission surface of the laser emitting unit 100.

Alternatively, the metasurface 220 may be deposited on the laser emitting unit 100. The plurality of nanopillars 221 may be formed on an upper portion of the laser emitting unit 100. The plurality of nanopillars 221 may form various nanopatterns on the laser emitting unit 100.

The nanopillars 221 may have various shapes. For example, the nanopillars 221 may have a cylindrical shape, a polygonal column shape, a conical shape, a polypyramid shape, or the like. Furthermore, the nanopillars 221 may have an irregular shape.

Figure 14:
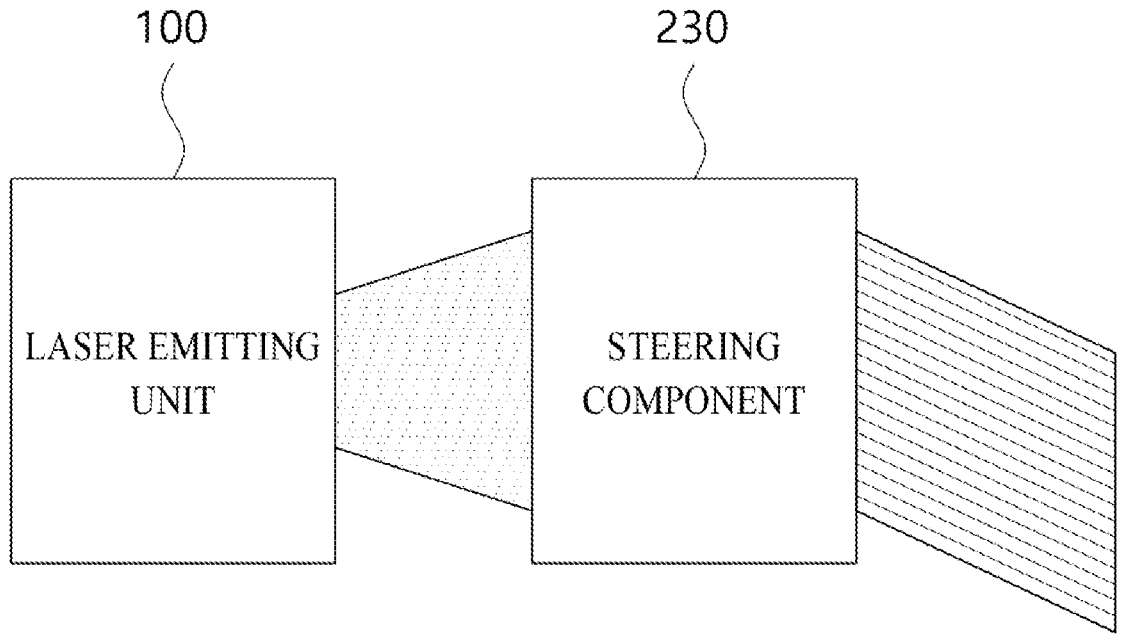
FIG. 14 is a diagram for describing a steering component according to one embodiment.

FIG. 14 is a diagram illustrating a steering component according to an embodiment.

Referring to FIG. 14, a steering component 230 according to an embodiment may be disposed in a direction in which a laser beam emitted from a laser emitting unit 100 travels. The steering component 230 may adjust the direction of a laser beam. The steering component 230 may adjust an angle between a laser beam and an optical axis of a laser light source.

For example, the steering component 230 may steer the laser beam such that the angle between the laser beam and the optical axis of the laser light source ranges from 0 degrees to 30 degrees. Alternatively, for example, the steering component 230 may steer the laser beam such that the angle between the laser beam and the optical axis of the laser light source ranges from −30 degrees to 0 degrees.

Figure 15:
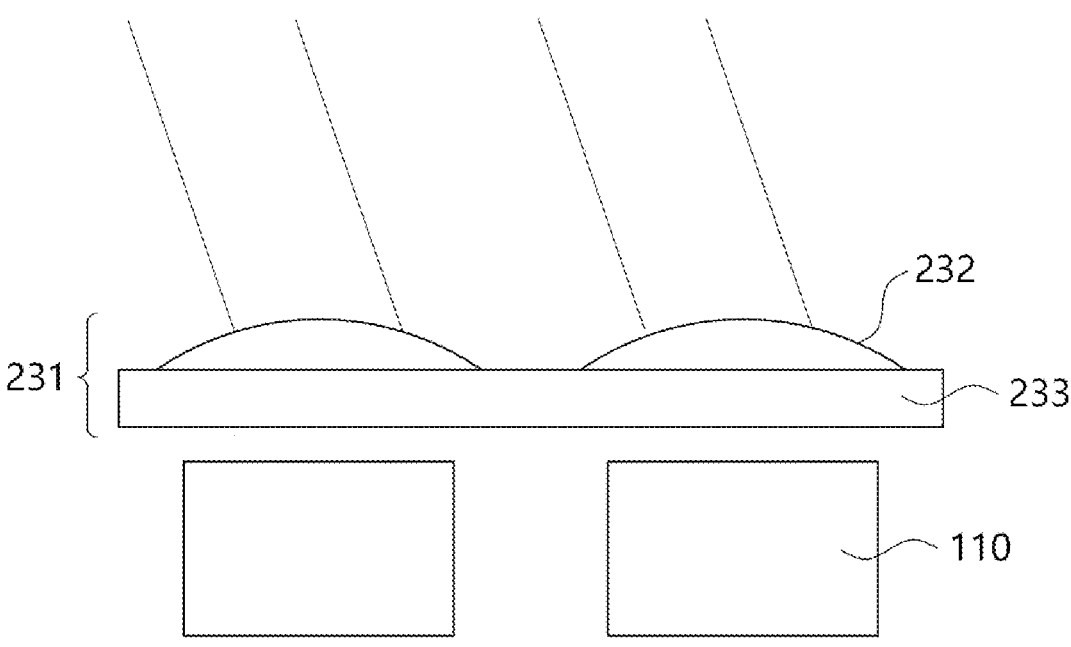
FIGS. 15 and 16 are diagrams for describing a steering component according to one embodiment.
Figure 16:
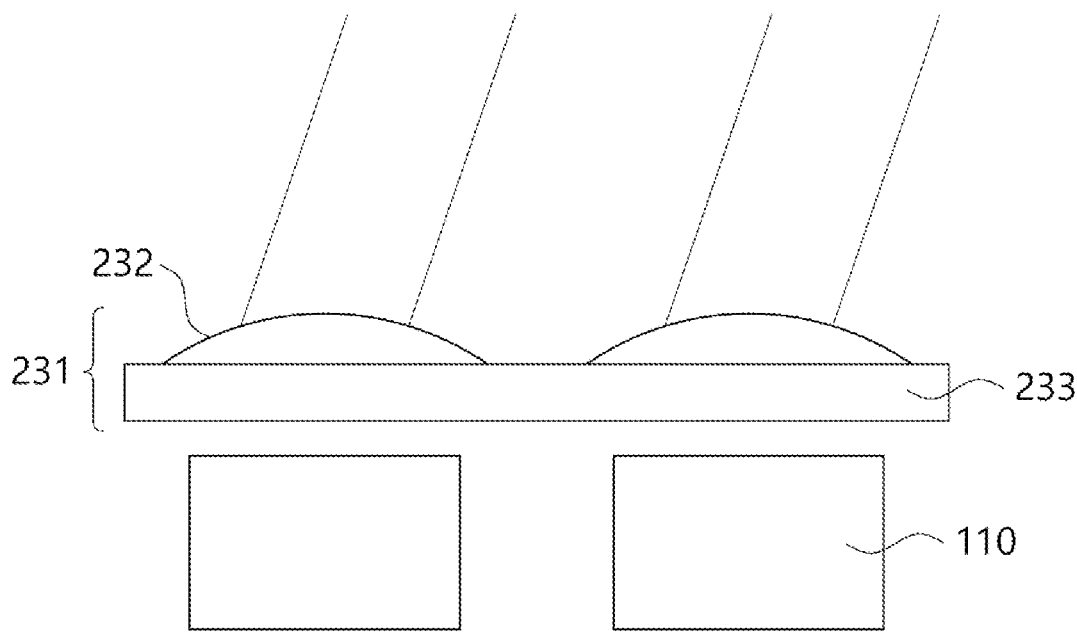

FIGS. 15 and 16 are diagrams illustrating a steering component according to an embodiment.

Referring to FIGS. 14 and 15, a steering component 231 according to an embodiment may include a plurality of microlenses 232 and a substrate 233.

The plurality of microlenses 232 according to an embodiment may be disposed on the substrate 233. The plurality of microlenses 232 and the substrate 233 may be disposed above a plurality of VCSEL emitters 110. In this case, one of the plurality of microlenses 232 may correspond to one of the plurality of VCSEL emitters 110, but the present disclosure is not limited thereto.

Also, the plurality of microlenses 232 according to an embodiment may steer laser beams emitted from the plurality of VCSEL emitters 110. In this case, a laser beam emitted from one of the plurality of VCSEL emitters 110 may be steered by one of the plurality of microlenses 232.

In this case, the optical axis of the microlens 232 may not match the optical axis of the VCSEL emitter 110. For example, referring to FIG. 14, when the optical axis of the VCSEL emitter 110 is inclined to the right with respect to the optical axis of the microlens 232, a laser beam emitted from the VCSEL emitter 110 through the microlens 232 may be directed to the left. Also, for example, referring to FIG. 15, when the optical axis of the VCSEL emitter 110 is inclined to the left with respect to the optical axis of the microlens 232, a laser beam emitted from the VCSEL emitter 110 through the microlens 232 may be directed to the right.

Also, as a distance between the optical axis of the microlens 232 and the optical axis of the VCSEL emitter 110 increases, the degree of steering of the laser beam may increase. For example, an angle between a laser beam and an optical axis of a laser light source may be larger when the distance between the optical axis of the microlens 232 and the optical axis of the VCSEL emitter 110 is 10 µm than when the distance is 1 µm.

Figure 17:
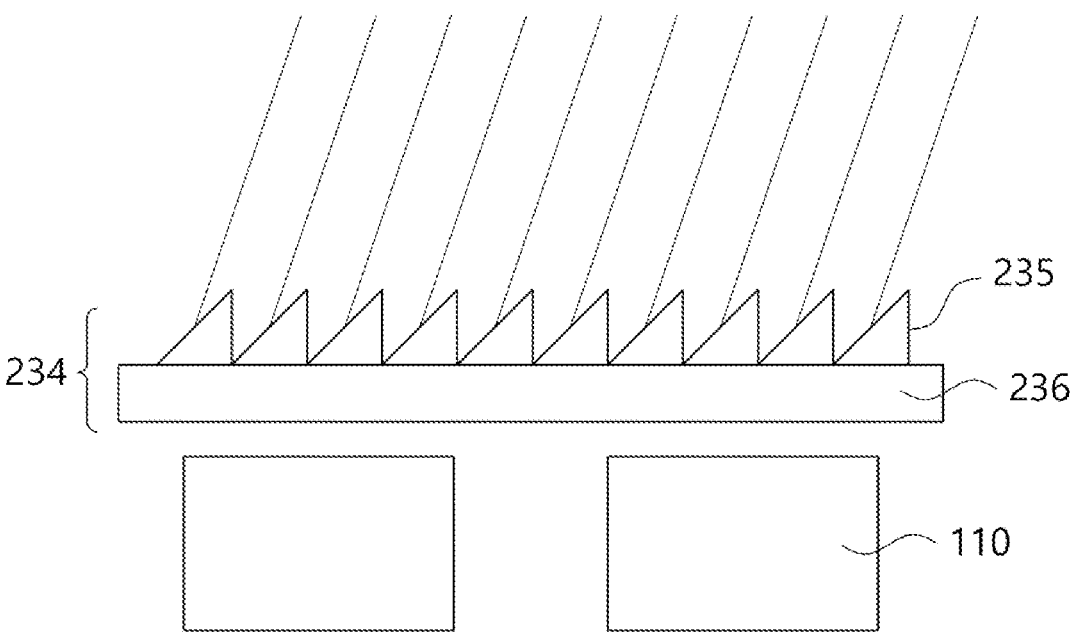
FIG. 17 is a diagram for describing a steering component according to one embodiment.

FIG. 17 is a diagram illustrating a steering component according to an embodiment.

Referring to FIG. 17, a steering component 234 according to an embodiment may include a plurality of microprisms 235 and a substrate 236.

The plurality of microprisms 235 according to an embodiment may be disposed on the substrate 236. The plurality of microprisms 235 and the substrate 236 may be disposed above a plurality of VCSEL emitters 110. In this case, one of the plurality of microprisms 235 may correspond to one of the plurality of VCSEL emitters 110, but the present disclosure is not limited thereto.

Also, the plurality of microprisms 235 according to an embodiment may steer laser beams emitted from the plurality of VCSEL emitters 110. For example, the plurality of microprisms 235 may change an angle between a laser beam and an optical axis of a laser light source.

In this case, as the angle of a microprism 235 decreases, the angle between the laser beam and the optical axis of the laser light source increases. For example, a laser beam may be steered 35 degrees when the angle of the microprism 235 is 0.05 degrees and may be steered by 15 degrees when the angle of the microprism 235 is 0.25 degrees.

Also, the plurality of microprisms 235 according to an embodiment may include a Porro prism, an Amici roof prism, a pentaprism, a Dove prism, a retroreflector prism, or the like. Also, the plurality of microprisms 235 may be formed of glass, plastic, or fluorspar. Also, the plurality of microprisms 235 may be manufactured by a method such as molding and etching.

At this point, a surface of the micro prism 235 may be polished by a polishing process so that diffused reflection due to surface roughness may be prevented.

According to one embodiment, the micro prisms 235 may be disposed on both surfaces of the substrate 236. For example, the micro prisms disposed on a first surface of the substrate 236 may steer the laser beam in a first axis, the micro prisms disposed on a second surface of the substrate 236 may steer the laser beam in a second axis.

Figure 18:
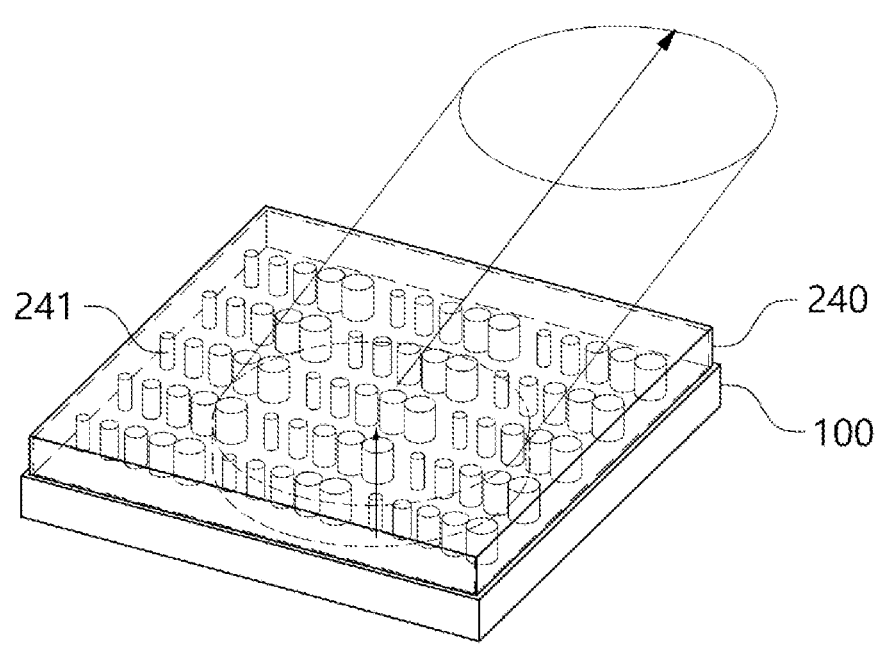
FIG. 18 is a diagram for describing a steering component according to one embodiment.

FIG. 18 is a diagram illustrating a steering component according to an embodiment.

Referring to FIG. 18, the steering component according to an embodiment may include a metasurface 240.

The metasurface 240 may include a plurality of nanopillars 241. For example, the plurality of nanopillars 241 may be disposed on one side of the metasurface 240. Also, for example, the plurality of nanopillars 241 may be disposed on both sides of the metasurface 240.

By adjusting the phase of a laser beam emitted from the laser emitting unit 100, the metasurface 240 may refract the laser beam.

The metasurface 240 may be disposed on the laser emitting unit 100. For example, the metasurface 240 may be disposed to the side of the emission surface of the laser emitting unit 100.

Alternatively, the metasurface 240 may be deposited on the laser emitting unit 100. The plurality of nanopillars 241 may be formed on an upper portion of the laser emitting unit 100. The plurality of nanopillars 241 may form various nanopatterns on the laser emitting unit 100.

The nanopillars 241 may have various shapes. For example, the nanopillars 241 may have a shape such as a circular column, a polygonal column, a circular pyramid, and a polygonal pyramid. In addition, the nanopillars 241 may have an irregular shape.

The nanopillars 241 may form various nanopatterns. The metasurface 240 may steer a laser beam emitted from the laser emitting unit 100 based on the nanopatterns.

The nanopillars 241 may form nanopatterns based on various features. The features may include the width (hereinafter referred to as W), pitch (hereinafter referred to as P), height (hereinafter referred to as H), and the number per unit length of nanopillars 241.

A nanopattern formed based on various features and a method of steering a laser beam according to the nanopattern will be described below.

Figure 19:
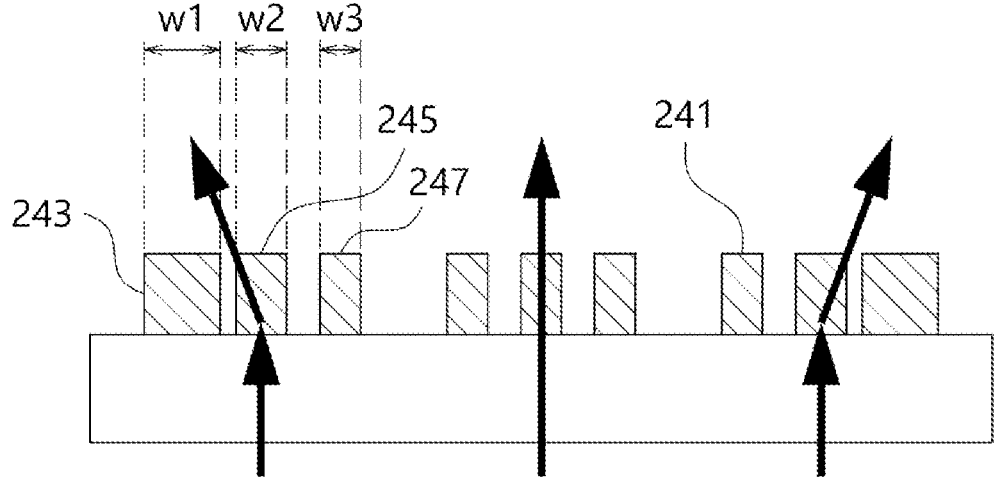
FIG. 19 is a diagram for describing a metasurface according to one embodiment.

FIG. 19 is a diagram illustrating a metasurface according to an embodiment.

Referring to FIG. 19, a metasurface 240 according to an embodiment may include a plurality of nanopillars 241 with different widths W.

The plurality of nanopillars 241 may form nanopatterns based on the widths W. For example, the plurality of nanopillars 241 may be disposed to have widths increasing in one direction (W1, W2, and W3). In this case, a laser beam emitted from a laser emitting unit 100 may be steered in a direction in which the widths W of the nanopillars 241 increase.

For example, the metasurface 240 may include a first nanopillar 243 with a first width W1, a second nanopillar 245 with a second width W2, and a third nanopillar 247 with a third width W3. The first width W1 may be greater than the second width W2 and the third width W3. The second width W2 may be greater than the third width W3. That is, the widths W of the nanopillars 241 may decrease from the first nanopillar 243 to the third nanopillar 247. In this case, when the laser beam emitted from the laser emitting unit 100 passes through the metasurface 240, the laser beam may be steered between a first direction in which the laser beam is emitted from the laser emitting unit 100 and a second direction which is a direction from the third nanopillar 247 to the first nanopillar 243.

Meanwhile, the steering angle θ of the laser beam may vary depending on a change rate of the widths W of the nanopillars 241. Here, the change rate of the widths W of the nanopillars 241 may refer to a numerical value indicating the average change of the widths W of the plurality of nanopillars 241.

The change rate of the widths W of the nanopillars 241 may be calculated based on the difference between the first width W1 and the second width W2 and the difference between the second width W2 and the third width W3.

The difference between the first width W1 and the second width W2 may be different from the difference between the second width W2 and the third width W3.

The steering angle θ of the laser beam may vary depending on the widths W of the nanopillars 241.

In detail, the steering angle θ may increase as the change rate of the widths W of the nanopillars 241 increases.

For example, the nanopillars 241 may form a first pattern with a first change rate on the basis of the widths W. Also, the nanopillars 241 may form a second pattern with a second change rate smaller than the first change rate on the basis of the widths W.

In this case, a first steering angle caused by the first pattern may be greater than a second steering angle caused by the second pattern.

Meanwhile, the steering angle θ may range from −90 degrees to 90 degrees.

Figure 20:
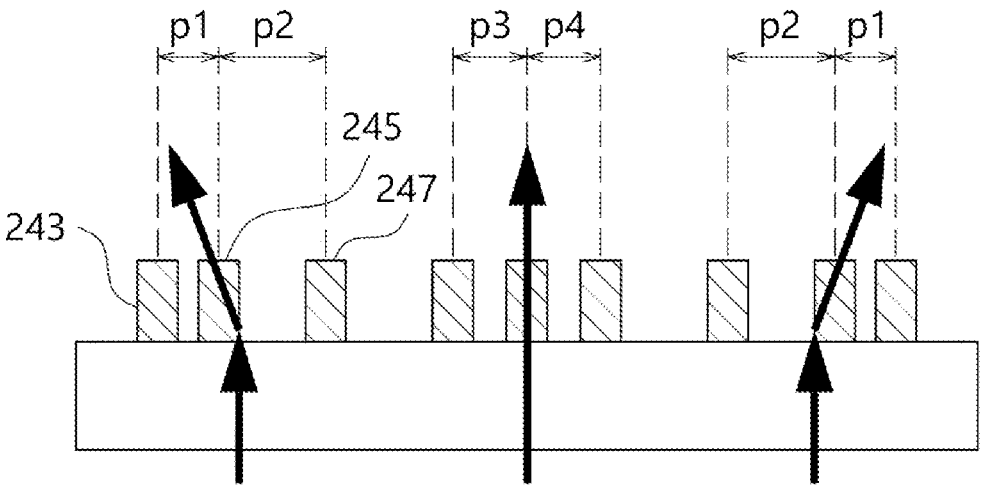
FIG. 20 is a diagram for describing a metasurface according to one embodiment.

FIG. 20 is a diagram illustrating a metasurface according to an embodiment.

Referring to FIG. 20, a metasurface 240 according to an embodiment may include a plurality of nanopillars 241 with different pitches P between adjacent nanopillars 241.

The plurality of nanopillars 241 may form nanopatterns based on a change in the pitches P between the adjacent nanopillars 241. The metasurface 240 may steer a laser beam emitted from the laser emitting unit 100 based on the nanopatterns formed based on the change in the pitches P between the nanopillars 241.

According to an embodiment, the pitches P between the nanopillars 241 may decrease in one direction. Here, a pitch P may refer to a distance between the centers of two adjacent nanopillars 241. For example, a first pitch P may refer to a distance between the center of a first nanopillar 243 and the center of a second nanopillar 245. Alternatively, the first pitch P1 may be defined as the shortest distance between the first nanopillar 243 and the second nanopillar 245.

A laser beam emitted from a laser emitting unit 100 may be steered in a direction in which the pitches P between the nanopillars 241 decrease.

The metasurface 240 may include the first nanopillar 243, the second nanopillar 245, and the third nanopillar 247. In this case, the first pitch P1 may be acquired based on a distance between the first nanopillar 243 and the second nanopillar 245. Likewise, a second pitch P2 may be acquired based on a distance between the second nanopillar 245 and the third nanopillar 247. In this case, the first pitch P1 may be smaller than the second pitch P2. That is, the pitches P may increase from the first nanopillar 243 to the third nanopillar 247.

In this case, when the laser beam emitted from the laser emitting unit 100 passes through the metasurface 240, the laser beam may be steered between a first direction in which the laser beam is emitted from the laser emitting unit 100 and a second direction which is a direction from the third nanopillar 247 to the first nanopillar 243.

The steering angle θ of the laser beam may vary depending on the pitches P between the nanopillars 241.

In detail, the steering angle θ of the laser beam may vary depending on a change rate of the pitches P between the nanopillars 241. Here, the change rate of the pitches P between the nanopillars 241 may refer to a numerical value indicating the average change of the pitches P between adjacent nanopillars 241.

The steering angle θ of the laser beam may increase as the change rate of the pitches P between the nanopillars 241 increases.

For example, the nanopillars 241 may form a first pattern with a first change rate based on the pitches P. Also, the nanopillars 241 may form a second pattern with a second change rate based on the pitches P.

In this case, a first steering angle caused by the first pattern may be greater than a second steering angle caused by the second pattern.

Meanwhile, the above-described principle of steering a laser beam according to a change in the pitches P between the nanopillars 241 is similarly applicable even to a case in which the number per unit length of nanopillars 241 changes.

For example, when the number per unit length of nanopillars 241 changes, the laser beam emitted from the laser emitting unit 100 may be steered between the first direction in which the laser beam is emitted from the laser emitting unit 100 and the second direction in which the number per unit length of nanopillars 241 increases.

Figure 21:
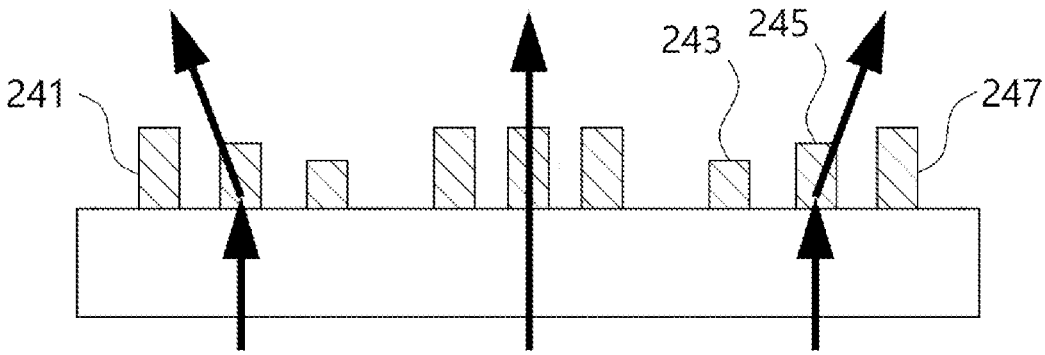
FIG. 21 is a diagram for describing a metasurface according to one embodiment.

FIG. 21 is a diagram illustrating a metasurface according to an embodiment.

Referring to FIG. 21, a metasurface 240 according to an embodiment may include a plurality of nanopillars 241 with different heights H.

The plurality of nanopillars 241 may form nanopatterns on the basis of a change in the heights H of the nanopillars 241.

According to an embodiment, the heights H1, H2, and H3 of the plurality of nanopillars 241 may increase in one direction. A laser beam emitted from a laser emitting unit 100 may be steered in a direction in which the heights H of the nanopillars 241 increase.

For example, the metasurface 240 may include a first nanopillar 243 with a first height H1, a second nanopillar 245 with a second height H2, and a third nanopillar 247 with a third height H3. The third height H3 may be greater than the first height H1 and the second height H2. The second height H2 may be greater than the first height H1. That is, the heights H of the nanopillars 241 may increase from the first nanopillar 243 to the third nanopillar 247. In this case, when the laser beam emitted from the laser emitting unit 100 passes through the metasurface 240, the laser beam may be steered between the first direction in which the laser beam is emitted from the laser emitting unit 100 and the second direction which is a direction from the first nanopillar 243 to the third nanopillar 247.

The steering angle θ of the laser beam may vary depending on the heights H of the nanopillars 241.

In detail, the steering angle θ of the laser beam may vary depending on a change rate of the heights H of the nanopillars 241. Here, the change rate of the heights H of the nanopillars 241 may refer to a numerical value indicating the average change of the heights H of adjacent nanopillars 241.

The change rate of the heights H of the nanopillars 241 may be calculated based on the difference between the first height H1 and the second height H2 and the difference between the second height H2 and the third height H3. The difference between the first height H1 and the second height H2 may be different from the difference between the second height H2 and the third height H3.

The steering angle θ of the laser beam may increase as the change rate of the heights H2 of the nanopillars 241 increases.

For example, the nanopillars 241 may form a first pattern with a first change rate on the basis of the heights H. Also, the nanopillars 241 may form a second pattern with a second change rate on the basis of the heights H.

In this case, a first steering angle caused by the first pattern may be greater than a second steering angle caused by the second pattern.

According to one embodiment, the steering component 230 may include a mirror that reflects the laser beam. For example, the steering component 230 may include a planar mirror, a polygonal mirror, a resonant mirror, a MEMS mirror, and a galvano mirror.

Alternatively, the steering component 230 may include a polygonal mirror that rotates 360 degrees about one axis, and a nodding mirror that is repeatedly driven in a predetermined range about one axis.

Figure 22:
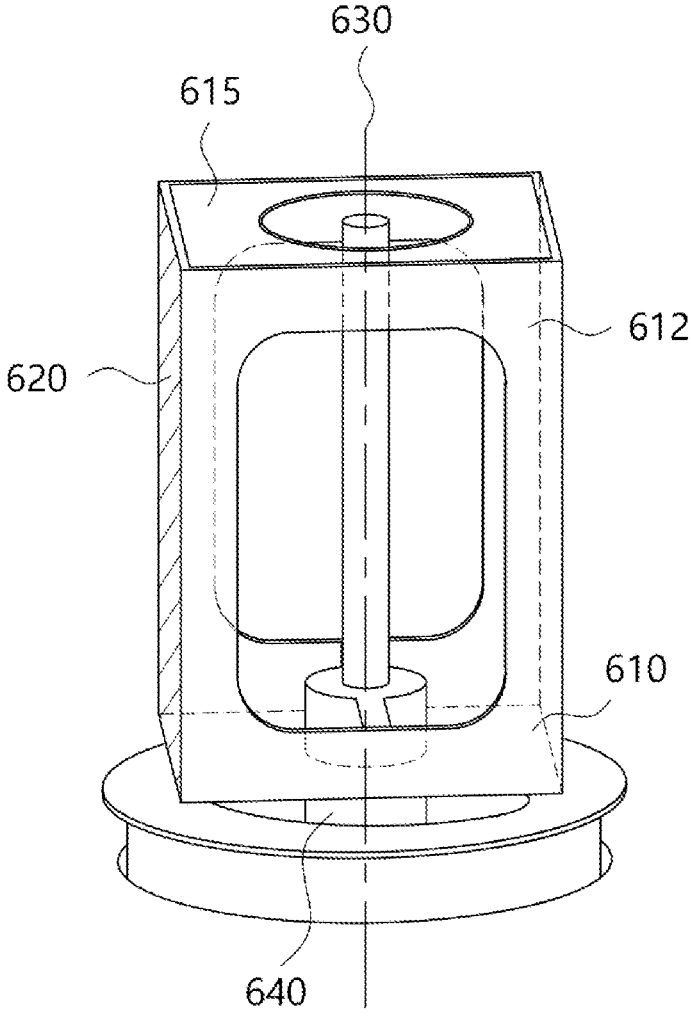
FIG. 22 is a diagram for describing a rotating polygonal mirror according to one embodiment.

FIG. 22 is a diagram for describing a polygonal mirror that is a steering component according to one embodiment.

Referring to FIG. 22, a rotating polygonal mirror 600 according to one embodiment may include reflective surfaces 620 and a body and may rotate about a rotation axis 630 vertically passing through a center of each of an upper portion 615 and a lower portion 610 of the body. However, the rotating polygonal mirror 600 may be configured with only some of the above-described components and may include more components. For example, the rotating polygonal mirror 600 may include the reflective surfaces 620 and the body, and the body may be configured with only the lower portion 610. At this point, the reflective surfaces 620 may be supported by the lower portion 610 of the body.

The reflective surfaces 620 are surfaces for reflecting the received laser, and may each include a reflective mirror, a reflective plastic, or the like, but the present disclosure is not limited thereto.

Further, the reflective surfaces 620 may be installed on side surfaces of the body except for the upper portion 615 and the lower portion 610 and may be installed such that a normal line of each thereof is orthogonal to the rotation axis 630. This may be for repetitive scanning of the same scan region by making the scan region of the laser irradiated from each of the reflective surfaces 620 the same.

Further, the reflective surfaces 620 may be installed on the side surfaces of the body except for the upper portion 615 and the lower portion 610 and may be installed such that a normal line of each thereof has a different angle from the rotation axis 630. This may be for expanding the scan region of the LiDAR device by making the scan region of the laser irradiated from each of the reflective surfaces 620 to be different.

Further, each of the reflective surfaces 620 may be formed in a rectangular shape, but is not limited thereto, and may have various shapes such as a triangular shape, a trapezoidal shape, and the like.

Further, the body is for supporting the reflective surfaces 620, and may include the upper portion 615, the lower portion 610, and a column 612 connecting the upper portion 615 and the lower portion 610. In this case, the column 612 may be installed to connect the centers of the upper portion 615 and the lower portion 610 of the body, may be installed to connect each vertex of the upper portion 615 and the lower portion 610 of the body, or may be installed to connect each corner of the upper portion 615 and the lower portion 610 of the body, but is limited to a structure for connecting and supporting the upper portion 615 and the lower portion 610 of the body.

Further, the body may be fastened to a driving unit 640 to receive a driving force for rotating, may be fastened to the driving unit 640 through the lower portion 610 of the body, or may be fastened to the driving unit 640 through the upper portion 615 of the body.

In addition, a shape of each of the upper portion 615 and the lower portion 610 of the body may be a polygonal shape. In this case, the shapes of the upper portion 615 and the lower portion 610 of the body may be identical, but are not limited thereto, and may be different from each other.

Further, a size of each of the upper portion 615 and the lower portion 610 of the body may be the same. However, the present disclosure is not limited thereto, and the sizes of the upper portion 615 and the lower portion 610 of the body may be different from each other.

Further, the upper portion 615 and/or the lower portion 610 of the body may include an empty space through which air may pass.

In FIG. 22, the rotating polygonal mirror 600 is illustrated as being a hexahedron in a shape of a tetragonal column including four reflective surfaces 620, but the number of the reflective surfaces 620 of the rotating polygonal mirror 600 is not necessarily four, and the rotating polygonal mirror 600 is not necessarily a hexahedron in the shape of a tetragonal column.

Further, in order to detect a rotation angle of the rotating polygonal mirror 600, the LiDAR device may further include an encoder unit. In addition, the LiDAR device may control the operation of the rotating polygonal mirror 600 using the detected rotation angle. In this case, the encoder unit may be included in the rotating polygonal mirror 600 and may be disposed to be spaced apart from the rotating polygonal mirror 600.

A required field of view (FOV) of the LiDAR device may be different depending on the application. For example, in a case of a fixed LiDAR device for three-dimensional (3D) mapping, the widest viewing angle may be required in vertical and horizontal directions, and in a case of a LiDAR device disposed in a vehicle, a relatively narrow viewing angle may be required in the vertical direction while a relatively wide viewing angle is required in the horizontal direction. In addition, in a case of a LiDAR device disposed in a drone, the widest viewing angle may be required in the vertical and horizontal directions.

Further, the scan region of the LiDAR device may be determined on the basis of the number of reflective surfaces of the rotating polygonal mirror, and the viewing angle of the LiDAR device may be determined accordingly. Thus, the number of reflective surfaces of the rotating polygonal mirror may be determined on the basis of the required viewing angle of the LiDAR device.

Figure 23:
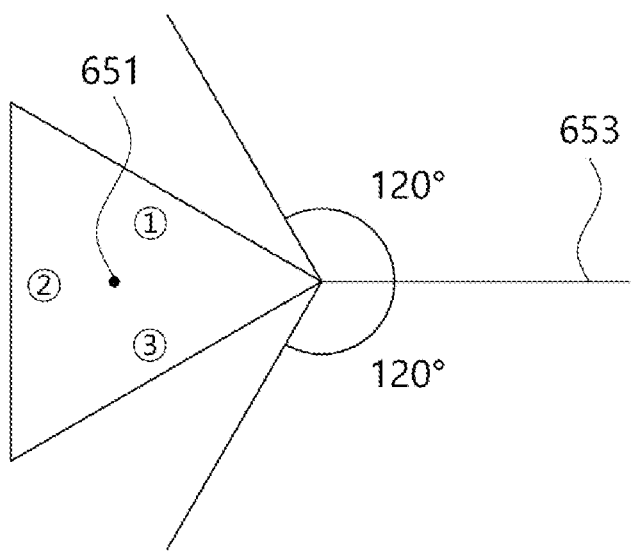
FIG. 23 is a top view for describing a viewing angle of a rotating polygonal mirror when the number of reflective surfaces is three and a shape of upper and lower portions of a body is an equilateral triangle shape.
Figure 24:
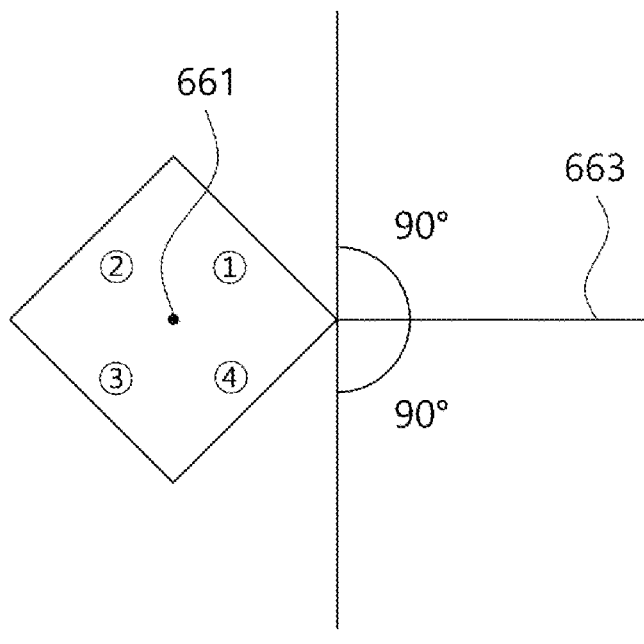
FIG. 24 is a top view for describing a viewing angle of a rotating polygonal mirror when the number of reflective surfaces is four and a shape of upper and lower portions of a body is a square shape.
Figure 25:
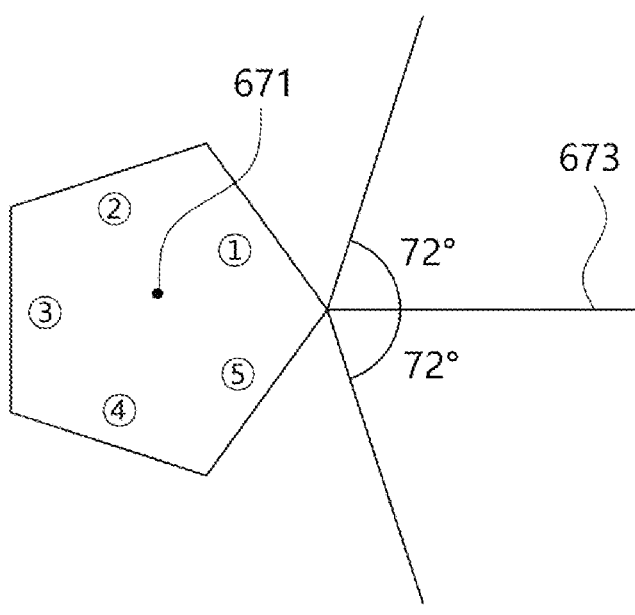
FIG. 25 is a top view for describing a viewing angle of a rotating polygonal mirror when the number of reflective surfaces is five and a shape of upper and lower portions of a body is a regular pentagonal shape.

FIGS. 23 to 25 are diagrams illustrating the relationship between the number of reflective surfaces and the viewing angle.

Cases of three, four, and five reflective surfaces are respectively illustrated in FIGS. 23 to 25, but the number of reflective surfaces is not determined, and when the number of reflective surfaces is different from the above, it may be easily calculated by analogizing the following description. Further, in FIGS. 22 to 24, a case in which the upper and lower portions of the body have a regular polygonal shape is described, but even when the upper and lower portions of the body do not have the regular polygonal shape, it may be easily calculated by analogizing the following description.

FIG. 23 is a top view for describing a viewing angle of a rotating polygonal mirror 650 in which the number of reflective surfaces is three and the shape of each of the upper and lower portions of the body is an equilateral triangle shape.

Referring to FIG. 23, a laser 653 may be incident in a direction consistent with a rotation axis 651 of the rotating polygonal mirror 650. Here, since the upper portion of the rotating polygonal mirror 650 has an equilateral triangle shape, an angle formed by the three reflective surfaces may be 60 degrees. In addition, referring to FIG. 23, when the rotating polygonal mirror 650 is positioned to slightly rotate in a clockwise direction, the laser may be reflected upward in the drawing, and when the rotating polygonal mirror 650 is positioned to slightly rotate in a counterclockwise direction, the laser is reflected downward in the drawing. Thus, when a path of the reflected laser is calculated with reference to FIG. 23, the maximum viewing angle of the rotating polygonal mirror may be obtained.

For example, when the laser is reflected through a first reflective surface of the rotating polygonal mirror 650, the reflected laser may be reflected upward at an angle of 120 degrees with respect to the incident laser 653. In addition, when the laser is reflected through a third reflective surface of the rotating polygonal mirror 650, the reflected laser may be reflected downward at an angle of 120 degrees with respect to the incident laser 653.

Thus, when the number of the reflective surfaces of the rotating polygonal mirror 650 is three, and the shape of each of the upper and lower portions of the body is an equilateral triangle shape, the maximum viewing angle of the rotating polygonal mirror may be 240 degrees.

FIG. 24 is a top view for describing a viewing angle of a rotating polygonal mirror 660 in which the number of reflective surfaces is four and the shape of each of the upper and lower portions of the body is a square shape.

Referring to FIG. 24, a laser 663 may be incident in a direction consistent with a rotation axis 661 of the rotating polygonal mirror 660. Here, since the upper portion of the rotating polygonal mirror 660 has a square shape, an angle formed by the four reflective surfaces may each be 90 degrees. In addition, referring to FIG. 24, when the rotating polygonal mirror 660 is positioned to slightly rotate in a clockwise direction, the laser may be reflected upward in the drawing, and, when the rotating polygonal mirror 660 is positioned to slightly rotate in a counterclockwise direction, the laser is reflected downward in the drawing. Thus, when a path of the reflected laser is calculated with reference to FIG. 24, the maximum viewing angle of the rotating polygonal mirror 660 may be obtained.

For example, when the laser is reflected through a first reflective surface of the rotating polygonal mirror 660, the reflected laser may be reflected upward at an angle of 90 degrees with respect to the incident laser 663. In addition, when the laser is reflected through a fourth reflective surface of the rotating polygonal mirror 660, the reflected laser may be reflected downward at an angle of 90 degrees with respect to the incident laser 663.

Thus, when the number of the reflective surfaces of the rotating polygonal mirror 660 is four, and the shape of each of the upper and lower portions of the body is a square shape, the maximum viewing angle of the rotating polygonal mirror 660 may be 180 degrees.

FIG. 25 is a top view for describing a viewing angle of a rotating polygonal mirror 670 in which the number of reflective surfaces is five and the shape of each of the upper and lower portions of the body is a regular pentagonal shape.

Referring to FIG. 25, a laser 673 may be incident in a direction consistent with a rotation axis 671 of the rotating polygonal mirror 670. Here, since the upper portion of the rotating polygonal mirror 670 has a regular pentagonal shape, an angle formed by the five reflective surfaces may each be 108 degrees. In addition, referring to FIG. 25, when the rotating polygonal mirror 670 is positioned to slightly rotate in a clockwise direction, the laser may be reflected upward in the drawing, and, when the rotating polygonal mirror 670 is positioned to slightly rotate in a counterclockwise direction, the laser is reflected downward in the drawing. Thus, when a path of the reflected laser is calculated with reference to FIG. 25, the maximum viewing angle of the rotating polygonal mirror may be obtained.

For example, when the laser is reflected through a first reflective surface of the rotating polygonal mirror 670, the reflected laser may be reflected upward at an angle of 72 degrees with respect to the incident laser 673. In addition, when the laser is reflected through a fifth reflective surface of the rotating polygonal mirror 670, the reflected laser may be reflected downward at an angle of 72 degrees with respect to the incident laser 673.

Thus, when the number of the reflective surfaces of the rotating polygonal mirror 670 is five, and the shape of each of the upper and lower portions of the body is a regular pentagonal shape, the maximum viewing angle of the rotating polygonal mirror may be 144 degrees.

As a result, referring to FIGS. 23 to 25 described above, in a case in which the number of reflective surfaces of the rotating polygonal mirror is N, and each of the upper and lower portions of the body has an N-polygon, when an inner angle of the N-polygon is referred to as a theta, the maximum viewing angle of the rotating polygonal mirror may be 360 degrees-2theta.

However, the above-described viewing angle of the rotating polygonal mirror is only the calculated maximum value, and thus, a viewing angle determined by the rotating polygonal mirror in the LiDAR device may be less than the calculated maximum value. Further, in this case, the LiDAR device may use only a portion of each of the reflective surfaces of the rotating polygonal mirror for scanning.

When a scanning unit of the LiDAR device includes a rotating polygonal mirror, the rotating polygonal mirror may be used to irradiate a laser emitted from a laser emitting unit toward a scan region of the LiDAR device, and may also be used for a detecting unit to receive the laser reflected from an object existing on the scan region.

Here, a portion of each of the reflective surfaces of the rotating polygonal mirror, which is used to irradiate the emitted laser to the scan region of the LiDAR device, will be referred to as an irradiated portion. In addition, a portion of each of the reflective surfaces of the rotating polygonal mirror, which is used for the detecting unit to receive the laser reflected from the object existing on the scan region, will be referred to as a light-receiving portion.

Figure 26:
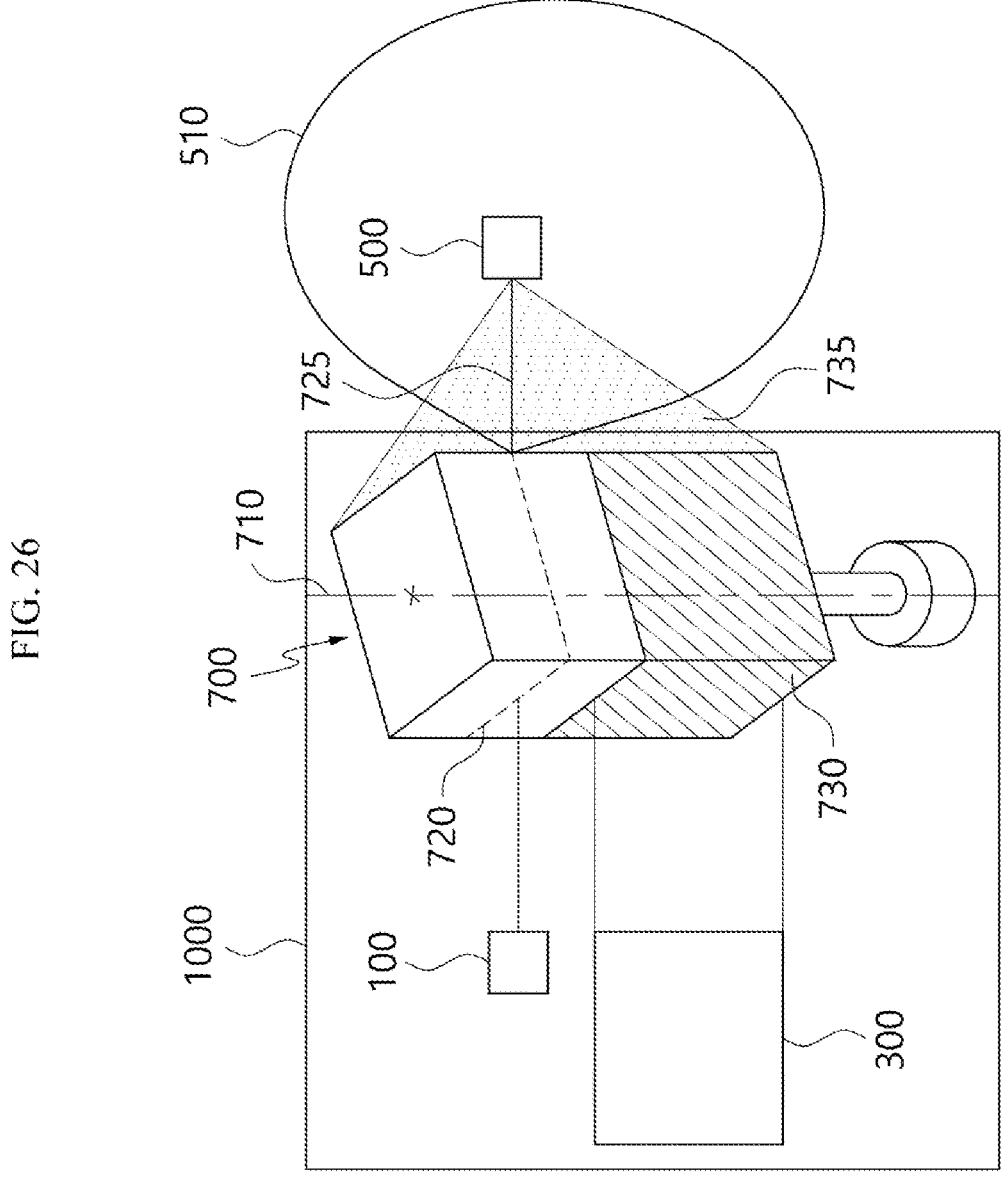
FIG. 26 is a diagram for describing an irradiated portion and a light-receiving portion of a rotating polygonal mirror according to one embodiment.

FIG. 26 is a diagram for describing an irradiated portion and a light-receiving portion of a rotating polygonal mirror according to one embodiment.

Referring to FIG. 26, a laser emitted from the laser emitting unit 100 may have a point-shaped irradiation region and may be incident on each of reflective surfaces of a rotating polygonal mirror 700. However, although not illustrated in FIG. 26, the laser emitted from the laser emitting unit 100 may have a line- or planar-shaped irradiation region.

When the laser emitted from the laser emitting unit 100 has a point-shaped irradiation region, in the rotating polygonal mirror 700, an irradiated portion 720 may have a linear shape formed by connecting a point, at which the emitted laser meets the rotating polygonal mirror, in a rotational direction of the rotating polygonal mirror. Thus, in this case, the irradiated portion 720 of the rotating polygonal mirror 700 may be positioned on each of the reflective surfaces in a linear shape in a direction perpendicular to a rotation axis 710 of the rotating polygonal mirror 700.

Further, a laser 725, which is irradiated from the irradiated portion 720 of the rotating polygonal mirror 700 and irradiated to a scan region 510 of the LiDAR device 1000, may be reflected from an object 500 existing on a scan region 510, and a laser 735 reflected from the object 500 may be reflected in a larger range than an irradiated laser 725. Thus, the laser 735 reflected from the object 500 may be parallel to the irradiated laser 725 and may be received by the LiDAR device 1000 in a wider range.

At this point, the laser 735 reflected from the object 500 may be transmitted in a larger size than the reflective surface of the rotating polygonal mirror 700. Meanwhile, a light-receiving portion 730 of the rotating polygonal mirror 700 is a portion that used for the detecting unit 300 to receive the laser 735 reflected from the object 500 and may be a portion of the reflective surface that is less in size than the reflective surface of the rotating polygonal mirror 700.

For example, as illustrated in FIG. 26, when the laser 735 reflected from the object 500 is transmitted toward the detecting unit 300 through the rotating polygonal mirror 700, a portion of the reflective surface of the rotating polygonal mirror 700, which reflects the reflected laser 735 so as to be transmitted toward the detecting unit 300, may be the light-receiving portion 730. Thus, the light-receiving portion 730 of the rotating polygonal mirror 700 may be a portion formed by extending the portion of the reflective surface, which reflects the laser 735 so as to be transmitted toward the detecting unit 300, in a rotational direction of the rotating polygonal mirror 700.

Further, when a light condensing lens is further included between the rotating polygonal mirror 700 and the detecting unit 300, the light-receiving portion 730 of the rotating polygonal mirror 700 may be a portion formed by extending the portion of the reflective surface, which reflects the laser 735 so as to be transmitted toward the light condensing lens, in the rotational direction of the rotating polygonal mirror 700.

Although it is illustrated in FIG. 26 that the irradiated portion 720 and the light-receiving portion 730 of the rotating polygonal mirror 700 are spaced apart from each other, the irradiated portion 720 and the light-receiving portion 730 of the rotating polygonal mirror 700 may partially overlap each other, and the irradiated portion 720 may be included in the light-receiving portion 730.

Further, according to one embodiment, the steering component 230 may include an optical phased array (OPA) or the like in order to change a phase of an emitted laser, and change an irradiation direction accordingly, but the present disclosure is not limited thereto.

A LiDAR device according to an embodiment may include an optic unit configured to direct a laser beam emitted from a laser emitting unit to an object.

The optic unit may include a beam collimation and steering component (BCSC) configured to collimate and steer a laser beam emitted from a laser beam output unit. The BCSC may include one component or a plurality of components.

Figure 27:
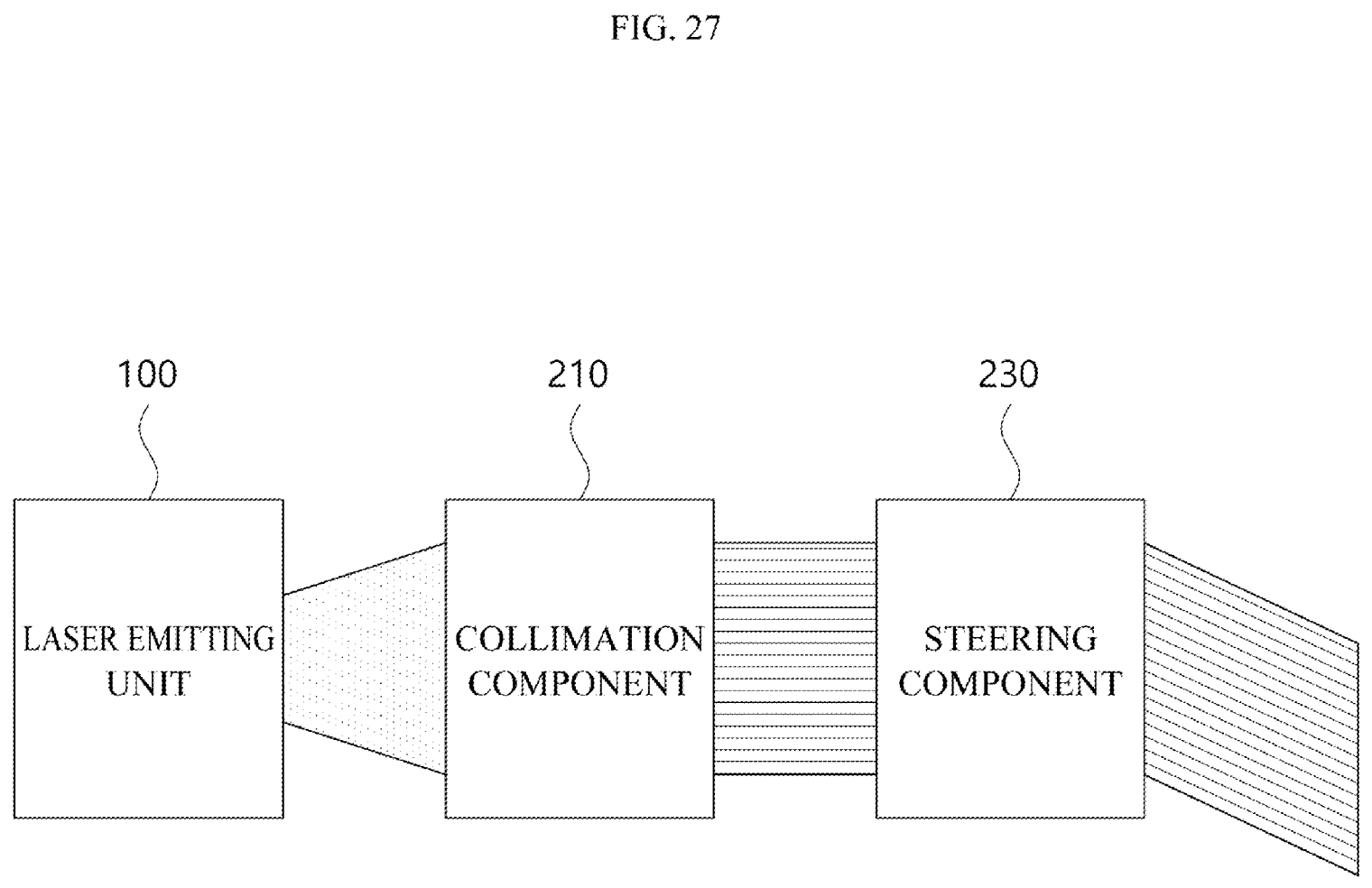

FIG. 27 is a diagram illustrating an optic unit according to an embodiment.

Referring to FIG. 27, the optic unit according to an embodiment may include a plurality of components. For example, the optic unit may include a collimation component 210 and a steering component 230.

According to an embodiment, the collimation component 210 may serve to collimate a beam emitted from a laser emitting unit 100, and the steering component 230 may serve to steer a collimated beam emitted from the collimation component 210. As a result, the laser beam emitted from the optic unit may travel in a predetermined direction.

The collimation component 210 may be a microlens or a metasurface.

When the collimation component 210 is a microlens, a microlens array may be disposed on one side of a substrate or on both sides of a substrate.

When the collimation component 210 is a metasurface, a laser beam may be collimated by a nanopattern formed by a plurality of nanopillars included in the metasurface.

The steering component 230 may be a microlens, a microprism, or a metasurface.

When the steering component 230 is a microlens, a microlens array may be disposed on one side of a substrate or on both sides of a substrate.

When the steering component 230 is a microprism, a laser beam may be steered by the angle of the microprism.

When the steering component 230 is a metasurface, a laser beam may be steered by a nanopattern formed by a plurality of nanopillars included in the metasurface.

According to one embodiment, when the optic unit includes a plurality of components, it may be necessary to correctly arrange the plurality of components. At this point, the collimation component and the steering component may be properly disposed using an alignment mark. Further, a printed circuit board (PCB), the VCSEL array, the collimation component, and the steering component may be correctly disposed using the alignment mark.

For example, the VCSEL array and the collimation component may be correctly disposed by inserting the alignment mark into an edge portion of the VCSEL array or between the VCSEL units included in the VCSEL array.

Further, for example, the collimation component and the steering component may be correctly disposed by inserting the alignment mark into an edge portion of the collimation component or between the collimation component and the steering component.

Figure 28:
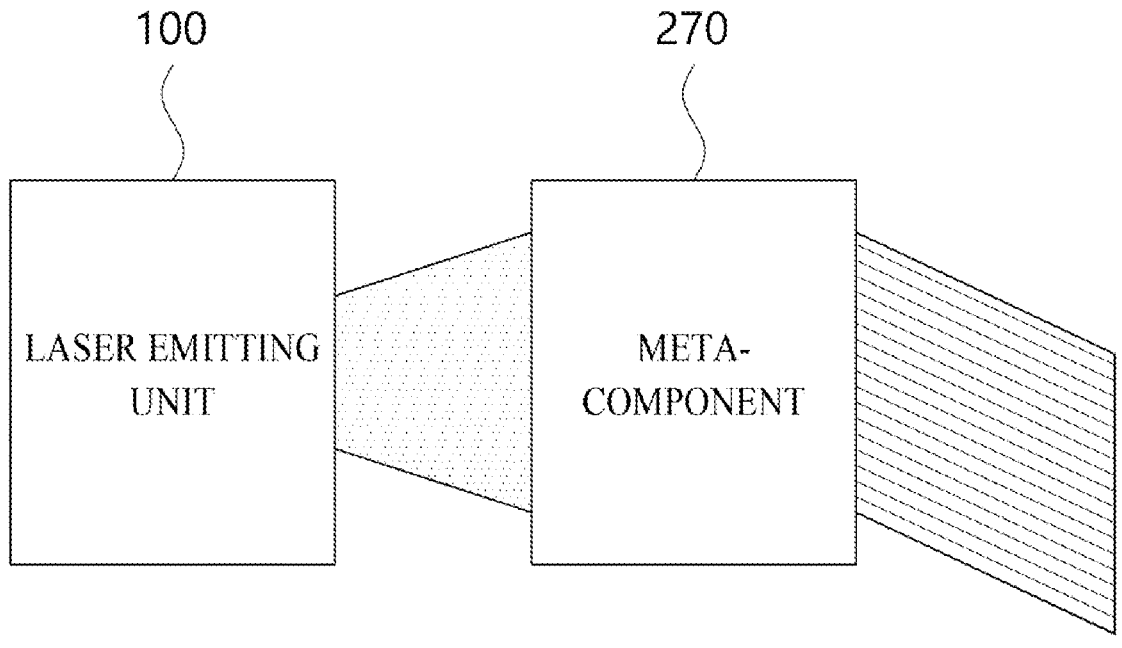
FIG. 28 is a diagram for describing an optic unit according to one embodiment.

FIG. 28 is a diagram illustrating an optic unit according to an embodiment.

Referring to FIG. 28, the optic unit according to an embodiment may include one single component. For example, the optic unit may include a meta-component 270.

According to an embodiment, the meta-component 270 may collimate or steer a laser beam emitted from a laser emitting unit 100.

For example, the meta-component 270 may include a plurality of metasurfaces. One metasurface may collimate a laser beam emitted from the laser emitting unit 100, and another metasurface may steer a collimated laser beam. This will be described in detail below with reference to FIG. 23.

Alternatively, for example, the meta-component 270 may include one metasurface, which may collimate and steer a laser beam emitted from the laser emitting unit 100. This will be described in detail below with reference to FIG. 24.

Figure 29:
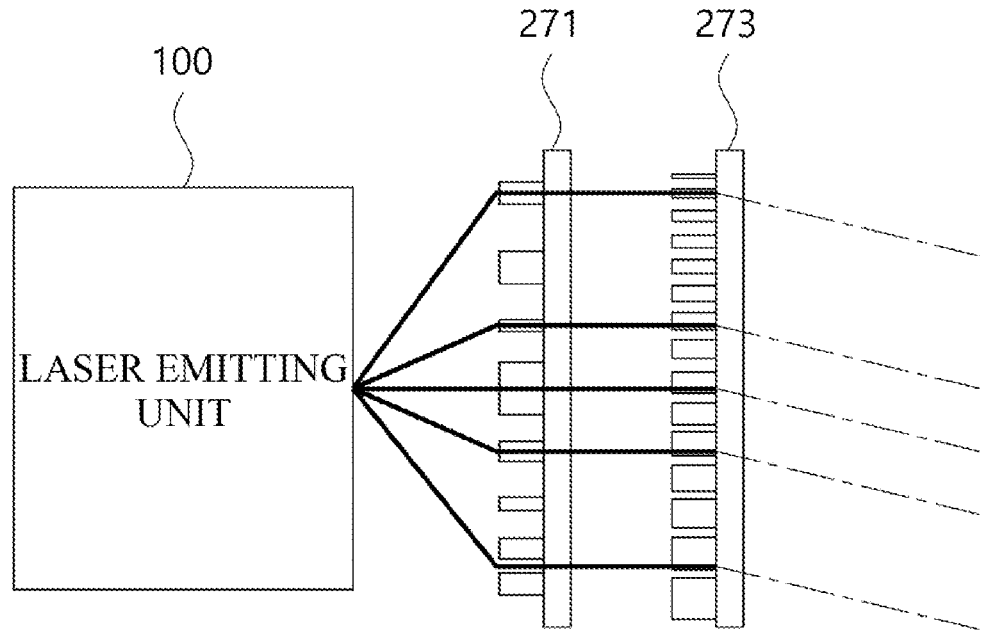
FIG. 29 is a diagram for describing a meta component according to one embodiment.

FIG. 29 is a diagram illustrating a meta-component according to an embodiment.

Referring to FIG. 29, a meta-component 270 according to an embodiment may include a plurality of metasurfaces 271 and 273. For example, the meta-component 270 may include a first metasurface 271 and a second metasurface 273.

The first metasurface 271 may be disposed in a direction in which a laser beam is emitted from a laser emitting unit 100. The first metasurface 271 may include a plurality of nanopillars. The first metasurface 271 may form a nanopattern using the plurality of nanopillars. The first metasurface 271 may utilize the formed nanopattern to collimate a laser beam emitted from the laser emitting unit 100.

The second metasurface 273 may be disposed in a direction in which a laser beam is emitted from the first metasurface 271. The second metasurface 273 may include a plurality of nanopillars. The second metasurface 273 may form a nanopattern using the plurality of nanopillars. The second metasurface 273 may steer a laser beam emitted from the laser emitting unit 100 according to the formed nanopattern. For example, as shown in FIG. 23, the second metasurface 273 may steer the laser beam in a specific direction according to a change rate of the widths W of the plurality of nanopillars. Also, the second metasurface 273 may steer the laser beam in a specific direction according to the pitches P, the heights H, and the number per unit length of nanopillars.

Figure 30:
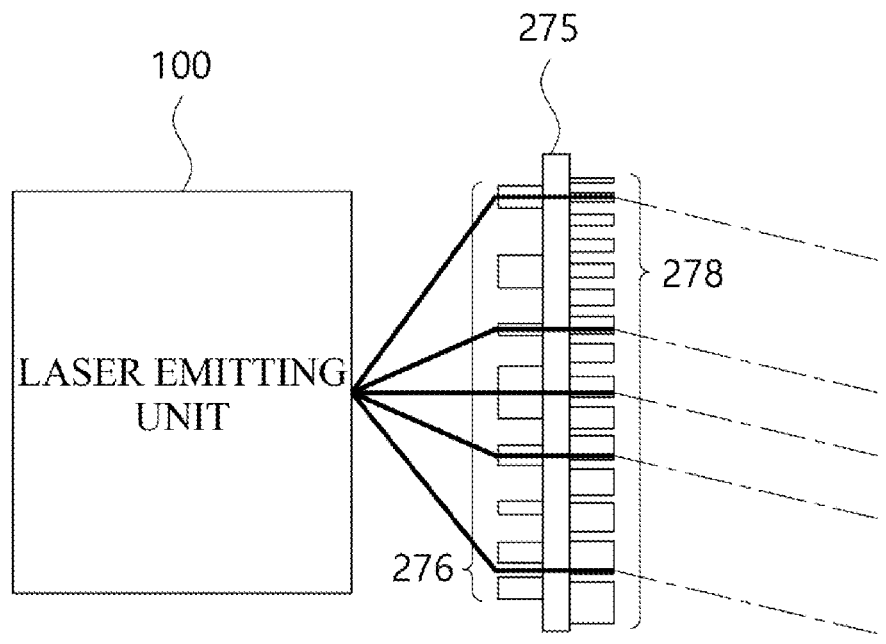
FIG. 30 is a diagram for describing a meta component according to another embodiment.

FIG. 30 is a diagram illustrating a meta-component according to another embodiment.

Referring to FIG. 30, a meta-component 270 according to an embodiment may include one metasurface 274.

The metasurface 275 may include a plurality of nanopillars on both sides. For example, the metasurface 275 may include a first nanopillar set 276 on a first side and a second nanopillar set 278 on a second side.

The metasurface 275 may collimate a laser beam emitted from a laser emitting unit 100 and then steer the collimated laser beam using a plurality of nanopillars forming a nanopattern on each of the sides.

For example, the first nanopillar set 276 disposed on one side of the metasurface 275 may form a nanopattern. A laser beam emitted from the laser emitting unit 100 may be collimated by the nanopattern formed by the first nanopillar set 276. The second nanopillar set 278 disposed on the other side of the metasurface 275 may form a nanopattern. A laser beam having passed through the first nanopillar set 276 may be steered in a specific direction by the nanopattern formed by the second nanopillar set 278.

Figure 31:
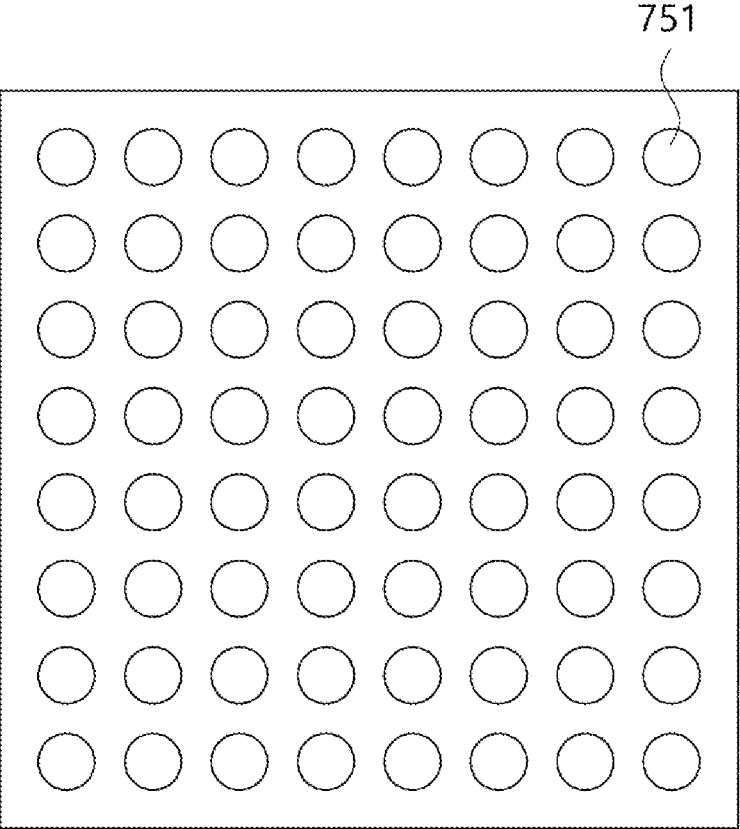
FIG. 31 is a diagram for describing a single-photon avalanche diode (SPAD) array according to one embodiment.

FIG. 31 is a diagram for describing a SPAD array according to one embodiment.

Referring to FIG. 31, the detecting unit 300 according to one embodiment may include a SPAD array 750. FIG. 31 illustrates a SPAD array in an 8×8 matrix, but the present disclosure is not limited thereto, and the SPAD array in a 10×10 matrix, a 12×12 matrix, a 24×24 matrix, a 64×64 matrix, and the like may be used.

The SPAD array 750 according to one embodiment may include a plurality of SPADs 751. For example, the plurality of SPADs 751 may be disposed in a matrix structure, but is not limited thereto, and may be disposed in a circular structure, an elliptical structure, a honeycomb structure, or the like.

When a laser beam is incident on the SPAD array 750, photons may be detected due to an avalanche phenomenon. According to one embodiment, results from the SPAD array 750 may be accumulated in the form of a histogram.

Figure 32:
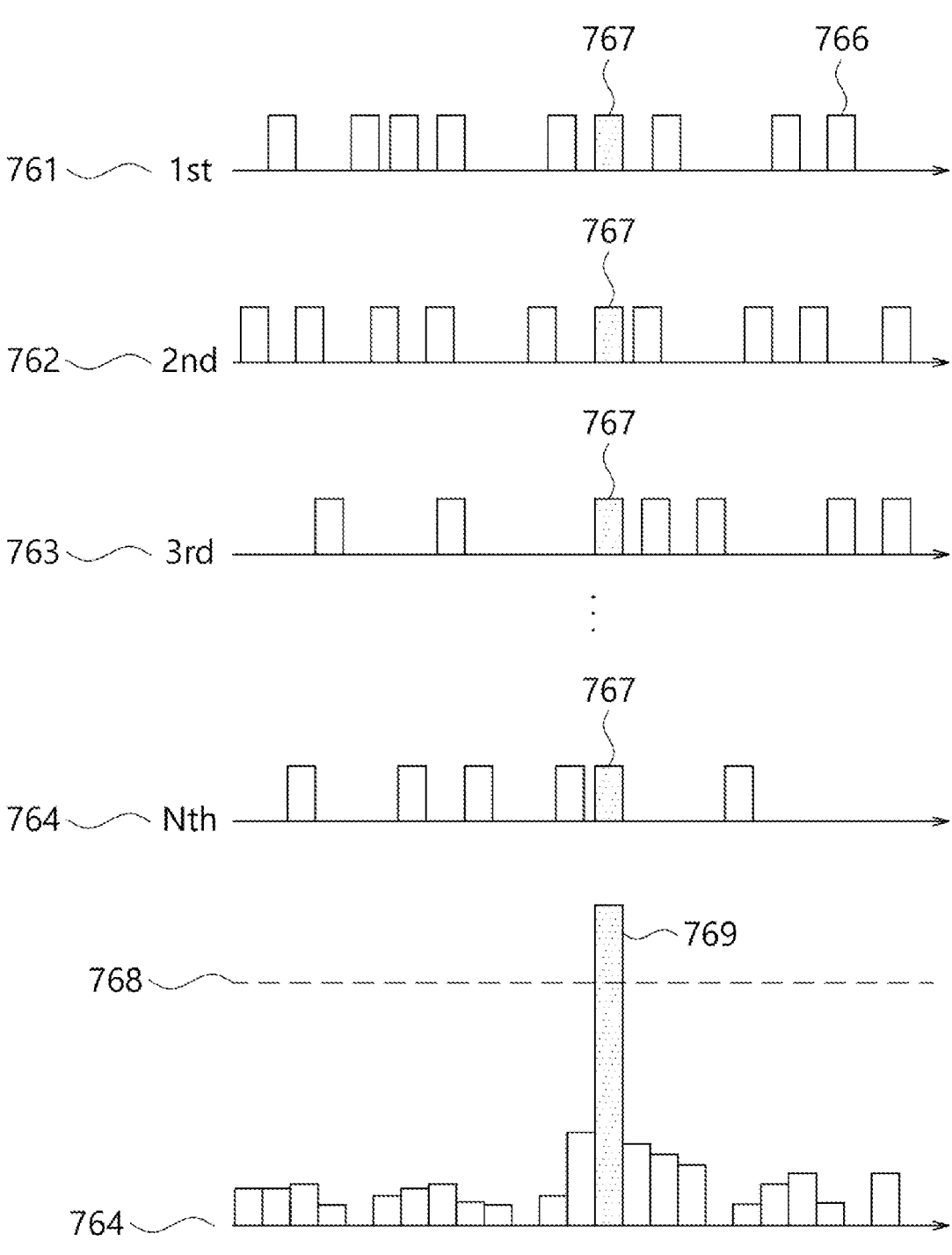
FIG. 32 is a diagram for describing a histogram for a SPAD according to one embodiment.

FIG. 32 is a diagram for describing a histogram for a SPAD according to one embodiment.

Referring to FIG. 32, the SPAD 751 according to one embodiment may detect photons. When the SPAD 751 detects photons, signals 766 and 767 may be generated.

A recovery time may be required for the SPAD 751 to return to a state capable of detecting photons again after detecting photons. When the SPAD 751 detects photons and the recovery time has not elapsed, even when photons are incident on the SPAD 751 at this time, the SPAD 751 is unable to detect the photons. Accordingly, a resolution of the SPAD 751 may be determined by the recovery time.

According to one embodiment, the SPAD 751 may detect photons for a predetermined period of time after a laser beam is emitted from a laser emitting unit. At this point, the SPAD 751 may detect photons for a cycle of predetermined time. For example, the SPAD 751 may detect photons several times according to a time resolution of the SPAD 751 during the cycle. At this point, the time resolution of the SPAD 751 may be determined by the recovery time of the SPAD 751.

According to one embodiment, the SPAD 751 may detect photons reflected from an object and other photons. For example, the SPAD 751 may generate the signal 767 when detecting the photons reflected from the object.

Further, for example, the SPAD 751 may generate the signal 766 when detecting photons other than the photons reflected from the object. In this case, the photons other than the photons reflected from the object may be sunlight, a laser beam reflected from a window, and the like.

According to one embodiment, the SPAD 751 may detect photons for a cycle of predetermined time after the laser beam is emitted from the laser emitting unit.

For example, the SPAD 751 may detect photons for a first cycle after a first laser beam is emitted from the laser emitting unit. At this point, the SPAD 751 may generate a first detection signal 761 after detecting the photons.

Further, for example, the SPAD 751 may detect photons for a second cycle after a second laser beam is emitted from the laser emitting unit. At this point, the SPAD 751 may generate a second detection signal 762 after detecting the photons.

Further, for example, the SPAD 751 may detect photons for a third cycle after a third laser beam is emitted from the laser emitting unit. At this point, the SPAD 751 may generate a third detection signal 763 after detecting the photons.

Further, for example, the SPAD 751 may detect photons for an Nth cycle after an Nth laser beam is emitted from the laser emitting unit. At this point, the SPAD 751 may generate an Nth detection signal 764 after detecting the photons.

Here, each of the first detection signal 761, the second detection signal 762, the third detection signal 763, . . . , and the Nth detection signal 764 may include the signal 767 generated by detecting photons reflected from the object or the signal 766 generated by detecting photons other than the photon reflected by the object.

In this case, the Nth detection signal 764 may be a photon detection signal generated for the Nth cycle after the Nth laser beam is emitted. For example, N may be 5, 10, 20, 30, 40, 50, 60, 70, 80, 90, 100, 200, 300, or the like.

The signals generated by the SPAD 751 may be accumulated in the form of a histogram. The histogram may have a plurality of histogram bins. The signals generated by the SPAD 751 may be accumulated in the form of a histogram to respectively correspond to the histogram bins.

For example, the histogram may be formed by accumulating signals generated by one SPAD 751, or may be formed by accumulating signals generated by the plurality of SPADs 751.

For example, a histogram 765 may be formed by accumulating the first detection signal 761, the second detection signal 762, the third detection signal 763, . . . , and the Nth detection signal 764. In this case, the histogram 765 may include a signal generated due to photons reflected from the object or a signal generated due to the other photons.

In order to obtain distance information of the object, it is necessary to extract a signal generated due to photons reflected from the object from the histogram 765. The signal generated due to the photons reflected from the object may be greater in amount and more regular than the signal generated due to the other photons.

At this point, the signal generated due to the photons reflected from the object may be regularly present at a specific time within the cycle. On the other hand, the signal generated due to sunlight may be small in amount and irregularly present.

There is a high possibility that a signal having a large accumulation amount of the histogram at a specific time is a signal generated due to photons reflected from the object. Accordingly, of the accumulated histogram 765, a signal having a large accumulation amount may be extracted as a signal generated due to photons reflected from the object.

For example, of the histogram 765, a signal having the highest value may be simply extracted as a signal generated due to photons reflected from the object. Further, for example, of the histogram 765, a signal having a value greater than or equal to a predetermined amount 768 may be extracted as a signal generated due to photons reflected from the object.

In addition to the method described above, there may be various algorithms that may extract as a signal, which is generated due to photons reflected from the object, from the histogram 765.

The signal generated due to photons reflected from the object is extracted from the histogram 765, and then, based on a generation time of the corresponding signal, a reception time of the photons, or the like, the distance information of the object may be calculated.

For example, the signal extracted from the histogram 765 may be a signal at one scan point. At this point, one scan point may correspond to one SPAD.

For another example, the signals extracted from the plurality of histograms may be signals at one scan point. At this point, one scan point may correspond to the plurality of SPADs.

According to another embodiment, the signals extracted from the plurality of histograms may be calculated as a signal at one scan point by applying weights thereto. At this point, the weights may be determined by a distance between the SPADs.

For example, a signal at a first scan point may be calculated by applying a weight of 0.8 to a signal by a first SPAD, applying a weight of 0.6 to a signal by a second SPAD, applying a weight of 0.4 to a signal by a third SPAD, and applying a weight of 0.2 to a signal by a fourth SPAD.

When the signals extracted from the plurality of histograms are calculated as a signal at one scan point by applying weights thereto, it is possible to obtain an effect of accumulating the histogram multiple times with one accumulation of the histogram. Thus, a scan time may be reduced, and an effect of reducing the time to obtain the entire image may be derived.

According to still another embodiment, the laser emitting unit may emit a laser beam to be addressable. Alternatively, the laser emitting unit may emit a laser beam to be addressable for each VCSEL unit.

For example, the laser emitting unit may emit a laser beam from a VCSEL unit in a first row and first column one time, and then emit a laser beam from a VCSEL unit in a first row and third column one time, and then emit a laser beam from a VCSEL unit in a second row and fourth column one time. As described above, the laser emitting unit may emit a laser beam from a VCSEL unit in an Ath row and Bth column N times, and then emit a laser beam from a VCSEL unit of a Cth row and Dth column M times.

At this point, the SPAD array may receive, among the laser beam emitted from the corresponding VCSEL unit, the laser beam reflected from the object.

For example, when the VCSEL unit in the first row and first column emits the laser beam N times in a sequence of emitting the laser beam by the laser emitting unit, a SPAD unit in a first row and first column corresponding to the first row and first column may receive the laser beam reflected from the object up to N times.

Further, for example, when the reflected laser beam should be accumulated N times in the histogram of the SPAD, and there are M VCSEL units in the laser emitting unit, it is possible to operate the M VCSEL units N times at once. Alternatively, it is possible to operate M VCSEL units one by one M*N times, and it is also possible to operate M VCSEL units for every five VCSEL units M*N/5 times.

Figure 33:
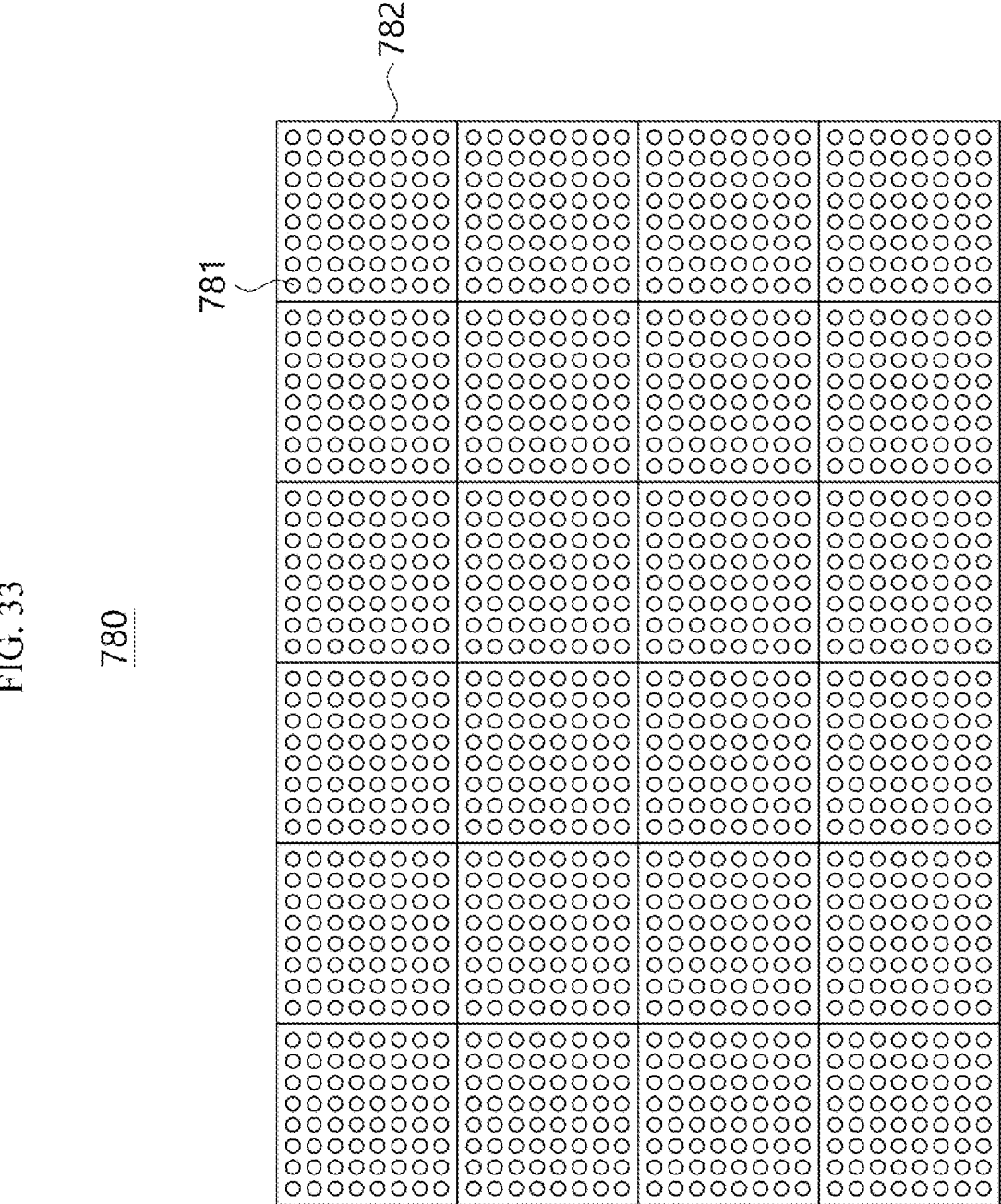
FIG. 33 is a diagram for describing silicon photomultipliers (SiPM) according to one embodiment.

FIG. 33 is a diagram for describing a SiPM according to one embodiment.

Referring to FIG. 33, the detecting unit 300 according to one embodiment may include a SiPM 780. The SiPM 780 according to one embodiment may include a plurality of microcells 781 and a plurality of microcell units 782. For example, each of the microcells may be a SPAD. For example, each of the microcell units 782 may be a SPAD array, which is a set of a plurality of SPADs.

The SiPM 780 according to one embodiment may include the plurality of microcell units 782. In FIG. 33, the SiPM 780 is illustrated as being formed by the microcell units 782 disposed in a 4×6 matrix, but is not limited thereto, and may be formed by the microcell units 782 disposed in a 10×10, 12×12, 24×24, or 64×64 matrix. Further, although the microcell units 782 may be disposed in a matrix structure, the present disclosure is not limited thereto, and the microcell units 782 may be disposed in a circular structure, an elliptical structure, a honeycomb structure, or the like.

When a laser beam is incident on the SiPM 780, photons may be detected due to an avalanche phenomenon. According to one embodiment, results from the SiPM 780 may be accumulated in the form of a histogram.

There are several differences between the histogram by the SiPM 780 and the histogram by the SPAD 751.

As described above, the histogram by the SPAD 751 may be formed by accumulating N detection signals formed by receiving the laser beam N times by one SPAD 751. In addition, the histogram by the SPAD 751 may be formed by accumulating X*Y detection signals formed by receiving the laser beam Y times by X SPADs 751.

On the other hand, the histogram by the SiPM 780 may be formed by accumulating signals generated by one microcell units 782, or may be formed by accumulating signals generated by the plurality of microcell units 782.

According to one embodiment, one microcell unit 782 may form a histogram by detecting photons reflected from the object after a first laser beam is emitted from the laser emitting unit.

For example, the histogram by the SiPM 780 may be formed by accumulating signals generated by detecting photons, which are reflected from the object, by the plurality of microcells included in one microcell unit 782.

According to another embodiment, the plurality of microcell units 782 may form a histogram by detecting photons reflected from the object after a first laser beam is emitted from the laser emitting unit.

For example, the histogram by the SiPM 780 may be formed by accumulating signals generated by detecting photons, which are reflected from the object, by the plurality of microcells included in the plurality of microcell units 782.

In the histogram by the SPAD 751, one SPAD 751 or a plurality of SPADs 751 requires that the laser emitting unit emits the laser beam N times. However, in the histogram formed by the SiPM 780, one microcell unit 782 or the plurality of microcell units 782 require that the laser emitting unit emits the laser beam only one time.

Accordingly, the time to accumulate the histogram may take longer in the histogram by the SPAD 751 than in the histogram by the SiPM 780. The histogram by the SiPM 780 is advantageous in that the histogram may be quickly formed with only one laser beam emission.

Figure 34:
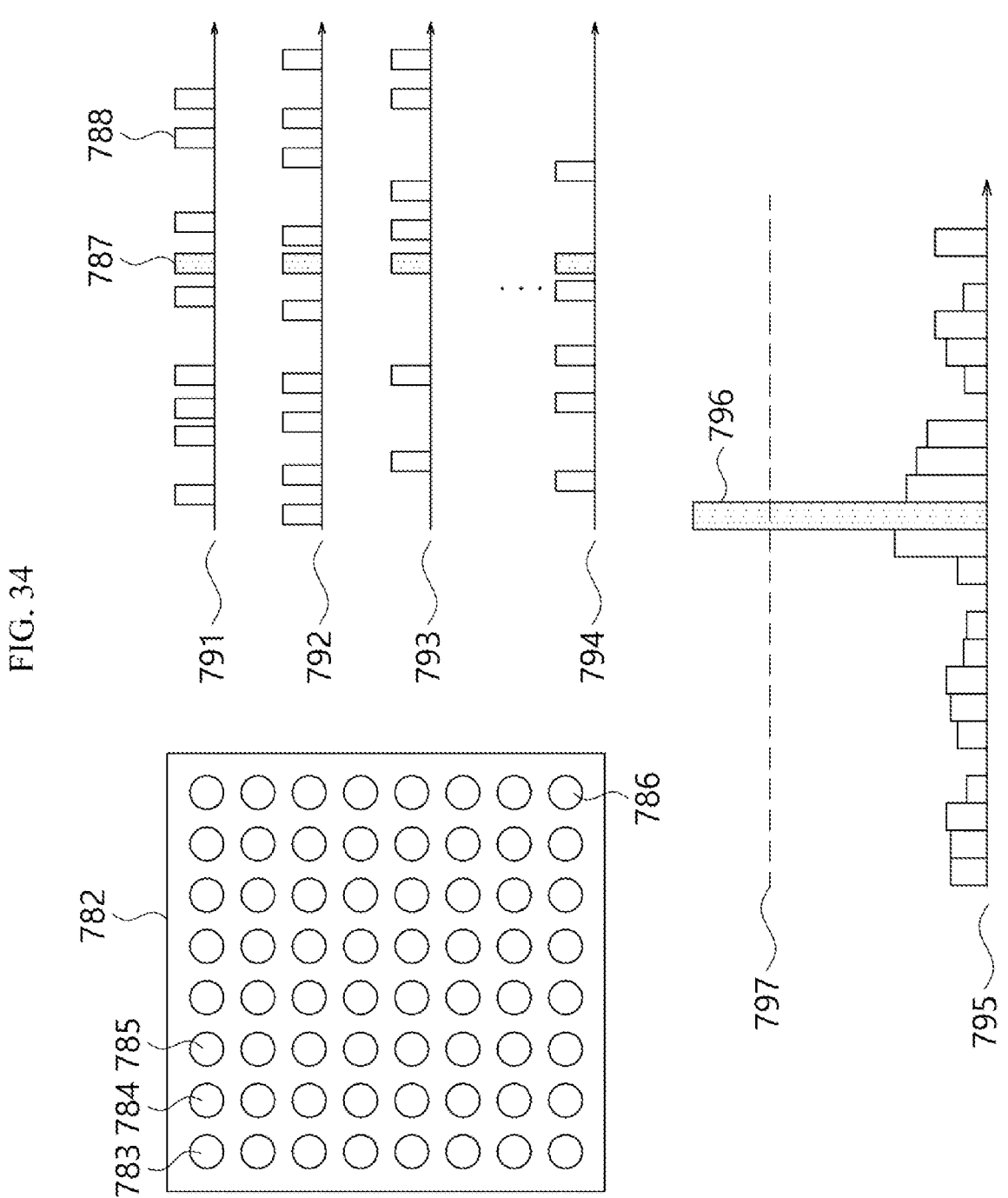
FIG. 34 is a diagram for describing a histogram of a SiPM according to one embodiment.

FIG. 34 is a diagram for describing a histogram of a SiPM according to one embodiment.

Referring to FIG. 34, the SiPM 780 according to one embodiment may detect photons. For example, the microcell unit 782 may detect photons. When the microcell unit 782 detects photons, signals 787 and 788 may be generated.

A recovery time may be required for the microcell unit 782 to return to a state capable of detecting photons again after detecting photons. When the microcell unit 782 detects photons and the recovery time has not elapsed, even when photons are incident on the microcell unit 782 at this time, the microcell unit 782 is unable to detect photons. Accordingly, a resolution of the microcell unit 782 may be determined by the recovery time.

According to one embodiment, the microcell unit 782 may detect photons for a predetermined period of time after the laser beam is emitted from the laser emitting unit. At this point, the microcell unit 782 may detect photons for a cycle of predetermined time. For example, the microcell unit 782 may detect photons several times according to a time resolution of the microcell unit 782 during the cycle. At this point, the time resolution of the microcell unit 782 may be determined by the recovery time of the microcell unit 782.

According to one embodiment, the microcell unit 782 may detect photons reflected from an object and other photons. For example, the microcell unit 782 may generate the signal 787 when detecting the photons reflected from the object.

Further, for example, the microcell unit 782 may generate the signal 788 when detecting photons other than the photons reflected from the object. In this case, the photons other than the photons reflected from the object may be sunlight, a laser beam reflected from a window, and the like.

According to one embodiment, the microcell unit 782 may detect photons for a cycle of predetermined time after the laser beam is emitted from the laser emitting unit.

For example, a first microcell 783 included in the microcell unit 782 may detect photons for a first cycle after a laser beam is emitted from the laser emitting unit. At this point, the first microcell 783 may generate a first detection signal 791 after detecting the photons.

Further, for example, a second microcell 784 included in the microcell unit 782 may detect photons for a first cycle after a laser beam is emitted from the laser emitting unit. At this point, the second microcell 784 may generate a second detection signal 792 after detecting the photons.

Further, for example, a third microcell 785 included in the microcell unit 782 may detect photons for a first cycle after a laser beam is emitted from the laser emitting unit. At this point, the third microcell 785 may generate a third detection signal 793 after detecting the photons.

Further, for example, an Nth microcell 786 included in the microcell unit 782 may detect photons for a first cycle after a laser beam is emitted from the laser emitting unit. At this point, the Nth microcell 786 may generate an Nth detection signal 794 after detecting the photons.

Here, each of the first detection signal 791, the second detection signal 792, the third detection signal 793, . . . , and the Nth detection signal 794 may include the signal 787 generated by detecting photons reflected from the object or the signal 788 generated by detecting photons other than the photon reflected by the object.

Here, the Nth detection signal 764 may be a photon detection signal of the Nth microcell included in the microcell unit 782. For example, N may be 5, 10, 20, 30, 40, 50, 60, 70, 80, 90, 100, 200, 300, or the like.

The signals generated by the microcells may be accumulated in the form of a histogram. The histogram may have a plurality of histogram bins. The signals generated by the microcells may be accumulated in the form of a histogram to respectively correspond to the histogram bins.

For example, the histogram may be formed by accumulating signals generated by one microcell units 782, or may be formed by accumulating signals generated by the plurality of microcell units 782.

For example, a histogram 795 may be formed by accumulating the first detection signal 791, the second detection signal 792, the third detection signal 793, . . . , and the Nth detection signal 794. In this case, the histogram 795 may include a signal generated due to photons reflected from the object or a signal generated due to the other photons.

In order to obtain distance information of the object, it is necessary to extract a signal generated due to photons reflected from the object from the histogram 795. The signal generated due to the photons reflected from the object may be greater in amount and more regular than the signal generated due to the other photons.

At this point, the signal generated due to the photons reflected from the object may be regularly present at a specific time within the cycle. On the other hand, the signal generated due to sunlight may be small in amount and irregularly present.

There is a high possibility that a signal having a large accumulation amount of the histogram at a specific time is a signal generated due to photons reflected from the object. Accordingly, of the accumulated histogram 795, a signal having a large accumulation amount may be extracted as a signal generated due to photons reflected from the object.

For example, of the histogram 795, a signal having the highest value may be simply extracted as a signal generated due to photons reflected from the object. Further, for example, of the histogram 795, a signal having a value greater than or equal to a predetermined amount 797 may be extracted as a signal generated due to photons reflected from the object.

In addition to the method described above, there may be various algorithms that may extract signals generated due to photons reflected from the object from the histogram 795.

The signal generated due to photons reflected from the object is extracted from the histogram 795, and then, based on a generation time of the corresponding signal, a reception time of the photons, or the like, the distance information of the object may be calculated.

According to still another embodiment, the laser emitting unit may emit a laser beam to be addressable. Alternatively, the laser emitting unit may emit a laser beam to be addressable for each VCSEL unit.

For example, the laser emitting unit may emit a laser beam from a VCSEL unit in a first row and first column one time, and then emit a laser beam from a VCSEL unit in a first row and third column one time, and then emit a laser beam from a VCSEL unit in a second row and fourth column one time. As described above, the laser emitting unit may emit a laser beam from a VCSEL unit in an Ath row and Bth column N times, and then emit a laser beam from a VCSEL unit of a Cth row and Dth column M times.

At this point, the SiPM may receive, among the laser beam emitted from the corresponding VCSEL unit, the laser beam reflected from the object.

For example, when the VCSEL unit in the first row and first column emits the laser beam N times in a sequence of emitting the laser beam by the laser emitting unit, a microcell unit in a first row and first column corresponding to the first row and first column of the VCSEL unit may receive the laser beam reflected from the object up to N times.

Further, for example, when the reflected laser beam should be accumulated N times in the histogram for the SiPM, and there are M VCSEL units in the laser emitting unit, it is possible to operate the M VCSEL units N times at once. Alternatively, it is possible to operate M VCSEL units one by one M*N times, and it is also possible to operate M VCSEL units for every five VCSEL units M*N/5 times.

The LiDAR may be implemented in various methods. For example, the LiDAR may be implemented using a flash method and a scanning method.

As described above, the flash method is a method using a laser beam that spreads toward an object through the divergence of the laser beam. In the flash method, since distance information of the object may be collected by illuminating a single laser pulse on an FOV, a resolution of a flash LiDAR may be determined by a detecting unit or a reception unit.

Further, as described above, the scanning method is a method of directing a laser beam emitted from a laser emitting unit in a specific direction. In the scanning method, since a laser beam is illuminated on a FOV using a scanner or a steering unit, a resolution of a scanning LiDAR may be determined by the scanner or the steering unit.

According to one embodiment, the LiDAR may be implemented in a mixed method of the flash method and the scanning method. In this case, the mixed method of the flash method and the scanning method may be a semi-flash method or a semi-scanning method. Alternatively, the mixed method of the flash method and the scanning method may be a quasi-flash method or a quasi-scanning method.

The semi-flash LiDAR or the quasi-flash LiDAR may refer to a similar-flash LiDAR rather than a full-flash LiDAR. For example, one unit of the laser emitting unit and one unit of the reception unit may operate in a flash LiDAR, but a plurality of units of the laser emitting unit and a plurality of units of the reception unit may be combined to operate as a similar-flash LiDAR rather than a full-flash LiDAR.

Further, for example, since a laser beam emitted from the laser emitting unit of either the semi-flash LiDAR or the quasi-flash LiDAR may pass through the steering unit, the semi-flash LiDAR or the quasi-flash LiDAR may be a similar-flash LiDAR rather than a full-flash LiDAR.

The semi-flash LiDAR or the quasi-flash LiDAR may overcome the disadvantage of the flash LiDAR. For example, there are problems in the flash LiDAR, such as, it is susceptible to an interference phenomenon between laser beams, a strong flash may be required to detect an object, and a detection range may not be limited.

However, since the laser beams pass through the steering unit, the semi-flash LiDAR or the quasi-flash LiDAR may overcome the interference phenomenon between the laser beams and control each laser emitting unit, so that the detection range may be controlled and the strong flash may not be required.

Figure 35:
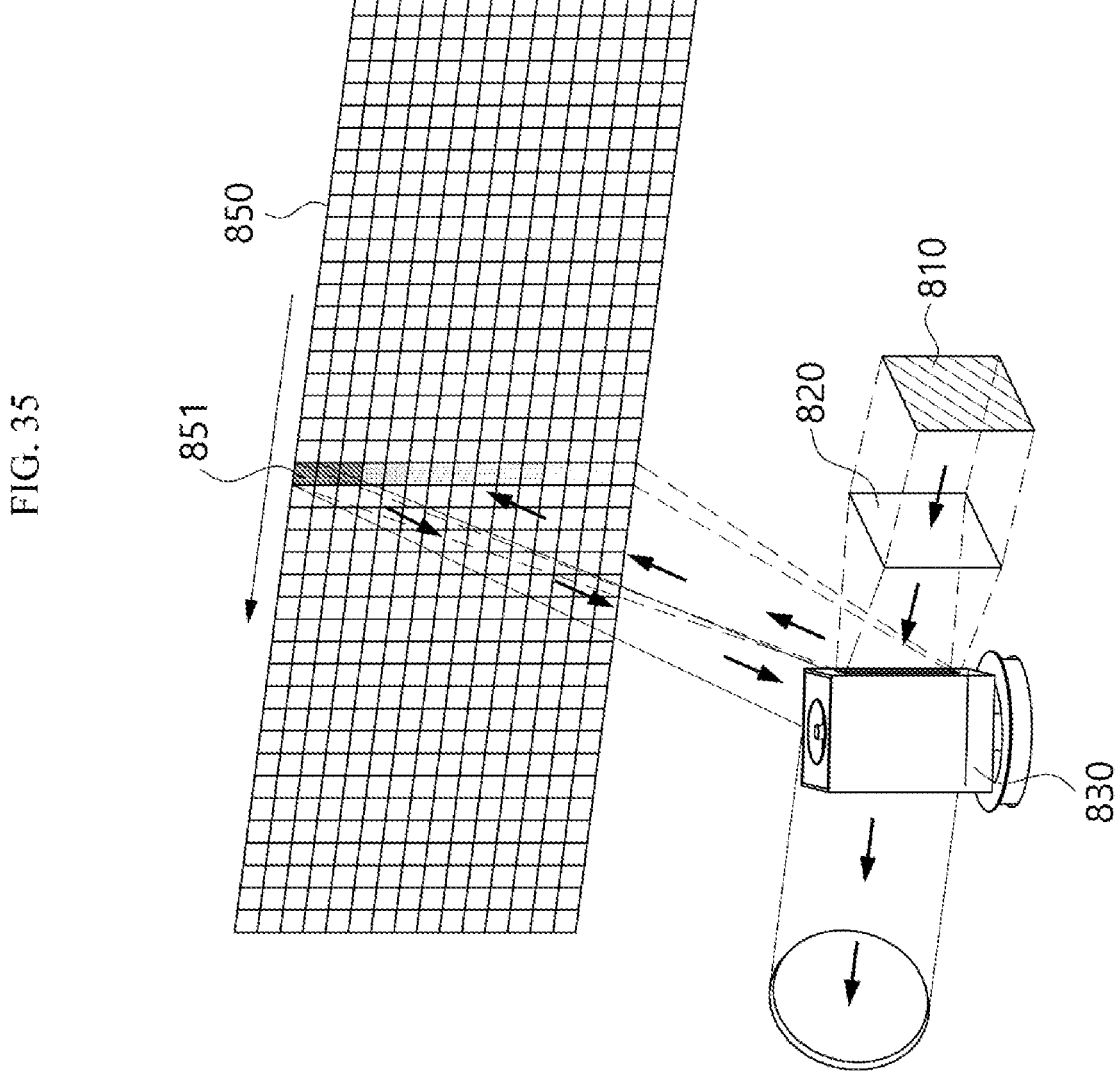
FIG. 35 is a diagram for describing a semi-flash LiDAR according to one embodiment.

FIG. 35 is a diagram for describing a semi-flash LiDAR according to one embodiment.

Referring to FIG. 35, a semi-flash LiDAR 800 according to one embodiment may include a laser emitting unit 810, a BCSC 820, a scanning unit 830, and a reception unit 840.

The semi-flash LiDAR 800 according to one embodiment may include the laser emitting unit 810. For example, the laser emitting unit 810 may include a VCSEL array. At this point, the laser emitting unit 810 may include a VCSEL array composed of units each including a plurality of VCSEL emitters.

The semi-flash LiDAR 800 according to one embodiment may include the BCSC 820. For example, the BCSC 820 may include a collimation component 210 and a steering component 230.

According to one embodiment, a laser beam emitted from the laser emitting unit 810 is collimated by the collimation component 210 of the BCSC 820, and the collimated laser beam may be steered through the steering component 230 of the BCSC 820.

For example, a laser beam emitted from a first VCSEL unit included in the laser emitting unit 810 may be collimated by a first collimation component and may be steered in a first direction by a first steering component.

For example, a laser beam emitted from a second VCSEL unit included in the laser emitting unit 810 may be collimated by a second collimation component, and may be steered in a second direction by a second steering component.

At this point, the VCSEL units included in the laser emitting unit 810 may be steered in different directions. Accordingly, unlike the flash method using the divergence of a single pulse, the laser beam of the laser emitting unit of the semi-flash LiDAR may be steered in a specific direction by the BCSC. Thus, the laser beam emitted from the laser emitting unit of the semi-flash LiDAR may have directionality due to the BCSC.

The semi-flash LiDAR 800 according to one embodiment may include the scanning unit 830. For example, the scanning unit 830 may include an optic unit 200. For example, the scanning unit 830 may include a mirror that reflects a laser beam.

For example, the scanning unit 830 may include a planar mirror, a polygonal mirror, a resonant mirror, a MEMS mirror, and a galvano mirror. Further, for example, the scanning unit 830 may include a polygonal mirror that rotates 360 degrees about one axis, and a nodding mirror that is repeatedly driven in a predetermined range about one axis.

The semi-flash LiDAR may include a scanning unit. Thus, unlike the flash method in which the entire image is obtained at once due to the divergence of a single pulse, the semi-flash LiDAR may scan an image of an object using the scanning unit.

In addition, the object may be randomly scanned by the laser emitted from the laser emitting unit of the semi-flash LiDAR. Thus, of the entire FOV, the semi-flash LiDAR may intensively scan only a desired region of interest.

The semi-flash LiDAR 800 according to one embodiment may include the reception unit 840. For example, the reception unit 840 may include a detecting unit 300. Further, for example, the reception unit 840 may be the SPAD array 750. Also, for example, the reception unit 840 may be the SiPM 780.

The reception unit 840 may include various sensor elements. For example, the reception unit 840 may include a PN photodiode, a phototransistor, a PIN photodiode, an avalanche photodiode (APD), a single-photon avalanche diode (SPAD), silicon photomultipliers (SiPM), a time-to-digital converter (TDC), a complementary metal-oxide-semiconductor (CMOS), a charge-coupled device (CCD), or the like, but the present disclosure is not limited thereto. At this point, the reception unit 840 may cause a histogram to be accumulated. For example, the reception unit 840 may detect a time point, at which a laser beam reflected from an object 850 is received, using the histogram.

The reception unit 840 according to one embodiment may include one or more optical elements. For example, the reception unit 840 may include an aperture, a microlens, a converging lens, a diffuser, or the like, but the present disclosure is not limited thereto.

Further, the reception unit 840 according to one embodiment may include one or more optical filters. The reception unit 840 may receive a laser reflected from an object through the optical filter. For example, the reception unit 840 may include a band-pass filter, a dichroic filter, a guided-mode resonance filter, a polarizer, a wedge filter, or the like, but the present disclosure is not limited thereto.

According to one embodiment, the semi-flash LiDAR 800 may have a predetermined light path between the components.

For example, light emitted from the laser emitting unit 810 may be incident on the scanning unit 830 through the BCSC 820. Further, the light incident on the scanning unit 830 may be reflected from the scanning unit 830 and incident on the object 850. Further, the light incident on the object 850 may be reflected from the object 850 and incident on the scanning unit 830 again. Further, the light incident on the scanning unit 830 may be reflected from scanning unit 830 and received by the reception unit 840. A lens for increasing light-transmitting/receiving efficiency may be additionally inserted into the above-described light path.

Figure 36:
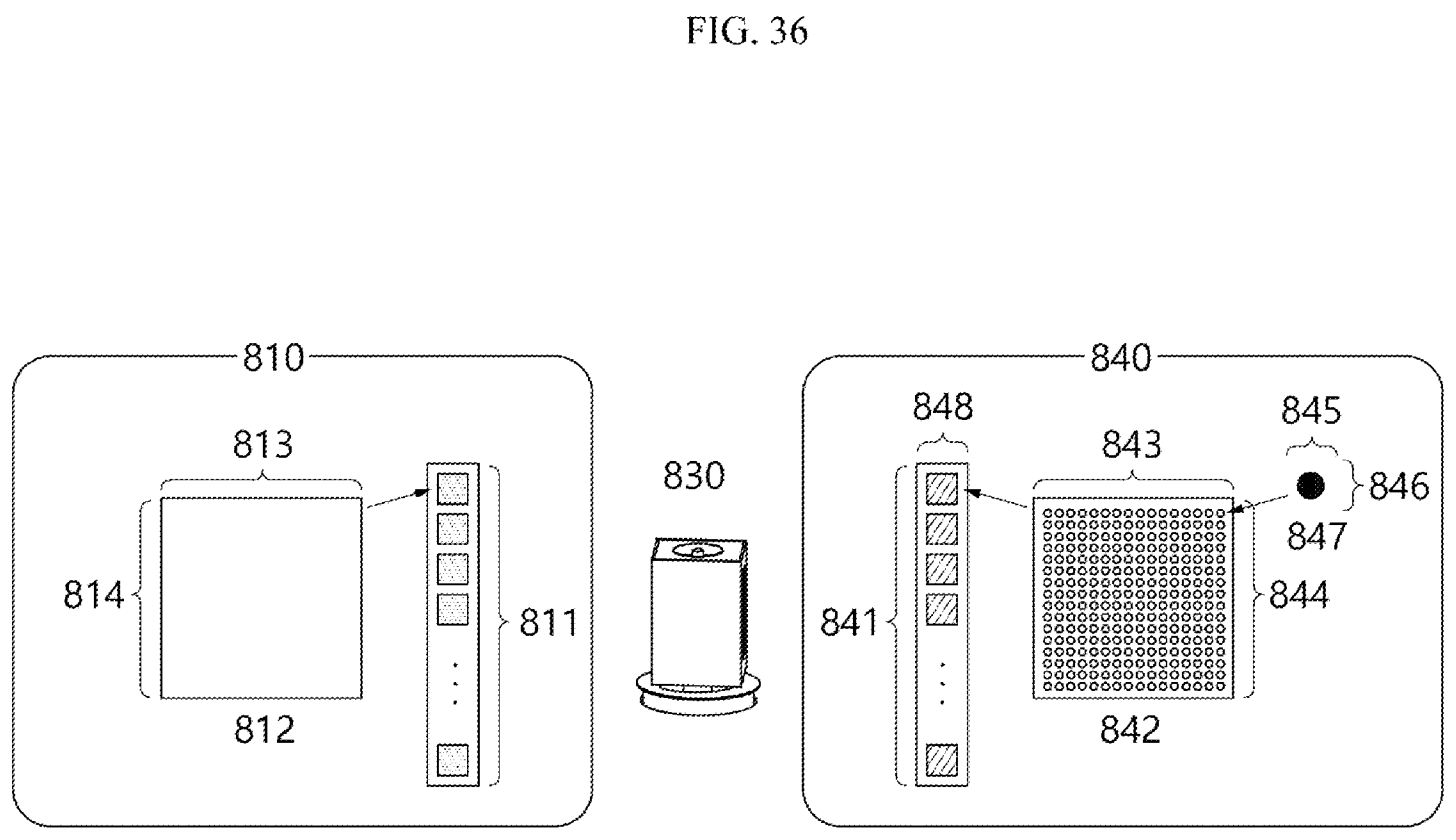

FIG. 36 is a diagram for describing a configuration of the semi-flash LiDAR according to one embodiment.

Referring to FIG. 36, the semi-flash LiDAR 800 according to one embodiment may include the laser emitting unit 810, the scanning unit 830, and the reception unit 840.

According to one embodiment, the laser emitting unit 810 may include a VCSEL array 811. Only one column of the VCSEL array 811 is shown in FIG. 36, but the present disclosure is not limited thereto, and the VCSEL array 811 may be formed in an N*M matrix structure.

According to one embodiment, the VCSEL array 811 may include a plurality of VCSEL units 812. Here, each of the VCSEL units 812 may include a plurality of VCSEL emitters. For example, the VCSEL array 811 may include 25 VCSEL units 812. In this case, the 25 VCSEL units 812 may be arranged in one column, but the present disclosure is not limited thereto.

According to one embodiment, each of the VCSEL units 812 may have a divergence angle. For example, the VCSEL unit 812 may have a horizontal divergence angle 813 and a vertical divergence angle 814. For example, the VCSEL unit 812 may have the horizontal divergence angle 813 of 1.2 degrees and the vertical divergence angle 814 of 1.2 degrees, but the present disclosure is not limited thereto.

According to one embodiment, the scanning unit 830 may receive a laser beam emitted from the laser emitting unit 810. At this point, the scanning unit 830 may reflect the laser beam toward an object. In addition, the scanning unit 830 may receive a laser beam reflected from the object. At this point, the scanning unit 830 may transmit the laser beam reflected from the object to the reception unit 840.

In this case, a region from which the laser beam is reflected toward the object and a region to which the laser beam reflected from the object is received may be the same or different. For example, the region from which the laser beam is reflected toward the object and the region to which the laser beam reflected from the object is received may be in the same reflective surface. In this case, the regions may be divided into upper and lower portions or left and right portions within the same reflective surface.

Further, for example, the region from which the laser beam is reflected toward the object and the region to which the laser beam reflected from the object is received may be different reflective surfaces. For example, the region from which the laser beam is reflected toward the object may be a first reflective surface of the scanning unit 830, and the region to which the laser beam reflected from the object is received may be a second reflective surface of the scanning unit 830.

According to one embodiment, the scanning unit 830 may reflect a 2D laser beam emitted from the laser emitting unit

810 toward the object. At this point, as the scanning unit 830 rotates or scans, the LiDAR device may three-dimensionally scan the object.

According to one embodiment, the reception unit 840 may include a SPAD array 841. Only one column of the SPAD array 841 is shown in FIG. 36, but the present disclosure is not limited thereto, and the SPAD array 841 may be formed in an N*M matrix structure.

According to one embodiment, the SPAD array 841 may include a plurality of SPAD units 842. At this point, each of the SPAD units 842 may include a plurality of SPAD pixels 847. For example, each of the SPAD units 842 may include 12×12 SPAD pixels 847. In this case, each of the SPAD pixels 847 may refer to one SPAD element, but the present disclosure is not limited thereto.

Further, for example, the SPAD array 841 may include 25 SPAD units 842. In this case, the 25 SPAD units 842 may be arranged in one column, but the present disclosure is not limited thereto. Further, in this case, the arrangement of the SPAD units 842 may correspond to the arrangement of the VCSEL units 812.

According to one embodiment, each of the SPAD units 842 may have an FOV at which light may be received. For example, the SPAD unit 842 may have a horizontal FOV 843 and a vertical FOV 844. For example, the SPAD unit 842 may have the horizontal FOV 843 of 1.2 degrees and the vertical FOV 844 of 1.2 degrees.

At this point, the FOV of the SPAD unit 842 may be proportional to the number of SPAD pixels 847 included in the SPAD unit 842. Alternatively, an FOV of the individual SPAD pixel 847 included in the SPAD unit 842 may be determined by the FOV of the SPAD unit 842.

For example, in a case in which each of a horizontal FOV 845 and a vertical FOV 846 of the individual SPAD pixel 847 is 0.1 degrees, when the SPAD unit 842 includes N*M SPAD pixels 847, the horizontal FOV 843 and the vertical FOV 844 of the SPAD unit 842 may be 0.1*N and 0.1*M, respectively.

Further, for example, in a case in which each of the horizontal FOV 843 and the vertical FOV 844 of the SPAD unit 842 is 1.2 degrees, when the SPAD unit 842 includes 12×12 SPAD pixels 847, the horizontal FOV 845 and the vertical FOV 846 of the individual SPAD pixel 847 may each be 0.1 degrees (=1.2/12).

According to another embodiment, the reception unit 840 may include a SiPM array 841. Only one column of the SiPM array 841 is shown in FIG. 36, but the present disclosure is not limited thereto, and the SiPM array 841 may be formed in an N*M matrix structure.

According to one embodiment, the SiPM array 841 may include a plurality of microcell units 842. Here, each of the microcell units 842 may include a plurality of microcells 847. For example, each of the microcell units 842 may include 12×12 microcells 847.

Further, for example, the SiPM array 841 may include 25 microcell units 842. In this case, the 25 microcell units 842 may be arranged in one column, but the present disclosure is not limited thereto. Further, in this case, the arrangement of the microcell units 842 may correspond to the arrangement of the VCSEL units 812.

According to one embodiment, each of the microcell units 842 may have an FOV at which light may be received. For example, the microcell unit 842 may have the horizontal FOV 843 and the vertical FOV 844. For example, the microcell unit 842 may have the horizontal FOV 843 of 1.2 degrees and the vertical FOV 844 of 1.2 degrees.

Here, the FOV of the microcell unit 842 may be proportional to the number of microcells included in the microcell unit 842. Alternatively, an FOV of the individual microcell 847 included in the microcell unit 842 may be determined by the FOV of the microcell unit 842.

For example, in a case in which each of the horizontal FOV 845 and the vertical FOV 846 of the individual microcell 847 is 0.1 degrees, when the microcell unit 842 includes N*M microcells 847, the horizontal FOV 843 and the vertical FOV 844 of the microcell unit 842 may be 0.1*N and 0.1*M, respectively.

Further, for example, in a case in which each of the horizontal FOV 843 and the vertical FOV 844 of the microcell unit 842 is 1.2 degrees, when the microcell unit 842 includes 12×12 microcells 847, the horizontal FOV 845 and the vertical FOV 846 of the individual microcell 847 may each be 0.1 degrees (=1.2/12).

According to another embodiment, one VCSEL unit 812 may correspond to the plurality of SPAD units or microcell units 842. For example, a laser beam emitted from the VCSEL unit 812 in a first row and first column may be reflected from the scanning unit 830 and the object 850 and received by the SPAD units or microcell units 842 in the first row and first column and a first row and second column.

According to still another embodiment, the plurality of VCSEL units 812 may correspond to one SPAD unit or microcell unit 842. For example, a laser beam emitted from the VCSEL unit 812 in the first row and first column may be reflected from the scanning unit 830 and the object 850 and received by the SPAD unit or microcell unit 842 in the first row and first column.

According to one embodiment, the VCSEL unit 812 of the laser emitting unit 810 may correspond to the SPAD unit or microcell unit 842 of the reception unit 840.

For example, the horizontal divergence angle and the vertical divergence angle of the VCSEL units 812 may be respectively identical to the horizontal FOV 845 and the vertical FOV 846 of the SPAD unit or microcell unit 842.

For example, the laser beam emitted from the VCSEL unit 812 in the first row and first column may be reflected from the scanning unit 830 and the object 850 and received by the SPAD unit or microcell unit 842 in the first row and first column.

Further, for example, a laser beam emitted from the VCSEL unit 812 in an Nth row and Mth column may be reflected from the scanning unit 830 and the object 850 and received by the SPAD unit or microcell unit 842 in the Nth row and Mth column.

At this point, the laser, which is emitted from the VCSEL unit 812 in the Nth row and Mth column and reflected from the scanning unit 830 and the object 850, may be received by the SPAD unit or microcell unit 842 in the Nth row and Mth column, and the LiDAR device 800 may have a resolution by the SPAD unit or microcell unit 842.

For example, when the SPAD unit or microcell unit 842 includes SPAD pixels or microcells 847 of N rows*M columns, the VCSEL unit 812 may recognize distance information of the object by dividing the FOV, at which light is irradiated, into N*M regions.

According to another embodiment, one VCSEL unit 812 may correspond to the plurality of SPAD units or microcell units 842. For example, a laser beam emitted from the VCSEL unit 812 in a first row and first column may be reflected from the scanning unit 830 and the object 850 and received by the SPAD units or microcell units 842 in the first row and first column and a first row and second column.

According to still another embodiment, the plurality of VCSEL units 812 may correspond to one SPAD unit or microcell unit 842. For example, the laser beam emitted from the VCSEL unit 812 in the first row and first column may be reflected from the scanning unit 830 and the object 850 and received by the SPAD unit or microcell unit 842 in the first row and first column.

According to one embodiment, the plurality of VCSEL units 812 included in the laser emitting unit 810 may operate according to a predetermined sequence or may operate randomly. At this point, the SPAD unit or microcell unit 842 of the reception unit 840 may also operate corresponding to the operation of the VCSEL unit 812.

For example, in the VCSEL array 811, the VCSEL unit in a third row may operate after the VCSEL unit in a first row operates. Thereafter, the VCSEL unit in a fifth row may operate, and then the VCSEL unit in a seventh row may operate.

In this case, in the reception unit 840, the SPAD unit or microcell unit 842 in a third row may operate after the SPAD unit or microcell unit 842 in a first row operates. Thereafter, the SPAD unit or microcell unit 842 in a fifth row may operate, and then the SPAD unit or microcell unit 842 in a seventh row may operate.

Further, for example, the VCSEL units of the VCSEL array 811 may operate randomly. At this point, the SPAD unit or microcell unit 842 of the reception unit, which is present at a position corresponding to the position of the randomly operating VCSEL unit 812, may operate.

Figure 37:
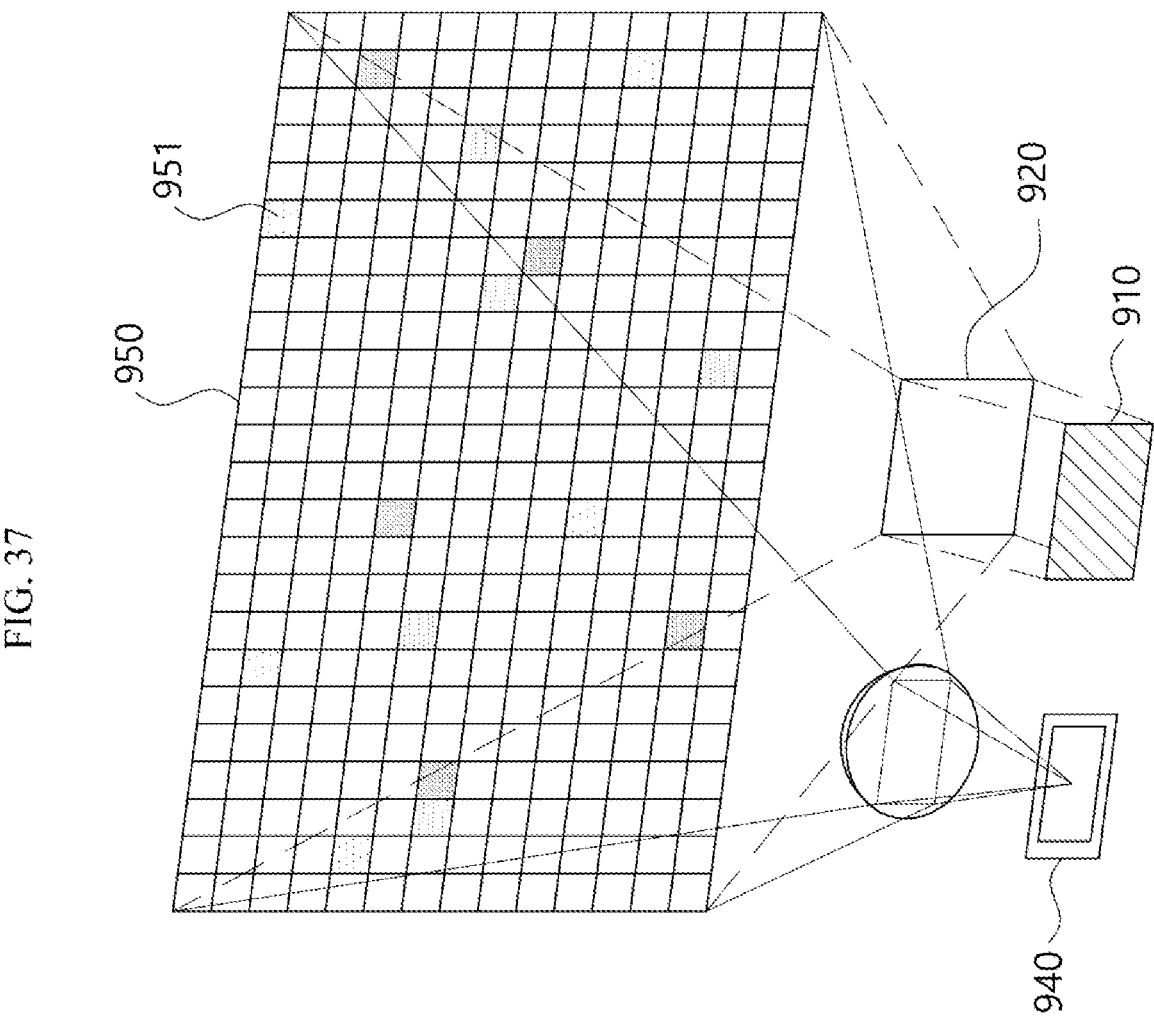
FIG. 37 is a diagram for describing a semi-flash LiDAR according to another embodiment.

FIG. 37 is a diagram for describing a semi-flash LiDAR according to another embodiment.

Referring to FIG. 37, a semi-flash LiDAR 900 according to another embodiment may include a laser emitting unit 910, a BCSC 920, and a reception unit 940.

The semi-flash LiDAR 900 according to one embodiment may include the laser emitting unit 910. A description of the laser emitting unit 910 may be duplicated with that of the laser emitting unit 810 of FIG. 35, and thus a detailed description thereof will be omitted.

The semi-flash LiDAR 900 according to one embodiment may include the BCSC 920. A description of the BCSC 920 may be duplicated with that of the BCSC 820 of FIG. 35, and thus a detailed description thereof will be omitted.

The semi-flash LiDAR 900 according to one embodiment may include the reception unit 940. A description of the reception unit 940 may be duplicated with that of the reception unit 840 of FIG. 35, and thus a detailed description thereof will be omitted.

According to one embodiment, the semi-flash LiDAR 900 may have a predetermined light path between the components.

For example, light emitted from the laser emitting unit 910 may be incident on an object 950 through the BCSC 920. Further, the light incident on the object 950 may be reflected from the object 950 and received by the reception unit 940. A lens for increasing light-transmitting/receiving efficiency may be additionally inserted into the above-described light path.

When the semi-flash LiDAR 900 of FIG. 37 is compared with the semi-flash LiDAR 800 of FIG. 35, the semi-flash LiDAR 900 of FIG. 37 may not include a scanning unit. A scanning function of the scanning unit may be realized with the laser emitting unit 910 and the BCSC 920.

For example, the laser emitting unit 910 may include an addressable VCSEL array and partially emit a laser beam to a region of interest by an addressable operation.

Further, for example, the BCSC 920 may include a collimation component and a steering component to provide a particular orientation to a laser beam so that the laser beam is irradiated to a desired region of interest.

Further, the semi-flash LiDAR 900 of FIG. 37 may have a simplified light path as compared with the semi-flash LiDAR 800 of FIG. 35. By simplifying the light path, a light loss may be minimized and the possibility of occurring crosstalk may be reduced.

Figure 38:
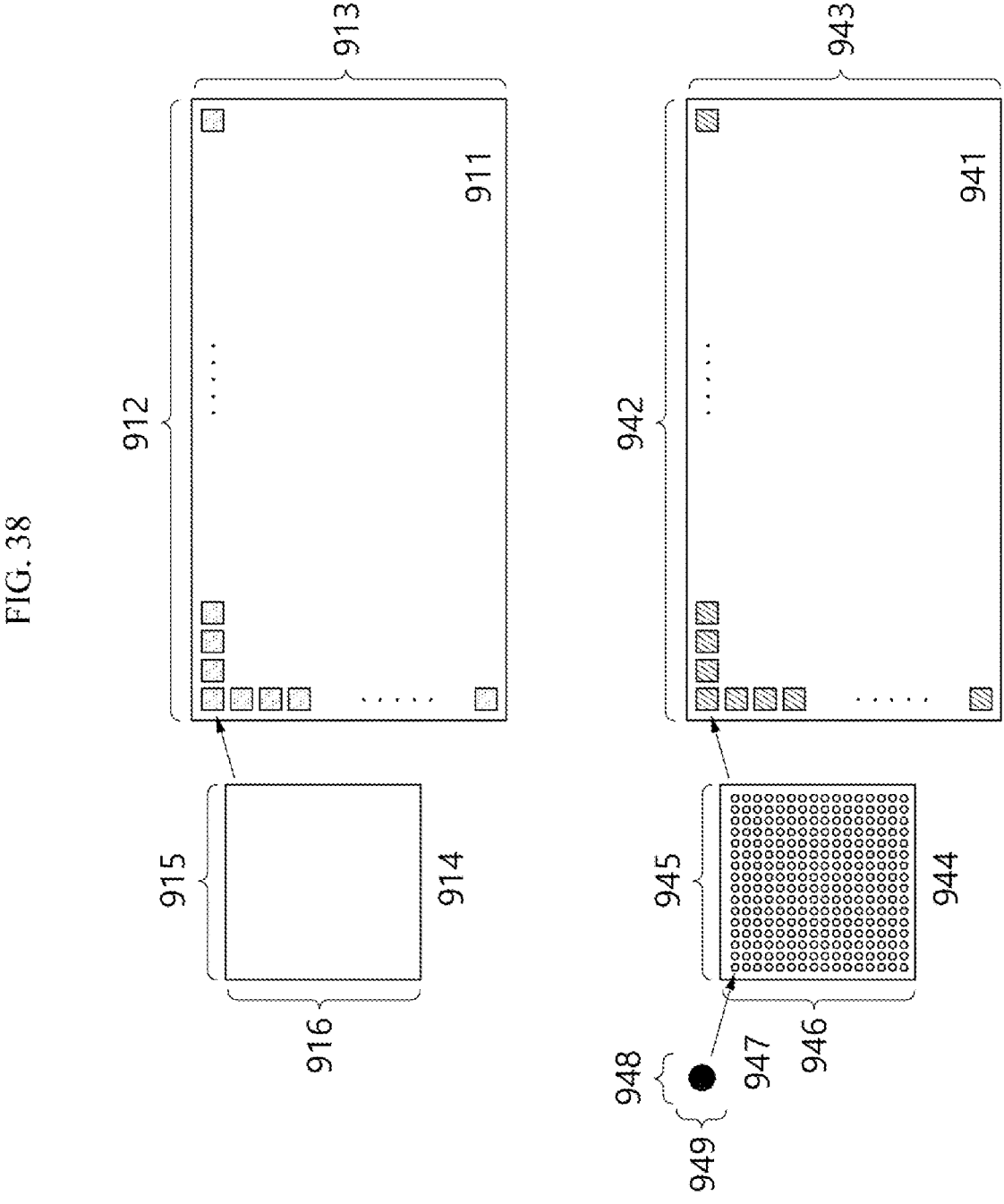
FIG. 38 is a diagram for describing a configuration of the semi-flash LiDAR according to another embodiment.

FIG. 38 is a diagram for describing a configuration of a semi-flash LiDAR according to another embodiment.

Referring to FIG. 38, a semi-flash LiDAR 900 according to one embodiment may include a laser emitting unit 910 and a reception unit 940.

According to one embodiment, the laser emitting unit 910 may include a VCSEL array 911. For example, the VCSEL array 911 may have an N*M matrix structure.

According to one embodiment, the VCSEL array 911 may include a plurality of VCSEL units 914. Here, each of the VCSEL units 914 may include a plurality of VCSEL emitters. For example, the VCSEL array 911 may include 1250 VCSEL units 914 having a 50×25 matrix structure, but the present disclosure is not limited thereto.

According to one embodiment, each of the VCSEL units 914 may have a divergence angle. For example, the VCSEL unit 914 may have a horizontal divergence angle 915 and a vertical divergence angle 916. For example, the VCSEL unit 914 may have the horizontal divergence angle 915 of 1.2 degrees and the vertical divergence angle 916 of 1.2 degrees, but the present disclosure is not limited thereto.

According to one embodiment, the reception unit 940 may include a SPAD array 941. For example, the SPAD array 941 may have an N*M matrix structure.

According to one embodiment, the SPAD array 941 may include a plurality of SPAD units 944. At this point, each of the SPAD units 944 may include a plurality of SPAD pixels 947. For example, the SPAD unit 944 may include 12×12 SPAD pixels 947.

Further, for example, the SPAD array 941 may include 1250 SPAD units 944 of a 50×25 matrix structure. In this case, the arrangement of the SPAD units 944 may correspond to the arrangement of the VCSEL units 914.

According to one embodiment, each the SPAD units 944 may have an FOV at which light may be received. For example, the SPAD unit 944 may have a horizontal FOV 945 and a vertical FOV 946. For example, the SPAD unit 944 may have the horizontal FOV 945 of 1.2 degrees and the vertical FOV 946 of 1.2 degrees.

At this point, the FOV of the SPAD unit 944 may be proportional to the number of SPAD pixels 947 included in the SPAD unit 944. Alternatively, an FOV of the individual SPAD pixel 947 included in the SPAD unit 944 may be determined by the FOV of the SPAD unit 944.

For example, in a case in which each of a horizontal FOV 948 and a vertical FOV 949 of the individual SPAD pixel 947 is 0.1 degrees, when the SPAD unit 944 includes N*M SPAD pixels 947, the horizontal FOV 945 and the vertical FOV 946 of the SPAD unit 944 may be 0.1*N and 0.1*M, respectively.

Further, for example, in a case in which each of the horizontal FOV 945 and the vertical FOV 946 of the SPAD unit 944 is 1.2 degrees, when the SPAD unit 944 includes 12×12 SPAD pixels 947, the horizontal FOV 948 and the vertical FOV 949 of the individual SPAD pixel 947 may each be 0.1 degrees (=1.2/12).

According to another embodiment, the reception unit 940 may include a SiPM array 941. For example, the SiPM array 941 may have an N*M matrix structure.

According to one embodiment, the SiPM array 941 may include a plurality of microcell units 944. Here, each of the microcell units 944 may include a plurality of microcells 947. For example, each of the microcell units 944 may include 12×12 microcells 947.

Further, for example, the SiPM array 941 may include 1250 microcell units 944 of a 50×25 matrix structure. In this case, the arrangement of the microcell units 944 may correspond to the arrangement of the VCSEL units 914.

According to one embodiment, each of the microcell units 944 may have an FOV at which light may be received. For example, the microcell unit 944 may have a horizontal FOV 945 and a vertical FOV 946. For example, the microcell unit 944 may have the horizontal FOV 945 of 1.2 degrees and the vertical FOV 946 of 1.2 degrees.

Here, the FOV of the microcell unit 944 may be proportional to the number of microcells 947 included in the microcell unit 944. Alternatively, an FOV of the individual microcell 947 included in the microcell unit 944 may be determined by the FOV of the microcell unit 944.

For example, in a case in which each of a horizontal FOV 948 and a vertical FOV 949 of the individual microcell 947 is 0.1 degrees, when the microcell unit 944 includes N*M microcells 947, the horizontal FOV 945 and the vertical FOV 946 of the microcell unit 944 may be 0.1*N and 0.1*M, respectively.

Further, for example, in a case in which each of the horizontal FOV 945 and the vertical FOV 946 of the microcell unit 944 is 1.2 degrees, when the microcell unit 944 includes 12×12 microcells 947, the horizontal FOV 948 and the vertical FOV 949 of the individual microcell 947 may each be 0.1 degrees (=1.2/12).

According to one embodiment, the VCSEL unit 914 of the laser emitting unit 910 may correspond to the SPAD unit or microcell unit 944 of the reception unit 940.

For example, the horizontal divergence angle and the vertical divergence angle of the VCSEL units 914 may be respectively identical to the horizontal FOV 945 and the vertical FOV 946 of the SPAD unit or microcell unit 944.

For example, a laser beam emitted from the VCSEL unit 914 in a first row and first column may be reflected from the object 850 and received by the SPAD unit or microcell unit 944 in the first row and first column.

Further, for example, a laser beam emitted from the VCSEL unit 914 in an Nth row and Mth column may be reflected from the object 850 and received by the SPAD unit or microcell unit 944 in the Nth row and Mth column.

At this point, the laser beam, which is emitted from the VCSEL unit 914 in the Nth row and Mth column and reflected from the object 850, may be received by the SPAD unit or microcell unit 944 in the Nth row and Mth column, and the LiDAR device 900 may have a resolution by the SPAD unit or microcell unit 944.

For example, when the SPAD unit or microcell unit 944 includes SPAD pixels or microcells 947 of N rows*M columns, the VCSEL unit 914 may recognize distance information of the object by dividing the FOV, at which light is irradiated, into N*M regions.

According to another embodiment, one VCSEL unit 914 may correspond to the plurality of SPAD units or microcell units 944. For example, the laser beam emitted from the VCSEL unit 914 in the first row and first column may be reflected from the object 850 and received by the SPAD units or microcell units 944 in the first row and first column and a first row and second column.

According to still another embodiment, the plurality of VCSEL units 914 may correspond to one SPAD unit or microcell unit 944. For example, a laser beam emitted from the VCSEL unit 914 in the first row and first column may be reflected from the object 850 and received by the SPAD unit or microcell unit 944 in the first row and first column.

According to one embodiment, the plurality of VCSEL units 914 included in the laser emitting unit 910 may operate according to a predetermined sequence or may operate randomly. At this point, the SPAD unit or microcell unit 944 of the reception unit 940 may also operate corresponding to the operation of the VCSEL unit 914.

For example, in the VCSEL array 911, the VCSEL unit in a first row and third column may operate after the VCSEL unit in a first row and first column operates. Thereafter, the VCSEL unit in a first row and fifth column may operate, and then the VCSEL unit in a first row and seventh column may operate.

In this case, in the reception unit 940, the SPAD unit or microcell unit 944 in a first row and third column may operate after the SPAD unit or microcell unit 944 in a first row and first column operates. Thereafter, the SPAD unit or microcell unit 944 in a first row and fifth column may operate, and then the SPAD unit or microcell unit 944 in a first row and seventh column may operate.

Further, for example, the VCSEL units of the VCSEL array 911 may operate randomly. At this point, the SPAD unit or microcell unit 944 of the reception unit, which is present at a position corresponding to the position of the randomly operating VCSEL unit 914, may operate.

Hereinafter, a processor and a control method capable of minimizing an interference signal from an external device will be described.

Figure 39:
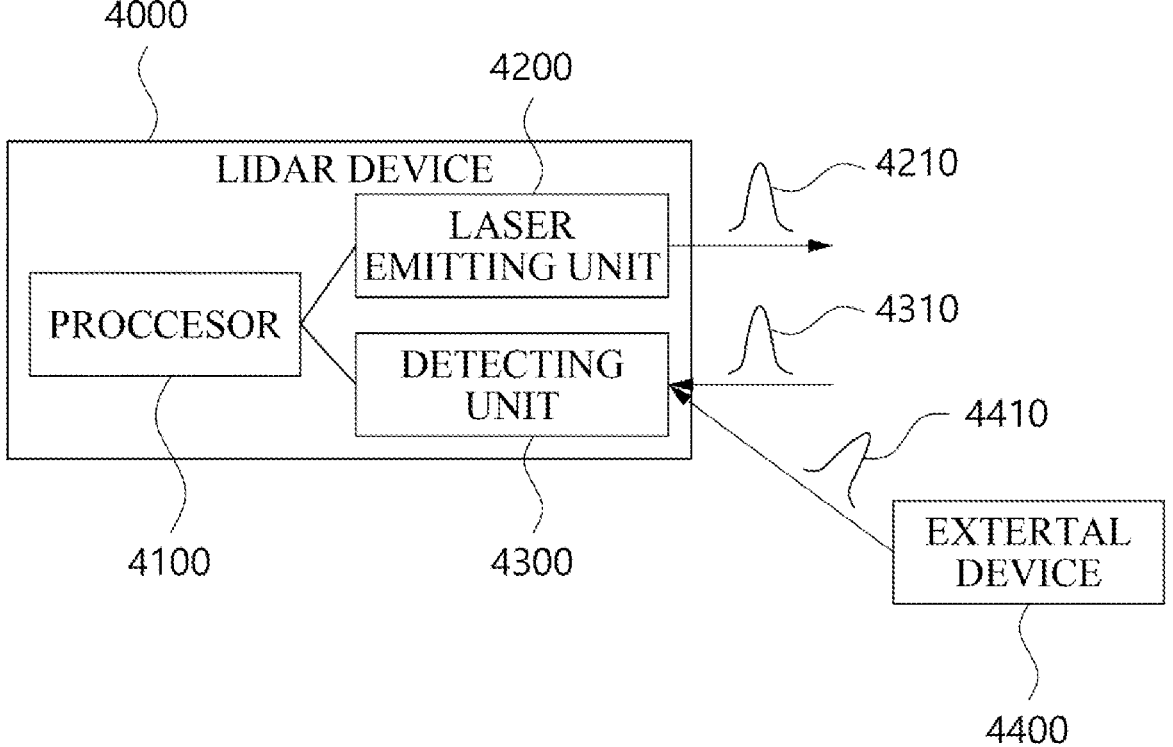
FIG. 39 is a view for describing an interference phenomenon with an external device according to one embodiment.

FIG. 39 is a view for describing an interference phenomenon with an external device according to one embodiment.

Referring to FIG. 39, a light detection and ranging (Li-DAR) device 4000 according to one embodiment may include a processor 4100, a laser emitting unit 4200, and a detecting unit 4300.

The LiDAR device 4000 may be the LiDAR device 1000 in FIG. 1, the LiDAR device 1050 in FIG. 2, and may also be the LiDAR device 1150 in FIG. 3. Since descriptions of the LiDAR device 4000 may overlap descriptions of FIGS. 1, 2 and 3, the detailed description thereof will be omitted.

The processor 4100 may be the control part 400 in FIG. 1. The processor 4100 may be variously interchanged with terms such as a control part, a controller, a control unit, and the like. Since the description of the processor 4100 may overlap that of FIG. 1, the detailed description thereof will be omitted.

The laser emitting unit 4200 may be the laser emitting unit 100 in FIG. 1, 2, or 3. Since the description of the laser emitting unit 4200 may overlap the descriptions of FIGS. 1, 2, and 3, the detailed description thereof will be omitted.

The detecting unit 4300 may be the sensor unit 300 in FIG. 1, 2, or 3. Since the description of the detecting unit 4300 may overlap the descriptions of FIGS. 1, 2, and 3, the detailed description thereof will be omitted.

According to one embodiment, the processor 4100 may transmit a control signal for emitting a laser to the laser emitting unit 4200. The laser emitting unit 4200 which receives the control signal may emit a laser 4210 in response to the control signal.

In this case, the laser emitting unit 4200 may include an optic. For example, the laser emitting unit 4200 may include a lens for collimating a laser beam. Further, for example, the laser emitting unit 4200 may include a bulk lens including a plurality of lenses. Accordingly, the laser 4210 may be a laser collimated through the optic.

Alternatively, the laser 4210 emitted from the laser emitting unit 4200 may pass through an optic unit before being irradiated to an object. In this case, the optic unit may be the optic unit 200 in FIG. 1, 2, or 3. Since the description of the optic unit may overlap the description of FIG. 1, 2, or 3, the detailed description thereof will be omitted.

The laser 4210 may be irradiated to an object or a specific region to be scattered. In this case, a reflective laser 4310 which is a part of the laser 4210 may be received by the detecting unit 4300.

The detecting unit 4300 may receive the reflective laser 4310 and generate an output signal. The detecting unit 4300 may generate or store a data set or transmit the data set to the processor 4100 based on the output signal. Alternatively, the processor 4100 may generate or store the data set based on the output signal received from the detecting unit 4300.

In this case, the data set may be a set of data corresponding for a plurality of detecting windows. Further, in this case, the plurality of detecting windows of the data set may be times corresponding to time bins of a histogram. For example, data corresponding to the plurality of detecting windows may be data for 0 ns to 1 ns, data for 1 ns to 2 ns, data for 2 ns to 3 ns, and the like, but the present disclosure is not limited to the above figure.

The processor 4100 may store the plurality of data sets based on the output signal generated by the detecting unit 4300. The processor 4100 may generate a histogram by accumulating a plurality of data sets.

The processor 4100 may acquire a detecting time point at which the reflective laser 4310 is sensed by the detecting unit 4300 through the histogram generated by accumulating a plurality of data sets. A method of acquiring the detecting time point may overlap the description in FIG. 32, and thus the detailed description thereof will be omitted.

According to one embodiment, the detecting unit 4300 may be the single photon avalanche diode (SPAD) array 750 in FIG. 31. In this case, the plurality of SPADs 751 included in the detecting unit may sense the reflective laser 4310 reflected from different regions. Accordingly, the processor 4100 may store the plurality of data sets based on the output signals generated by the plurality of SPADs 751. Accordingly, the processor 4100 may generate histograms for regions.

For example, the first SPAD may sense a laser reflected from a first region. The processor 4100 may generate a first histogram by accumulating a plurality of data sets based on the output signal of the first SPAD.

Further, for example, the second SPAD may sense a laser reflected from a second region different from the first region. The processor 4100 may generate a second histogram by accumulating a plurality of data sets based on the output signal of the second SPAD.

According to the above processes, the processor 4100 may generate N number of histograms corresponding to the N number of SPADs 751 included in the detecting unit 4300. Accordingly, the processor 4100 may determine the characteristics of each region, such as a distance, a center point, and the like with respect to N number of regions included in a field of view (FOV) of the detecting unit 4300.

The histogram generated when the processor 4100 of the LiDAR device 4000 emits the laser 4210 through the laser emitting unit 4200 and receives the reflective laser 4310 reflected from the object through the detecting unit 4300 may include data generated by an interference laser 4410 emitted from an external device 4400.

The external device 4400 may be a device which emits a laser other than the laser 4210 emitted from the LiDAR device 4000. That is, the external device 4400 may be a device which emits the interference laser 4410 other than the laser 4210 emitted from the LiDAR device 4000.

For example, the external device 4400 may be a LiDAR device included in another vehicle or a LiDAR device different from the LiDAR device 4000 such as a LiDAR device included in road infrastructure. Further, for example, the external device 4400 may be a headlight of another vehicle, a laser light emitting device of the road infrastructure, or the like. The external device 4400 is not limited to the described devices, and may include any device which irradiates the interference laser 4410.

When the histogram generated by the processor 4100 includes data generated by the interference laser 4410, the processor 4100 may inaccurately extract the detecting time point of the reflective laser 4310 reflected from the object.

For example, when the interference laser 4410 is received near a time corresponding to a specific time bin, the data generated by the interference laser 4410 will be allocated near the specific time bin of the histogram in which a plurality of data sets are accumulated.

Specifically, the interference laser 4410 is received at or near a time corresponding to a 20th time bin, the data generated by the interference laser 4410 will be allocated to or near the 20th time bin of the histogram in which 1024 data sets are accumulated.

In this case, when the data generated by the interference laser 4410 is a numerical value greater than or equal to a threshold value of the histogram, the processor 4100 may incorrectly extract the data generated by the interference laser 4410 as the data generated by the reflective laser 4310 reflected from the object.

Accordingly, in order to prevent accumulation of the data generated by the interference laser 4410 to the numerical value greater than or equal to the threshold value of the histogram, the processor 4100 needs to control the laser emitting time of the laser emitting unit 4200.

Hereinafter, a type of the data generated by the interference laser 4410 in the histogram according to laser emitting time control of the laser emitting unit 4200 of the processor 4100 will be described.

Figure 40:
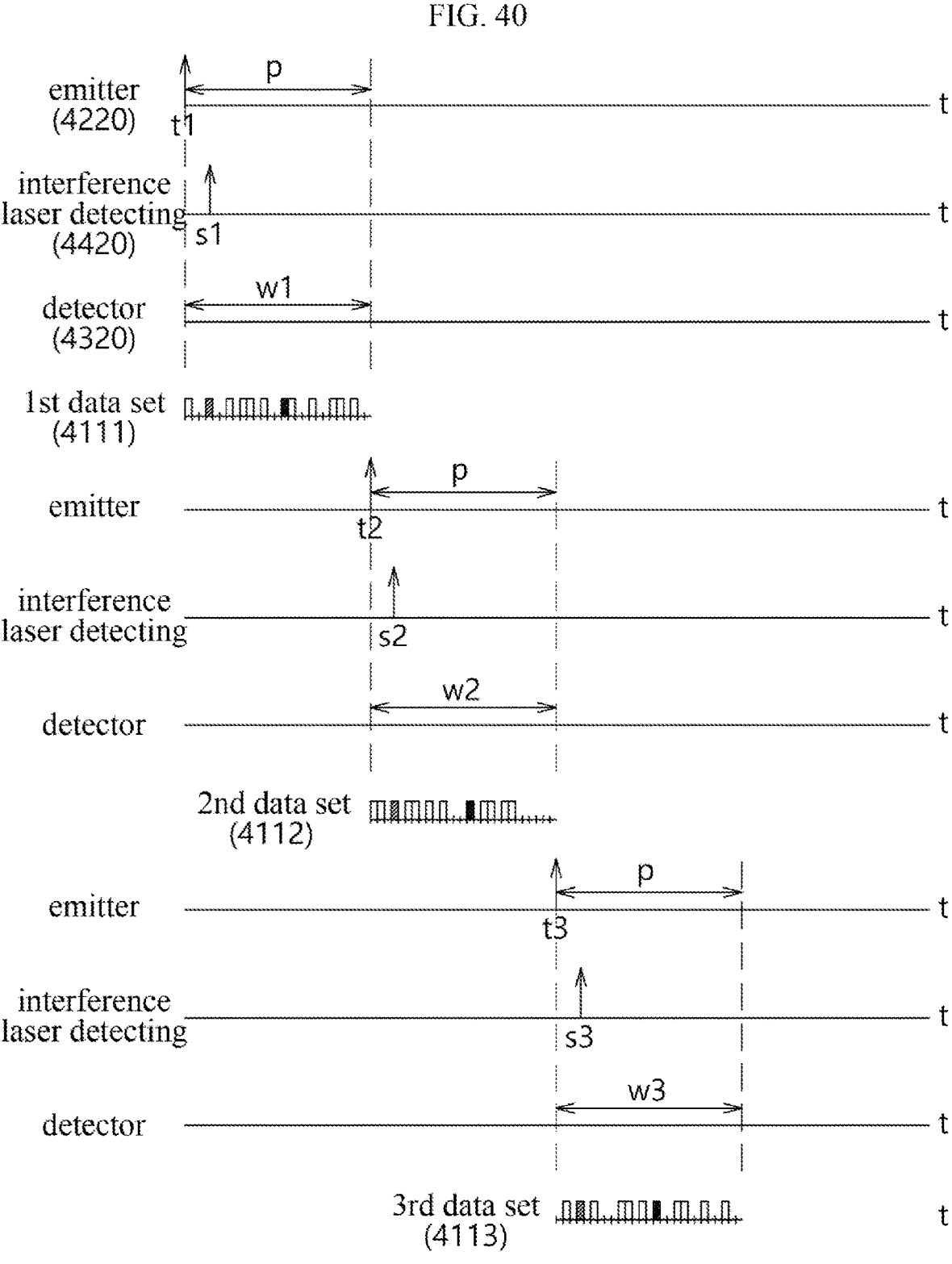
FIG. 40 is a view for describing a plurality of data sets based on a plurality of output signals of a detecting unit according to one embodiment.

FIG. 40 is a view for describing a plurality of data sets based on a plurality of output signals of a detecting unit according to one embodiment. Specifically, FIG. 40 is a view for describing an example in which the laser emitting unit 4200 emits the laser 4210 with a predetermined period.

When the laser emitting unit 4200 emits the laser 4210 with a predetermined period, the histogram generated by the processor 4100 may include the data generated by the interference laser 4410 emitted from the external device 4400 with a numerical value greater than or equal to the threshold value.

Accordingly, when the processor 4100 extracts the detecting time point of the reflective laser 4310 reflected from the object through the histogram, the data generated by the interference laser 4410 may become an obstacle.

Hereinafter, the time bin to which the data generated by the interference laser 4410 is allocated when the laser emitting unit 4200 emits the laser 4210 a the predetermined period will be described in detail.

Referring to FIG. 40, the laser emitting unit 4200 may emit a laser through an emitter 4220. Further, the external device 4400 may emit the interference laser 4410. In addition, the detecting unit 4300 may detect a photon through a detector 4320.

In this case, the photon may be included in the reflective laser 4310 in which the laser emitted from the emitter 4220 is reflected back from the object, and may also be included in the interference laser 4410 emitted from the external device. Alternatively, the photon may be included in external noise such as sunlight or the like.

The detector 4320 may generate an output signal by detecting a photon. The detector 4320 or the processor 4100 may generate data sets 4111, 4112, and 4113 including a plurality of pieces of data based on the output signal of the detector 4320. For example, the processor 4100 may generate 50, 100, 500, 1024, 2048, or 4096 data sets based on the output signal (e.g. detecting signal) of the detector 4320, but the present disclosure is not limited thereto.

As a result, the processor 4100 may generate a histogram by accumulating a plurality of data sets 4111, 4112, and 4113. For example, the processor 4100 may generate a histogram by accumulating 50, 100, 500, 1024, 2048, or 4096 data sets, but the present disclosure is not limited thereto. The processor 4100 may determine a characteristic of the object based on the generated histogram.

According to one embodiment, the emitter 4220 may emit the laser 4210 every first period p. For example, the emitter 4220 may emit a first laser at a first time point t1 and may emit a second laser at a second time point t2, which is a time point after the first period p from the first time point t1. Further, the emitter 4220 may emit a third laser at a third time point t3 that is a time point after the first period p from the second time point t2.

The detector 4320 may detect a photon during a detecting window which is a time section for the detector to generate the detecting signal corresponding to the photon.

The detector 4320 may detect a photon during a first detecting window w1, a second detecting window w2, and a third detecting window w3.

Also, a detecting time window is synchronized with a laser emitting time. Specifically, a start time of detecting time window is synchronized with a laser emitting time such that a time gap between the start time of detecting time window and the laser emitting time is predetermined value.

For example, a start time of a detecting time window is synchronized with a emitting time such that a time gap between the start time of the detecting time and the emitting time has a predetermined value. Here, the predetermined value may be 0 or not.

Also, for example, a start time of detecting time window is apart from emitting time by a predetermined time gap. Specifically, a start time of detecting time window is later than emitting time by a predetermined time gap. Here, the predetermined time gap may be 0 or not.

In this case, an interval between a start time of the first detecting window w1 and the first time point t1, an interval between a start time of the second detecting window w2 and the second time point t2, and an interval between a start time of the third detecting window w3 and the third time point t3 may be a first time gap.

The first time gap may be divided into a case of zero and a case of non-zero.

First, when the first time gap is zero, the first detecting window w1 includes the first time point t1 at which the first laser is emitted, and the second detecting window w2 includes the second time point t2 at which the second laser is emitted, and the third detecting window w3 may include the third time point t3 at which the third laser is emitted.

As a specific example, the start time of the first detecting window w1 may be the same as the first time point t1, the start time of the second detecting window w2 may be the same as the second time point t2, and the start time of the third detecting window w3 may be the same as the third time point t3.

When the first time is zero, the detector 4320 may detect a photon from the time point at which the emitter 4220 emits the laser. Since a minimum measurable distance of the LiDAR device 4000 using the emitter 4220 and the detector 4320 is reduced, accordingly, short-range measurement of the LiDAR device 4000 becomes possible.

Alternatively, looking at the case in which the first time gap is not 0, the first time point t1 may not be not included in the first detecting window w1, the second time point t2 may not be included in the second detecting window w2, and the third time point t3 may not be included in the third detecting window w3.

As a specific example, the start time of the first detecting window w1 may be a time point after the first time gap from the first time point t1, the start time of the second detecting window w2 may be a time point after the first time gap from the second time point t2, and the start time of the third detecting window w3 may be a time point after the first time gap from the third time point t3.

In this case, a minimum distance which may be measured by the LiDAR device 4000 may decrease as the first time gap is smaller. For example, when the first time gap is greater than a predetermined value, the LiDAR device 4000 may not sense an object which is present at a distance less than a predetermined distance. Since the minimum measurable distance of the LiDAR device 4000 using the emitter 4220 and the detector 4320 increases, accordingly, short-range measurement of the LiDAR device 4000 may become impossible.

According to one embodiment, the processor 4100 or the detector 4320 may generate a first data set 4111 based on a result of detecting a photon during the first detecting window w1, may generate a second data set 4112 based on a result of detecting a photon during the second detecting window w2, and may generate a third data set 4113 based on a result of detecting a photon during the third detecting window w3.

An interference laser detecting time point 4420 in FIG. 40 is a result showing a time point at which the detector 4320 detects the interference laser 4410 according to time.

For example, the detector 4320 may sense a first interference laser at a first interference time point s1 included in the first detecting window w1, may sense a second interference laser at a second interference time point s2 included in the second detecting window w2, and may sense a third interference laser at a third interference time point s3 included in the third detecting window w3.

Accordingly, the first data set 4111 may include data generated by the first interference laser, the second data set 4112 may include data generated by the second interference laser, and the third data set 4113 may include data generated by the third interference laser.

When an emission period of the interference laser 4410 is constant, the interference laser 4410 may be constantly detected in the photon sensing sections w1, w2, and w3 of the detector 4320. Accordingly, the interference laser 4410 may be sensed by the detector 4320 during a specific time bin section. For example, referring to FIG. 40, the interference laser 4410 may be sensed by the detector 4320 during a time section of a fourth time bin or a time section of a time bin near the fourth time bin.

When the interference laser 4410 is sensed by the detector 4320 during the specific time bin section, data generated by the interference laser 4410 may be generated in the specific time bin section. Accordingly, the histogram in which the plurality of data sets are accumulated may include data generated by the interference laser 4410 having a numerical value greater than or equal to a predetermined value in the specific time bin section.

Figure 41:
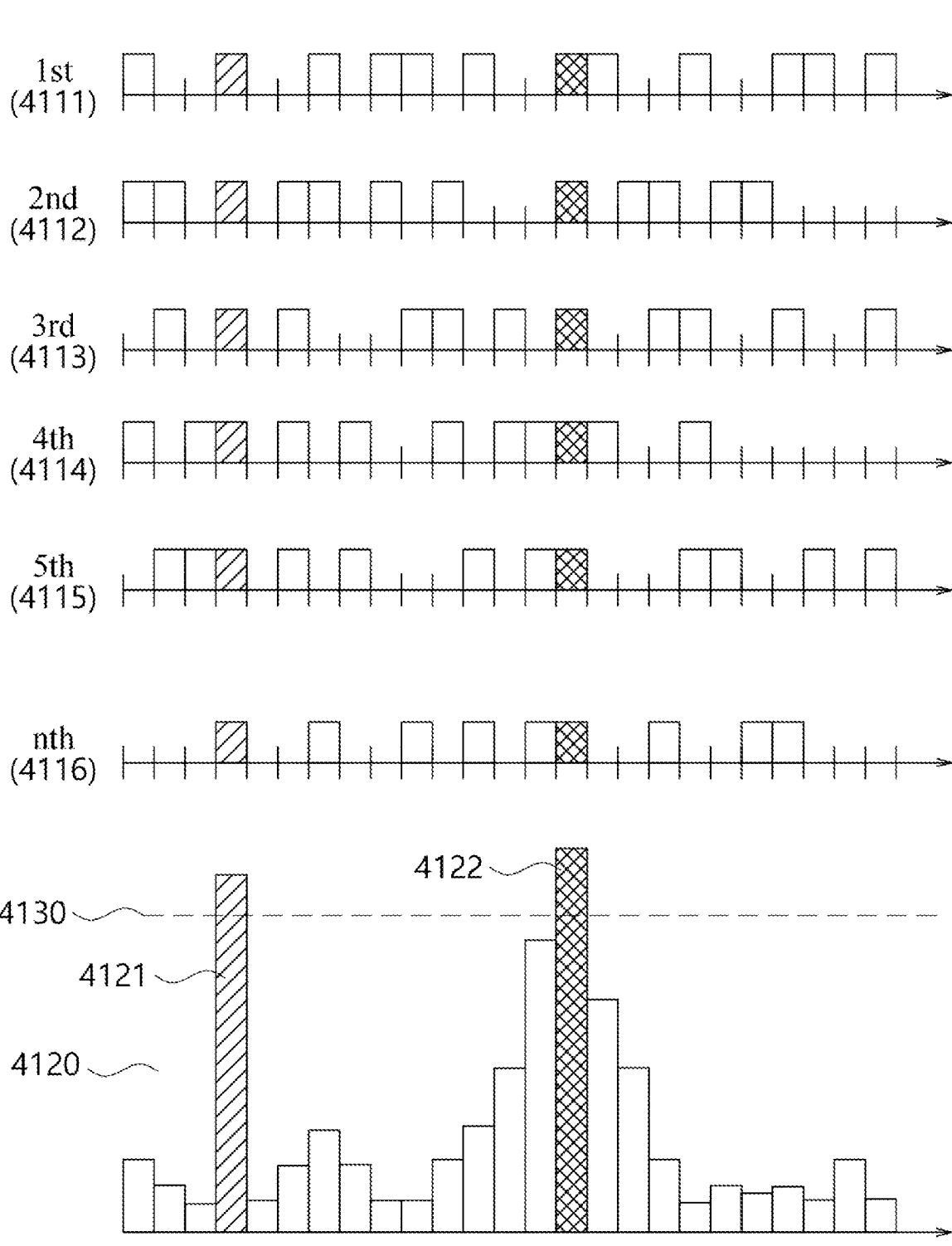
FIG. 41 is a view for describing a histogram in which the plurality of data sets according to one embodiment are accumulated.

FIG. 41 is a view for describing a histogram in which the plurality of data sets according to one embodiment are accumulated. The histogram in FIG. 41 is a result of accumulating the plurality of data sets based on the output signal of the detector 4320 in FIG. 40.

According to one embodiment, the histogram may include a first data set 4111, a second data set 4112, a third data set 4113, a fourth data set 4114, and a fifth data set 4115 to an Nth data set 4116.

Each data set may include data allocated to a plurality of histogram time bins. Here, the data allocated to the time bin includes counting value which is a value generated based on a photon received by detector. Specifically, each data set may include data generated by the interference laser 4410 and data generated by the reflective laser 4310.

For example, the first data set 4111 may include the data generated by the interference laser 4410 in the fourth time bin, and may include the data generated by the reflective laser 4310 in a fifteenth time bin.

Each of the second data set 4112, the third data set 4113, the fourth data set 4114, and the fifth data set 4115 to the Nth data set 4116 may also include may include the data generated by the interference laser 4410 in the fourth time bin, and may include the data generated by the reflective laser 4310 in the fifteenth time bin.

In the above example, a position of the time bin to which the data generated by the interference laser 4410 is allocated may be the fourth in the first data set 4111, the fourth in the second data set 4112, and the fourth in the third data set 4113, and thus may be the same. That is, the position of the time bin to which the data generated by the interference laser 4410 is allocated may be the same or similar for each data set.

Further, in the above example, a position of the time bin to which the data generated by the reflective laser 4310 is allocated may be the fifteenth in the first data set 4111, the fifteenth in the second data set 4112, and the fifteenth in the third data set 4113, and thus may be the same. That is, the position of the time bin to which the data generated by the reflective laser 4310 is allocated may be the same or similar for each data set.

Since the laser emitting unit 4200 of FIG. 40 regularly emits the laser 4210 every first period p, the data generated by the reflective laser 4310 included in the data set may be generated at or near a specific time bin. For example, the data generated by the reflective laser 4310 may be generated at the fifteenth time bin or near the fifteenth time bin, such as the fourteenth and sixteenth time bins.

Further, for example, as the laser emitting unit 4200 regularly emits the laser 4210 every first period p, the detector 4320 may also detect a photon for a predetermined detecting window in each first period p. For example, the detector 4320 may detect a photon during the first detecting window w1, the second detecting window w2, and the third detecting window w3.

As a specific example, the first time point t1, which is a time point at which the emitter 4220 emits the first laser, may be a start time of the first detecting window w1, and the second time point t2, which is a time point at which the emitter 4220 emits the second laser, may be an end time of the first detecting window w1.

Further, the second time point t2, which is a time point at which the emitter 4220 emits the second laser, may be a start time of the second detecting window w2, and the third time point t3, which is a time point at which the emitter 4220 emits the third laser, may be an end time of the second detecting window w2. In addition, the third time point t3, which is a time point at which the emitter 4220 emits the third laser, may be a start time of the third detecting window w3.

Since the detecting window in which the detector 4320 detects a photon is repeated with a predetermined period, the data generated by the interference laser 4410 emitted from the external device 4400 may also be generated at or near the specific histogram time bin. For example, the data generated by the interference laser 4410 may be generated at the fourth time bin or near the fourth time bin, such as third and fifth time bins.

Accordingly, the histogram in which the first data set 4111, the second data set 4112, the third data set 4113, the fourth data set 4114, and the fifth data set 4115 to the Nth data set 4116 are accumulated may include the data generated by the interference laser 4410 in the fourth time bin, and may include the data generated by the reflective laser 4310 in the fifteenth time bin.

The processor 4100 may extract the detecting time point of the reflective laser 4310 through data having a numerical value greater than or equal to a predetermined value or a threshold value 4130 in the histogram. However, since the data generated by the interference laser 4410 and the data generated by the reflective laser 4310 are each generated in a specific time bin, in a histogram in which the plurality of data sets are accumulated, there may be a plurality of pieces of data having a numerical value greater than or equal to the threshold value 4130.

For example, data 4121 generated by the interference laser 4410 having a numerical value greater than or equal to the threshold value 4130 may be allocated to the fourth time bin of the histogram. Further, for example, data 4122 generated by the reflective laser 4310 having a numerical value greater than or equal to the threshold value 4130 may be allocated to the fifteenth time bin of the histogram.

In this case, in a process in which the processor 4100 extracts the detecting time point, the processor 4100 may have a problem in that the detecting time point of the reflective laser 4310 will be extracted through which data among the plurality of pieces of data having a numerical value greater than or equal to the threshold value 4130.

In this case, the processor 4100 may solve the above problem by allowing the data generated by the interference laser 4410 to be irregularly generated in various time bins rather than in a specific time bin. That is, when the processor 4100 generates the histogram by accumulating the plurality of data sets, the processor 4100 may prevent the data generated by the interference laser 4410 allocated to a specific time bin from having a numerical value greater than or equal to the threshold value 4130.

That is, the processor 4100 may increase the temporal dispersion of the data generated by the interference laser 4410 so that the data generated by the interference laser 4410 in a specific time bin may not have a numerical value greater than or equal to the threshold value 4130.

In this case, the processor 4100 should increase the temporal dispersion of the data generated by the interference laser 4410, and should reduce the temporal dispersion of the data generated by the reflective laser 4310 which is received as the laser 4210 emitted from the laser emitting unit 4200 in the LiDAR device 4000 is reflected by the object.

That is, the processor 4100 may reduce the temporal dispersion of the data generated by the reflective laser 4310 reflected from the same object to control the laser emitting time point of the laser emitting unit 4200 and a detecting window of the detecting unit 4300 so that the data may be accumulated in a specific time bin and have a numerical value greater than or equal to a predetermined value.

Hereinafter, a method in which the processor 4100 controls the laser emitting time point of the laser emitting unit 4200 and the detecting window of the detecting unit 4300 will be described.

Figure 42:
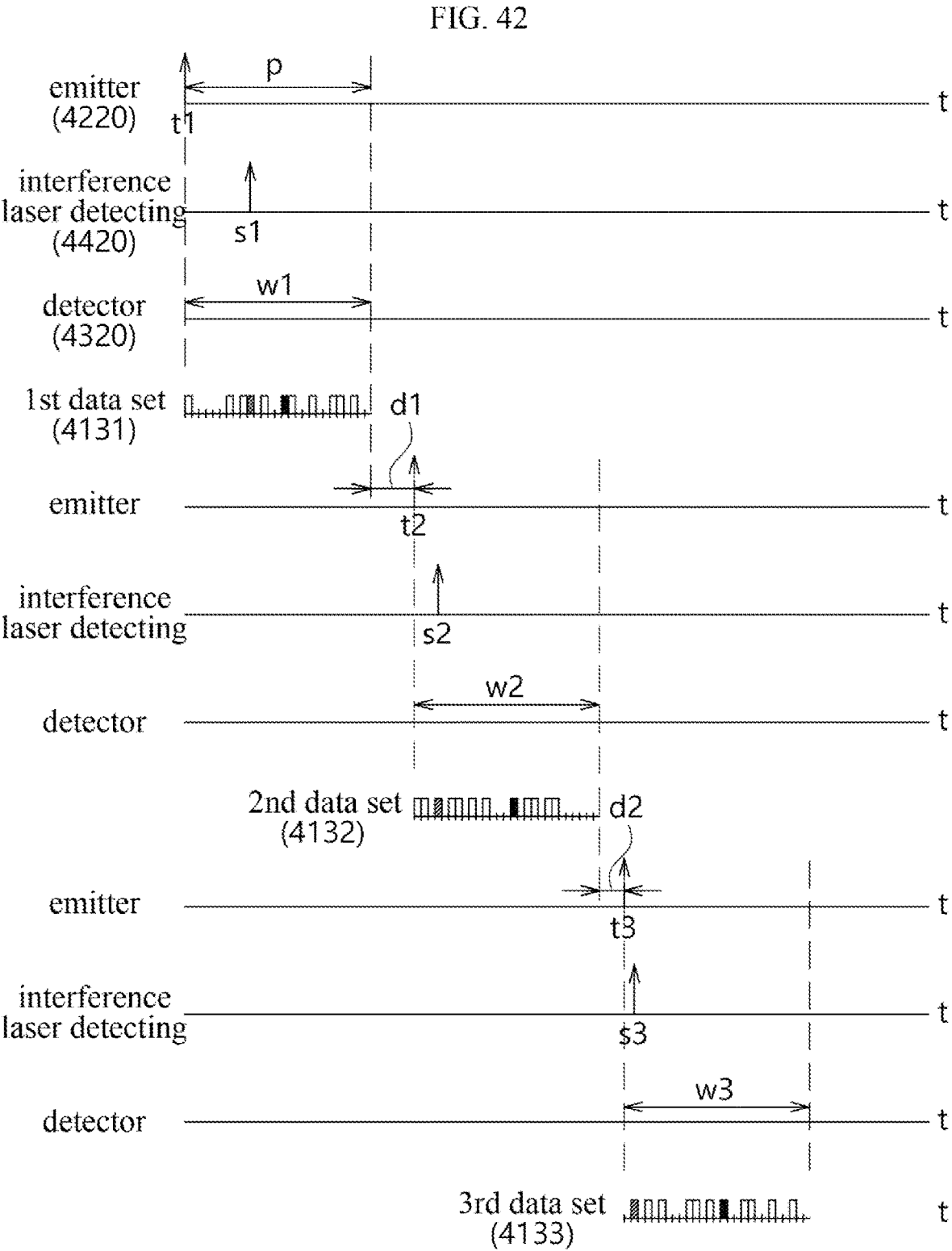
FIG. 42 is a view for describing a plurality of data sets based on a plurality of output signals of a detecting unit according to another embodiment.

FIG. 42 is a view for describing a plurality of data sets based on a plurality of output signals of a detecting unit according to another embodiment. Specifically, FIG. 42 is a view for describing an example in which the laser emitting unit 4200 emits the laser 4210 with a non-uniform period.

When the laser emitting unit 4200 emits the laser 4210 with a non-uniform period, the histogram generated by the processor 4100 may include data generated by the interference laser 4410 emitted from the external device 4400 with a numerical value smaller than or equal to a certain numerical value.

Accordingly, when the processor 4100 extracts the detecting time point of the laser 4310 reflected from the object through the histogram, the data generated by the interference laser 4410 may not become an obstacle.

Referring to FIG. 42, like FIG. 40, the laser emitting unit 4200 may emit a laser through the emitter 4220. Further, the external device 4400 may emit the interference laser 4410. In addition, the detecting unit 4300 may detect a photon through the detector 4320.

In this case, the photon may be included in the laser emitted from the emitter 4220 or may be included in the interference laser 4410. Alternatively, the photon may be included in external noise such as sunlight or the like.

Since a description of a process of generating a histogram through a plurality of data sets based on an output signal of the detector 4320 may overlap FIG. 40, the detailed description thereof will be omitted.

According to one embodiment, the emitter 4220 may emit the laser 4210 with an irregular time gap.

Also, the emitter 4220 may emit a laser aperiodically at a controlled emitting time. Here, "aperiodically" may mean that a time gap between consecutive lasers emitted from the emitter 4220 is irregular or non-uniform.

For example, the emitter 4220 may emit a first laser at a first time point t1, may emit a second laser at a second time point t2, and may emit a third laser at a third time point t3. In this case, a time gap between the first time point t1 and the second time point t2 may be different from a time gap between the second time point t2 and the third time point t3.

For example, the time gap between the first time point t1 and the second time point t2 may be the sum of a first detecting window w1 and a first delay dd1. Further, for example, the time gap between the second time point t2 and the third time point t3 may be the sum of a second detecting window w2 and a second delay dd2.

In this case, a detecting unit may detect a laser which is emitted from the emitter and reflected by an object aperiodically during at a detecting window. Specifically, the detecting unit may open the detecting time window aperiodically to detect a laser derived from the emitter.

Also, a detecting time window is synchronized with a laser emitting time. Specifically, a start time of detecting time window is synchronized with a laser emitting time such that a time gap between the start time of detecting time window and the laser emitting time is predetermined value. Here, the predetermined value may be 0 or not.

For example, the first detecting window w1 and the second detecting window w2 may have the same size, but the present disclosure is not limited thereto. Further, in this case, sizes of the first delay dd1 and the second delay dd2 may be different, but the present disclosure is not limited thereto.

As a specific example, the time gap between the first time point t1 and the second time point t2 may be 3 Ц s, and the time gap between the second time point t2 and the third time point t3 may be 2.5 Ц s. In this case, the first detecting window w1 and the second detecting window w2 may be the same, that is, 2 Ц s, the first delay dd1 may be 1 Ц s, and the second delay dd2 may be 0.5 Ц s.

A case in which the emitter 4220 of the laser emitting unit 4200 emits the laser 4210 with an irregular time gap may be realized in various ways.

According to one embodiment, the processor 4100 may transmit a trigger signal to the laser emitting unit 4200 so that the emitter 4220 of the laser emitting unit 4200 may emit the laser 4210. In this case, the trigger signal may be the sum of a first control signal and a second control signal.

For example, the first control signal may be a signal having a regular period. Specifically, the first control signal may be a signal in which the emission period of the emitter 4220 of FIG. 40, that is, the first period p, is repeated.

Further, for example, the second control signal may be a signal having an irregular period. Specifically, the second control signal may include a signal having a random time interval. For example, the second control signal may include a signal by a random function, a signal using jitter, and a signal determined by a predetermined sequence.

As a specific example, the second control signal may be a signal having time intervals of T, 2T, 3T, 4T, in which an interval between signals is a multiple of a predetermined time (T), or may be a signal in which an interval between signals follows a predetermined sequence of T, 3T, 2T, 4T.

According to another embodiment, the processor 4100 may transmit a trigger signal to the laser emitting unit 4200 so that the emitter 4220 of the laser emitting unit 42000 may emit the laser 4210. In this case, the trigger signal may be an irregular single signal, not the sum of the above-described first and second control signals.

For example, the trigger signal itself may be a signal having an irregular period. Specifically, the trigger signal may include a signal by a random function, and may include a signal determined by a predetermined sequence.

As a specific example, like the above-described second control signal, the trigger signal may be a signal having a time interval which is a multiple of a predetermined time or a signal following a predetermined sequence.

Not limited to the above-mentioned two methods, and for irregular emission of the laser 4210 from the emitter 4220, there may be various methods in which the processor 4100 generates a trigger signal having an irregular time interval.

Like the description in FIG. 40, the detector 4320 may detect a photon during the first detecting window w1, the second detecting window w2, and the third detecting window w3.

In this case, an interval between a start time of the first detecting window w1 and the first time point t1, an interval between a start time of the second detecting window w2 and the second time point t2, and an interval between a start time of the third detecting window w3 and the third time point t3 may be a first time gap.

Since a case in which the first time gap is zero and a case in which the first time gap is not zero may overlap the description in FIG. 40, the detailed description will be omitted.

According to one embodiment, the processor 4100 or the detector 4320 may generate a first data set 4131 based on a result of detecting a photon during the first detecting window w1, may generate a second data set 4132 based on a result of detecting a photon during the second detecting window w2, and may generate a third data set 4133 based on a result of detecting a photon during the third detecting window w3.

For example, the detector 4320 may sense a first interference laser at a first interference time point s1 included in the first detecting window w1, may sense a second interference laser at a second interference time point s2 included in the second detecting window w2, and may sense a third interference laser at a third interference time point s3 included in the third detecting window w3.

The processor 4100 or the detector 4320 may generate data generated by the first interference laser during the first detecting window w1, may generate data generated by the second interference laser during the second detecting window w2, and may generate data generated by the third interference laser during the third detecting window w3.

Accordingly, the first data set 4131 may include the data generated by the first interference laser, the second data set 4132 may include the data generated by the second interference laser, and the third data set 4133 may include the data generated by the third interference laser.

Unlike FIG. 40, since a laser emission time point of the emitter 4220 and the detecting windows w1, w2, and w3 for detecting a photon of the detector 4320 do not have predetermined periods, the interference laser 4410 may be sensed by the detector 4320 not only during a specific time bin section, but during various time bin sections. That is, in the example in FIG. 42, a range of time bins to which the data generated by the interference laser 4410 is allocated may be wider than that in FIG. 40.

For example, referring to an interference laser detecting time point 4420 of FIG. 42, after the first time t1 at which the emitter 4220 emits the first laser, the interference laser 4410 may be sensed at the first interference time point s1 in the first detecting window w1. Accordingly, the data generated by the interference laser 4410 may be generated in a tenth time bin of the first data set 4131.

Further, for example, after the second time point t2 at which the emitter 4220 emits the second laser, the interference laser 4410 may be sensed at the second detecting time point s2 in the second detecting window w2. Accordingly, the data generated by the interference laser 4410 may be generated in a fourth time bin of the second data set 4132.

Further, for example, after the third time point t3 at which the emitter 4220 emits the third laser, the interference laser 4410 may be sensed at the third detecting time point s3 in the third detecting window w3. Accordingly, the data generated by the interference laser 4410 may be generated in a second time bin of the third data set 4133.

In the above example, the positions of the time bins to which the data generated by the interference laser 4410 is allocated are the tenth in the first data set 4131, the fourth in the second data set 4132, and the second in the third data set 4133 and thus may all be different. That is, the positions of the time bins to which the data generated by the interference laser 4410 is allocated may be different for each data set.

Accordingly, when the interference laser 4410 is sensed by the detector 4320, since the data generated by the interference laser 4410 is not generated only during a specific time bin section, but is generated in various time bin sections, a histogram in which a plurality of data sets are accumulated may not include data generated by the interference laser 4410 having a numerical value greater than or equal to a predetermined value.

Figure 43:
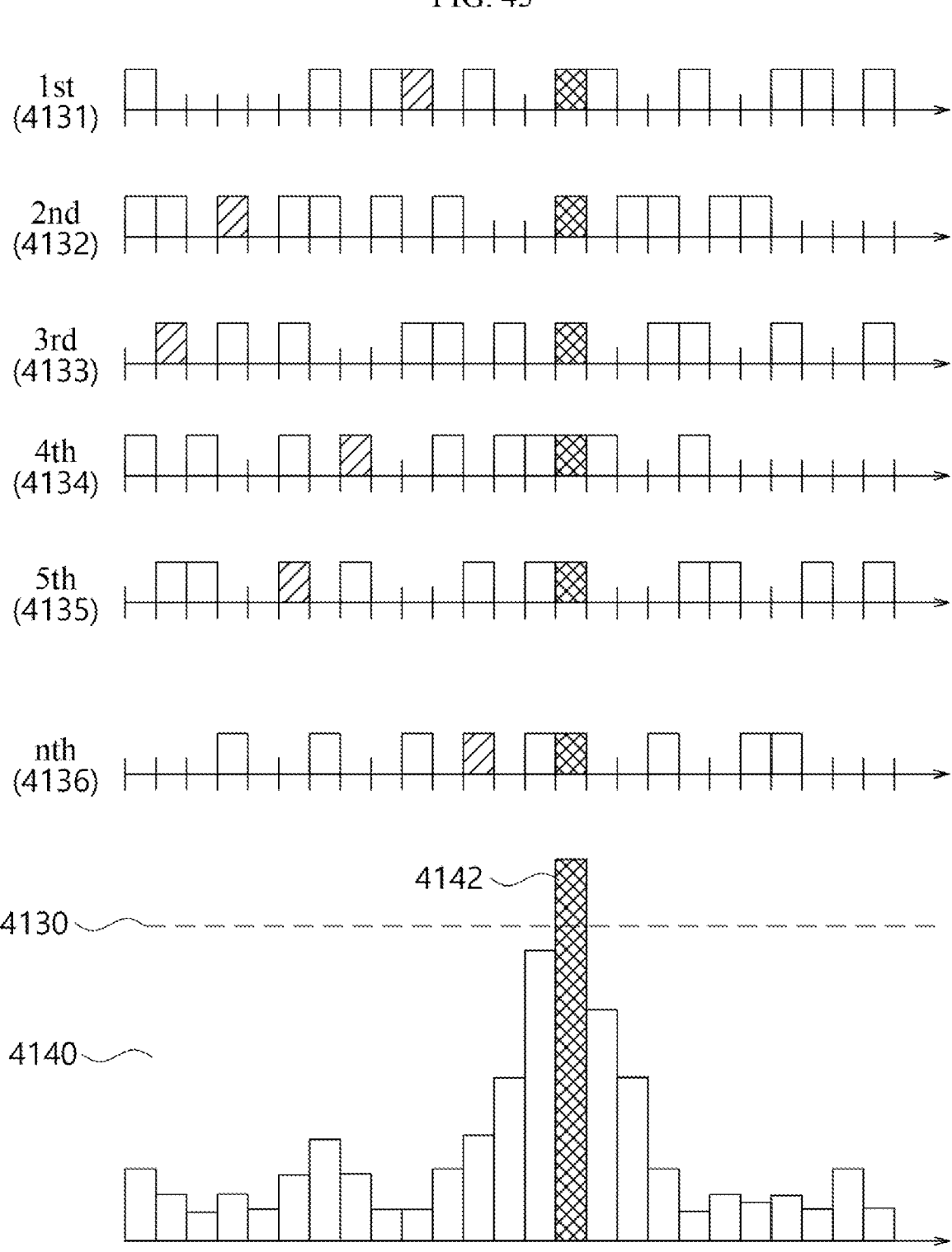
FIG. 43 is a view for describing a histogram in which plurality of data sets according to another embodiment are accumulated.

FIG. 43 is a view for describing a histogram in which the plurality of data sets according to another embodiment are accumulated. A histogram 4140 in FIG. 43 is a result in which the plurality of data sets based on the output signal of the detector 4320 in FIG. 42 are accumulated.

According to one embodiment, the histogram 4140 may include a first data set 4131, a second data set 4132, a third data set 4133, a fourth data set 4134, and a fifth data set 4135 to an Nth data set 4136.

Each data set may include data allocated to a plurality of histogram time bins. Specifically, each data set may include data generated by the interference laser 4410 and data generated by the laser 4310 in which the laser emitted from the laser emitting unit 4200 is reflected back from the object.

For example, the first data set 4131 may include data generated by the interference laser 4410 in a tenth time bin, and may include data generated by the reflective laser 4310 in a fifteenth time bin.

Further, for example, the second data set 4132 may include data generated by the interference laser 4410 in a fourth time bin, and may include data generated by the reflective laser 4310 in the fifteenth time bin.

In addition, for example, the third data set 4133 may include data generated by the interference laser 4410 in a second time bin, and may include data generated by the reflective laser 4310 in the fifteenth time bin.

In addition, for example, the fourth data set 4134 may include data generated by the interference laser 4410 in an eighth time bin, and may include data generated by the reflective laser 4310 in the fifteenth time bin.

In addition, for example, the fifth data set 4135 may include data generated by the interference laser 4410 in a sixth time bin, and may include data generated by the reflective laser 4310 in the fifteenth time bin.

In addition, for example, the Nth data set 4136 may include data generated by the interference laser 4410 in a twelfth time bin, and may include data generated by the reflective laser 4310 in the fifteenth time bin.

Since the laser emitting unit 4200 in FIG. 42 emits laser 4210 with an irregular period, the data generated by the interference laser 4410 may not be generated at or near a specific time bin, but may be generated in various time bins. For example, the data generated by the interference laser 4410 may be generated in the tenth, fourth, second, eighth, sixth, and twelfth time bins of respective data sets.

The processor 4100 may increase the temporal dispersion of the data generated by the interference laser 4410 by causing the laser emitting unit 4200 to emit the laser 4210 with an irregular period. Accordingly, in the histogram 4140 in which the plurality of data sets are accumulated, a numerical value of the data generated by the interference laser 4410 may not be greater than or equal to a predetermined value (threshold value 4130).

On the contrary, since an emission time point of the laser 4210 of the laser emitting unit 4200 and a time point of the detecting window in which the detector 4320 detects a photon are constant (or synchronized), the data generated by the reflective laser 4310 included in the data set may be generated at or near the specific time bin. For example, data generated by the reflective laser 4310 may be generated at the fifteenth time bin, or near the fifteenth time bin such as the fourteenth and sixteenth time bins of each data set.

The processor 4100 may reduce the temporal dispersion of the data generated by the laser 4210 emitted by the laser emitting unit 4200 by forming a predetermined time gap (or constant interval) between the emission time point of the laser 4210 of the laser emitting unit 4200 and a start time of a detection section of the detector 4320. Accordingly, in the histogram 4140 in which the plurality of data sets are accumulated, only the data generated by the reflective laser 4310 may have a numerical value greater than or equal to the predetermined value (threshold value 4130).

The processor 4100 may extract a sensing time of the reflective laser 4310 through the histogram 4140. The processor 4100 may extract the data having a numerical value greater than or equal to the threshold value 4130 from among the data in the histogram 4140, and extract the sensing time of the reflective laser 4310 based on a time section of the data.

In this case, in the histogram 4140 in FIG. 43, since the number of pieces of data having a numerical value greater than or equal to the threshold value 4130 is smaller than the number in the histogram 4120 in FIG. 41, a process of extracting the sensing time of the reflective laser 4310 may be easier.

That is, the processor 4100 may easily extract the sensing time of the reflective laser 4310 by reducing the temporal dispersion of the data generated by the reflective laser 4310 and increasing the temporal dispersion of the data generated by the interference laser 4410 to minimize the number of pieces of data having a numerical value greater than or equal to the threshold value 4130.

For example, in the histogram 4120 in FIG. 41, since the temporal dispersion of the data generated by the interference laser 4410 is small, the number of pieces of data having a numerical value greater than or equal to the threshold value 4130 becomes two, and thus the processor 4100 may erroneously extract the detecting time point of the reflective laser 4310 based on the data 4121 generated by the interference laser 4410.

However, in the histogram 4140 in FIG. 43, since the temporal dispersion of the data generated by the interference laser 4410 is large, the number of pieces of data having a numerical value greater than or equal to the threshold value 4130 becomes one, and thus the processor 4100 may correctly extract the detecting time point of the reflective laser 4310 based on data 4142 generated by the reflective laser 4310.

In the method in which the processor 4100 extracts the detecting time of the reflective laser 4310 in the histogram, only an extraction method using the threshold value 4130 has been described, but the present disclosure is not limited thereto, and various methods may be applied.

For example, the processor 4100 may also extract the detecting time of the reflective laser 4310 using a center of mass of the data in the histogram.

Further, for example, when a plurality of pieces of generated data having a numerical value greater than or equal to the threshold value 4130 are present in the histogram, the processor 4100 may extract the detecting time of the reflective laser 4310 based on a section where data having the highest numerical value is present or sections where the data having the highest numerical value and nearby data are present.

As a specific example, among the plurality of pieces of data having a numerical value greater than or equal to the threshold value 4130, there may be a case in which a numerical value of data generated in the fifth time bin having a time section of 4 Ψs to 5 Ψs is 50, and a numerical value of data generated in the fourth time bin having a time section of 3 Ψs to 4 Ψs is 40, and a numerical value of data generated in the sixth time bin having a time section of 5 Ψs to 6 Ψs is 30.

In this case, since the data having the highest numerical value is the data generated in the fifth time bin, the processor 4100 may determine that the reflective laser 4310 is sensed by the detector 4320 in the section of 4 Ψs to 5 Ψs, which is the time section of the fifth time bin. In this case, additionally, the processor 4100 may extract the detecting time point with reference to the numerical values of the data generated in the fourth time bin and the sixth time bin, which are the time bins before and after the fifth time bin.

For example, since the numerical value generated in the fourth time bin is greater than the numerical value generated in the sixth time bin, the processor 4100 may determine that the reflective laser 4310 is sensed by the detector 4320 at a time point before 4.5 Ψs, which is a middle point of the time section of the fifth time bin.

As a specific example, the processor 4100 may divide the time section of 4 Ψs to 5 Ψs of the fifth time bin with a ratio of the numerical value of the data generated in the fourth time bin and the numerical value of the data generated in the sixth time bin. That is, the processor 4100 may determine that the reflective laser 4310 is sensed at 4.42 Ψs by the detector 4320 through the ratio (40:30, that is, 4:3), but the present disclosure is not limited thereto, and a calculation method through the ratio may vary.

Not limited to the above example, the method in which the processor 4100 finds the detecting time point of the reflective laser 4310 in the histogram may be all methods applicable by those skilled in the art.

Figure 44:
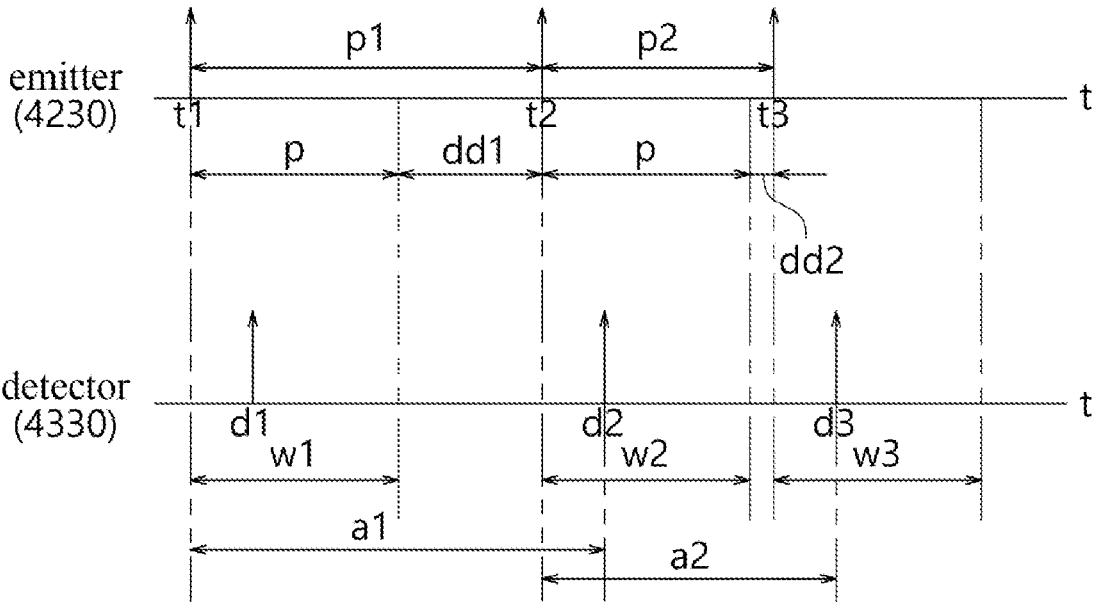
FIG. 44 is a view for describing a timing of a laser emission signal of a laser emitting unit and a timing of a received signal of a detecting unit.

FIG. 44 is a view for describing a timing of the laser emission signal of the laser emitting unit and a timing of a received signal of the detecting unit.

Referring to FIG. 44, the laser emitting unit 4200 may include an emitter 4230 which emits a laser, and the detecting unit 4300 may include a detector 4330 which senses a photon.

Since descriptions of the emitter 4230 and the detector 4330 overlap the above description, the detailed descriptions thereof will be omitted.

According to one embodiment, the emitter 4230 may emit a first laser at a first time point t1, may emit a second laser at a second time point t2, and may emit a third laser at a third time point t3 under control of the processor 4100.

A time gap equal to a first period p1 may be present between the first time point t1 and the second time point t2, and a time gap equal to a second period p2 may be present between the second time point t2 and the third time point t3.

A first time gap may be the sum of a fixed period p and a first delay dd1, and a second time gap may be the sum of the fixed period p and a second delay dd2. In this case, when the first delay dd1 and the second delay dd2 are the same, the first period p1 and the second period p2 may be the same. Alternatively, when the first delay dd1 and the second delay dd2 are different, the first period p1 and the second period p2 may be different.

In order to increase the temporal dispersion of the data generated by the interference laser 4410, the processor 4100 may set the first period p1 and the second period p2 to be different to control the laser emitting time point of the emitter 4230.

The processor 4100 may irregularly control the emitting time point itself of the emitter 4230 as the first period p1, the second period p2, and the like to determine the first time point t1, the second time point t2, and the third time point t3. Alternatively, the processor 4100 may transmit a trigger signal to the emitter 4230 to have a constant fixed period p, and add irregular variable delays d1 and d2 to the trigger signal to determine the first time point t1, the second time point t2, and the third time point t3. The detailed description overlaps the description of the above and thus will be omitted.

According to one embodiment, the detector 4330 may detect a photon for a predetermined period under the control of the processor 4100. Referring to FIG. 44, the detector 4330 may detect a photon during a first detecting window w1, a second detecting window w2, and a third detecting window w3.

In this case, an interval between the first time point t1 and a start time of the first detecting window w1, an interval between the second time point t2 and a start time of the second detecting window w2, and an interval between the third time point t3 and a start time of the third detecting window w3 may have the same first time gap.

An interval between the laser emitting time point of the emitter 4230 and a start time of a photon sensing window (detecting time window) of the detector is the same to reduce the temporal dispersion of the data generated by the reflective laser 4310.

That is, when the first laser, the second laser, and the third laser facing the same region or object are reflected and sensed by the detector 4330, since the lasers are reflected to the same region or object, a distance of the region calculated by the first laser, a distance of the region calculated by the second laser, and a distance of the region calculated by the third laser should all be the same.

Accordingly, intervals between the laser emitting time point of the emitter 4230 and the start time of the photon sensing window of the detector may all be the same as the first time gap so that the distances calculated by the lasers are all the same.

In this case, since a case in which the first time gap is zero and a case in which the first time gap is not zero may overlap the description in FIG. 40, the detailed description will be omitted.

According to one embodiment, the laser emitted from the emitter 4230 may be detected in a photon sensing section of the detector 4330.

For example, the detector 4330 may sense (or detect) the reflective laser 4310 reflected back from the object among the first laser emitted by the emitter 4230 at the first time point t1 during the first detecting window w1 which is a photon sensing section at a first detecting time point d1.

Further, for example, the detector 4330 may sense the reflective laser 4310 reflected back from the object among the second laser emitted by the emitter 4230 at the second time point t2 during the second detecting window w2 which is a photon sensing section at a second detecting time point d2.

In addition, for example, the detector 4330 may sense the reflective laser 4310 reflected back from the object among the third laser emitted by the emitter 4230 at the third time point t3 during the third detecting window w3 which is a photon sensing section at a third detecting time point d3.

When the interval between the laser emitting time point of the emitter 4230 and the start time of the photon sensing detecting window of the detector is the same as the first time gap, an interval between the first time point t1 and the first detecting time point d1, an interval between the second time point t2 and the second detecting time point d2, and an interval between the third time point t3 and the third detecting time point d3 may all be the same.

In this case, when a laser emission period of the emitter 4230 is irregular, a first distribution interval a1, which is an interval between the first time point t1 and the second detecting time point d2, may be different from a second distribution interval a2 which is an interval between the second time point t2 and the third detecting time point d3.

Since 1) the interval between the laser emitting time point of the emitter 4230 and the start time of the photon sensing detecting window of the detector is the same as the first time gap, 2) an interval between the laser emitting time point and the detecting time point of the laser is the same, and 3) the first distribution interval a1 and the second distribution interval a2 are different, the temporal distribution of the data generated by the interference laser 4410 may be wide, and the temporal distribution of the data generated by the reflective laser 4310 may be narrow.

Accordingly, when the processor 4100 accumulates the plurality of data sets, the histogram may be generated so that a range of the time bins to which the data generated by the interference laser 4410 is allocated may be wide, and a range of the time bins to which the data generated by the reflective laser 4310 is allocated may be narrow.

In other words, in the histogram, the range of the time bins to which the data generated by the interference laser 4410 is allocated may be a first range, and the range of the time bins to which the data generated by the reflective laser 4310 is allocated may be a second range which is narrower than the first range.

Figure 45:
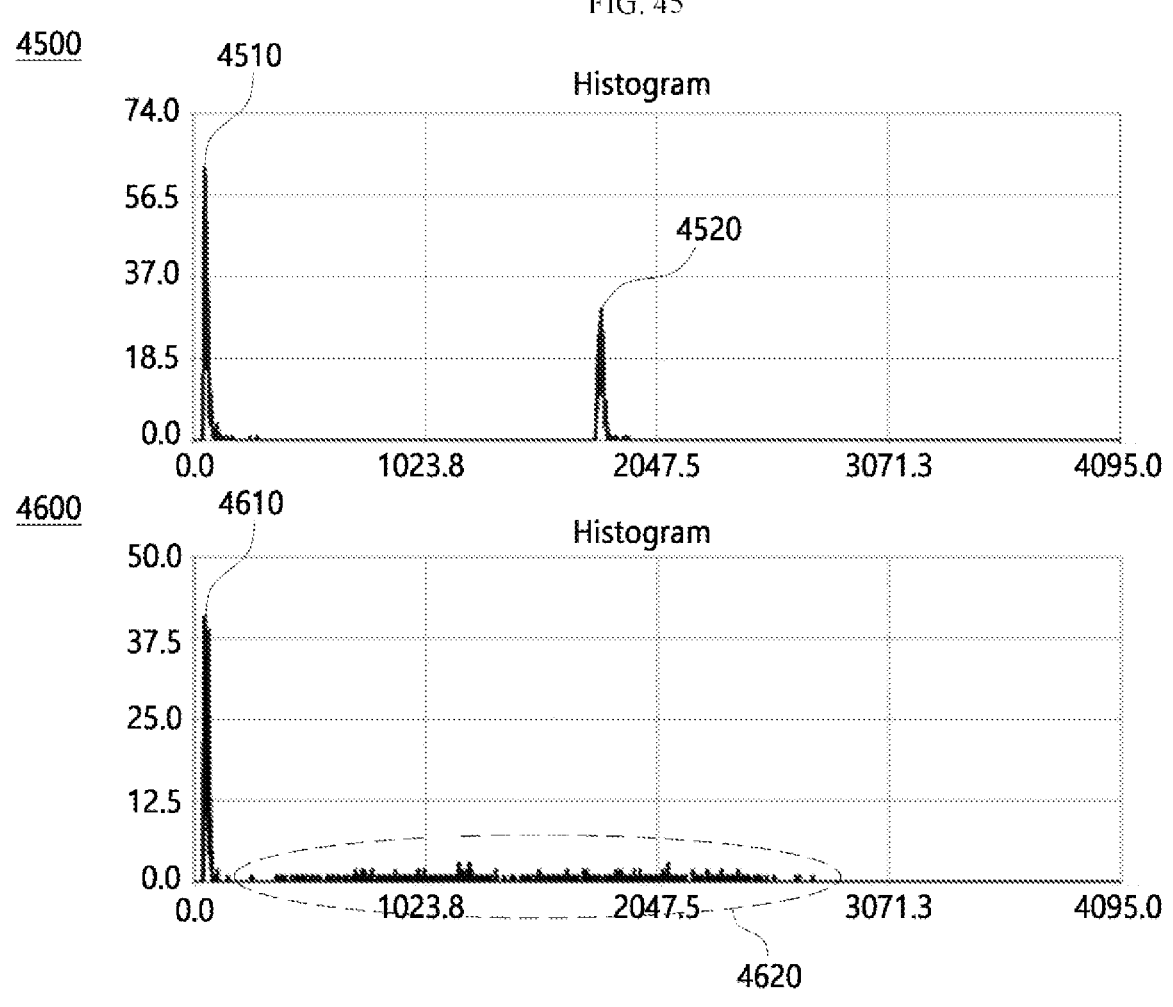
FIG. 45 is a view for describing a histogram according to the timing of the laser emission signal of the laser emitting unit.

FIG. 45 is a view for describing the histogram according to the timing of the laser emission signal of the laser emitting unit.

FIG. 45A is a view for describing a first histogram 4500 according to an emission signal timing of the laser emitting unit in FIG. 40. FIG. 45B is a view for describing a second histogram 4600 according to an emission signal timing of the laser emitting unit in FIG. 42.

Referring to FIG. 45A, data having a numerical value greater than or equal to a threshold value in the first histogram 4500 may be first data 4510 and second data 4520. Here, the first data and the second data may mean "counting value" of histogram.

The first data 4510 may be data generated by the laser emitted from the laser emitting unit 4200, and the second data 4520 may be data generated by the interference laser 4410.

When calculating a distance of the object through the first histogram 4500, the processor 4100 may calculate a distance based on the data having a numerical value greater than or equal to the threshold value. In this case, the processor 4100 may calculate a distance based on the first data 4510 or calculate a distance based on the second data 4520. However, when the processor 4100 calculates the distance based on the second data 4520, an error may occur in distance measurement.

Referring to FIG. 45B, third data 4610 may be unique data having a numerical value greater than or equal to the threshold value in the second histogram 4600. Further, in the second histogram 4600, fourth data 4620 may be a plurality of pieces of data having a numerical value less than or equal to the threshold value.

In this case, the third data 4610 may be data generated by the laser emitted from the laser emitting unit 4200, and the fourth data 4620 may be data generated by the interference laser 4410.

Since the processor 4100 reduces the temporal dispersion of the data generated by the laser emitted from the laser emitting unit 4200, the data is accumulated in a narrow range of time bins and thus the third data 4610 having a numerical value greater than or equal to the threshold value may be generated.

Further, since the processor 4100 increases the temporal dispersion of the data generated by the interference laser 4410, the data is accumulated in a wide range of time bins of a predetermined section and thus the fourth data 4620 having a numerical value less than or equal to the threshold value may be generated.

The processor 4100 may calculate the distance based on the data having a numerical value equal to or greater than the threshold value when calculating the distance of the object through the second histogram 4600. In this case, since the third data 4610 is only data having a numerical value greater than or equal to the threshold value in the second histogram 4600, the distance may be calculated based on the third data 4610.

Accordingly, the processor 4100 may calculate a more accurate distance in the case of calculating the distance of the object through the second histogram 4600 than in the case of calculating the distance of the object through the first histogram 4500.

Figure 46:
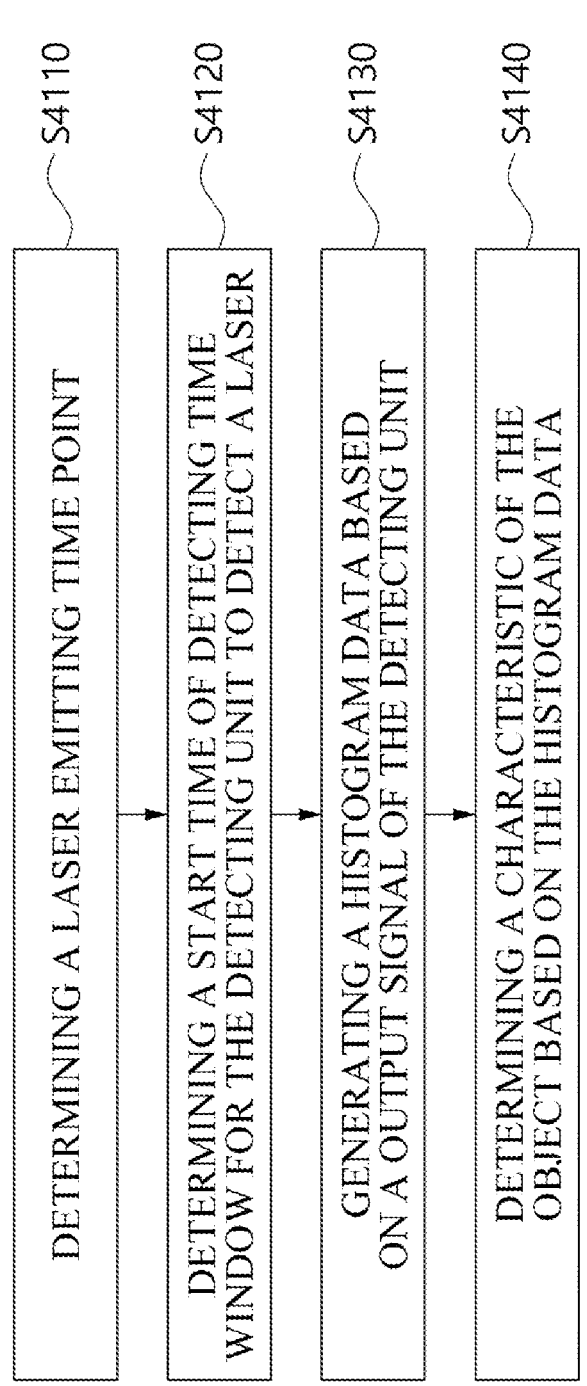
FIG. 46 is a view for describing a method of controlling a light detection and ranging (LiDAR) device according to one embodiment.

FIG. 46 is a view for describing a method of controlling a light detection and ranging (LiDAR) device according to one embodiment.

Referring to FIG. 46, the method of controlling the LiDAR device may include an operation of determining a laser emitting time point (S4110), an operation of determining a start time of a detecting window which detects a laser of a detecting unit (S4120), an operation of generating a histogram based on an output signal of the detecting unit (S4130), and an operation of determining a characteristic of an object based on the data of the histogram (S4140).

According to one embodiment, the operation of determining the laser emitting time point (S4110) may include an operation of determining a first laser emitting time point t1, a second laser emitting time point t2, and a third laser emitting time point t3 in FIG. 42. The detailed description may overlap the description in FIG. 42 and thus will be omitted.

According to one embodiment, the operation of determining the start time of the detecting window which detects the laser of the detecting unit (S4120) may include an operation of determining a start time of a first detecting window w1, a start time of a second detecting window w2, and a start time of a third detecting window w3 in FIG. 42. The detailed description may overlap the description in FIG. 42 and thus will be omitted.

According to one embodiment, the operation of generating the histogram based on the output signal of the detecting unit (S4130) may include an operation of accumulating a first data set 4131, a second data set 4132, a third data set 4133, a fourth data set 4134, and a fifth data set 4135 to an Nth data set 4136 in FIG. 43 to generate a histogram 4140. The detailed description may overlap the description in FIG. 43 and thus will be omitted.

According to one embodiment, the operation of determining the characteristic of the object based on the data of the histogram (S4140) may include an operation of calculating or determining a distance, a center point, a position coordinates, and the like of the object. This may overlap the above description, and thus will be omitted.

Hereinafter, a method in which the processor of the LiDAR device determines a detecting parameter according to a detecting environment will be described.

The detecting parameter of the detecting unit 4300 may be determined corresponding to a detecting environment. For example, the detecting parameter may be determined according to an amount of external noise or the degree of saturation of the data generated by the reflective laser 4310.

In order to improve the accuracy of distance measurement, the detecting parameter should be differently determined for each region to be measured. For example, when the noise of the first region is greater than the noise of the second region, the detecting parameter of the histogram for the first region may be greater than the detecting parameter for the second region.

Specifically, a threshold value of the histogram for the first region may be greater than a threshold value of the histogram for the second region. As a result, since the threshold value of the histogram for the first region is high, it is possible to improve the accuracy of distance measurement for the first region having a greater amount of noise than the second region.

Since the detecting parameter may vary depending on an external environment, data for determining the detecting parameter should not include data generated by the laser emitted from the laser emitting unit 4200. That is, there should be no influence of the laser emitted from the laser emitting unit 4200 in an environment in which the detecting parameter is measured.

In other words, the laser emitting unit 4200 should not emit the laser during the time section in which the detecting parameter is determined. Accordingly, the processor 4100 may control the laser emitting unit 4200 to emit the laser after the time section in which the detecting parameter is determined.

Figure 47:
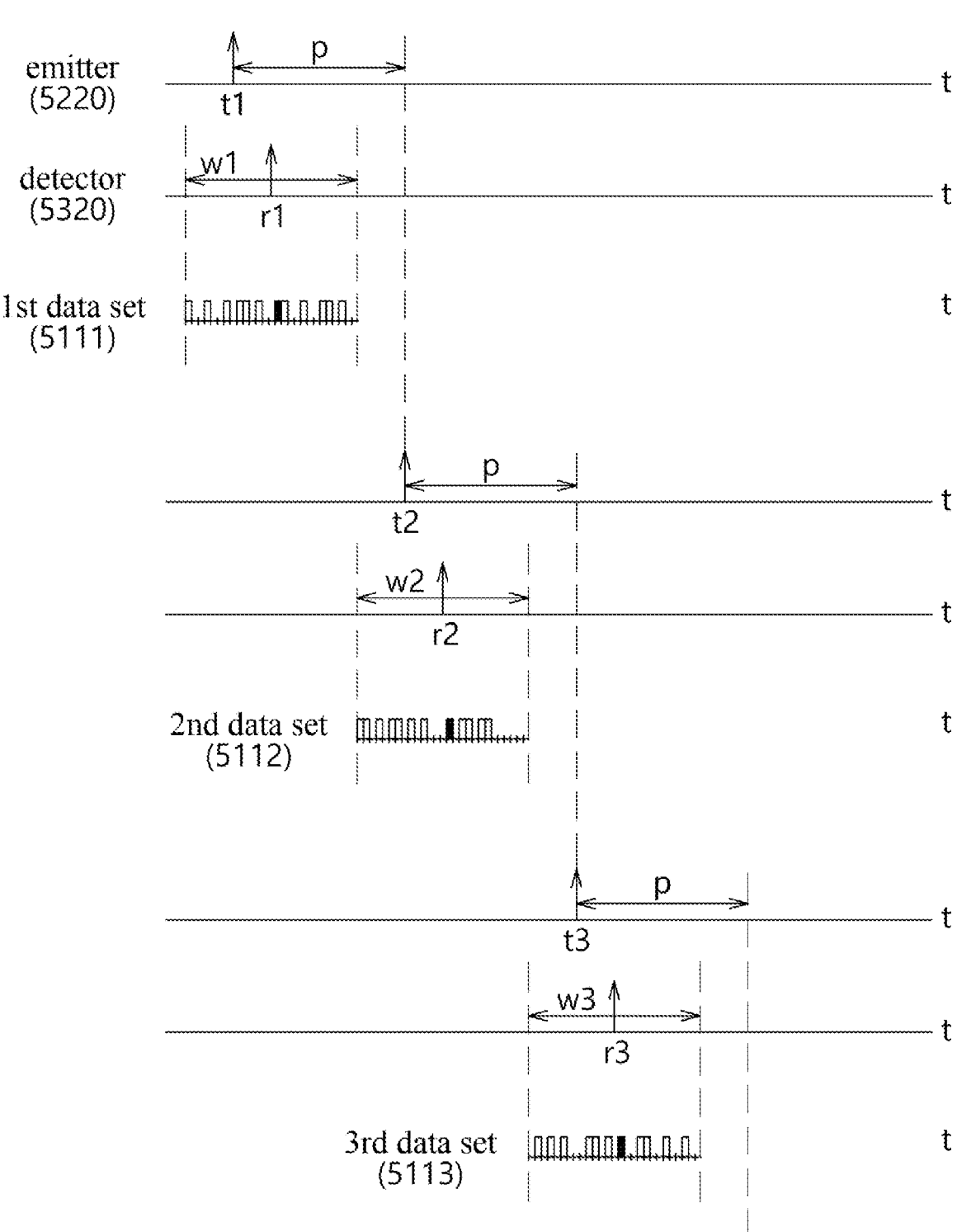
FIG. 47 is a view for describing a plurality of data sets based on a plurality of output signals of a detecting unit according to still another embodiment.

FIG. 47 is a view for describing a plurality of data sets based on a plurality of output signals of a detecting unit according to still another embodiment.

Referring to FIG. 47, the laser emitting unit 4200 may emit a laser through an emitter 5220. Further, the detecting unit 4300 may detect a photon through a detector 5320.

In this case, the photon may be included in the reflective laser 4310 in which the laser emitted from the emitter 5220 is reflected back from the object. Alternatively, the photon may be included in external noise such as sunlight or the like.

The detector 5320 may generate an output signal by detecting a photon. The detector 5320 or the processor 4100 may generate data sets 5111, 5112, and 5113 including a plurality of pieces of data based on the output signal of the detector 5320. For example, the processor 4100 may generate 50, 100, 500, 1024, 2048, or 4096 data sets based on the output signal of the detector 5320, but the present disclosure is not limited thereto.

As a result, the processor 4100 may generate a histogram by accumulating the plurality of data sets 5111, 5112, and 5113. For example, the processor 4100 may generate a histogram by accumulating the 50, 100, 500, 1024, 2048, or 4096 data sets, but the present disclosure is not limited thereto. The processor 4100 may determine a characteristic of the object based on the generated histogram.

According to one embodiment, the emitter 5220 may emit the laser 4210 every first period p. For example, the emitter 5220 may emit a first laser at a first time point t1 and may emit a second laser at a second time point t2, which is a time point after the first period p from the first time point t1.

Further, the emitter 5220 may emit a third laser at a third time point t3 that is a time point after the first period p from the second time point t2.

The detector 5320 may detect a photon during a first detecting window w1, a second detecting window w2, and a third detecting window w3. The detecting windows may be interchanged with a detecting time window of the detector 5320.

In this case, a laser emitting time point of the emitter 5220 may be present in the detecting time window of the detector 5320. For example, the first time point t1 may be present in the first detecting window w1, the second time point t2 may be present in the second detecting window w2, and the third time point t3 may be present in the third detecting window w3.

In this case, sizes of the first detecting window w1, the second detecting window w2, and the third detecting window w3 which are the detecting time window of the detector 5320 may all be the same.

Further, in this case, a size of the first period p, which is a laser emission period of the emitter 5220, may be the same as the size of the detecting detecting windows w1, w2, and w3 of the detector 5320, but the present disclosure is not limited thereto.

According to one embodiment, the detector 5320 may sense the first laser emitted at the first time point t1 at a first detecting time point r1, and may sense the second laser emitted at the second time point t2 at a second detecting time point r2, and may sense the third laser emitted at the third time point t3 at a third detecting time point r3.

In this case, the processor 4100 or the detector 5320 may generate a first data set 5111 based on a result of detecting a photon during the first detecting window w1, may generate a second data set 5112 based on a result of detecting a photon during the second detecting window w2, and may generate a third data set 5113 based on a result of detecting a photon during the third detecting window w3.

Accordingly, the first data set 5111 may include data generated by the first laser, the second data set 5112 may include data generated by the second laser, and the third data set 5113 may include data generated by the third laser.

The processor 4100 may make a relationship between the laser emitting time point of the emitter 5220 and the photon detecting detecting window of the detector 5320 constant, so that the data generated by the reflective laser 4310 may be allocated to a specific time bin of each data set.

Specifically, the processor 4100 may make an interval between the laser emission point of the emitter 5220 and the start time of the photon detecting window of the detector 5320 constant so that the data generated by the reflective laser 4310 may be allocated to a specific time bin of each data set.

For example, the processor 4100 may control the emitter 5220 to emit the first laser after a reference interval from the start time of the first detecting window w1 of the detector 5320. Further, the processor 4100 may control the emitter 5220 to emit the second laser after a reference interval from the start time of the second detecting window w2 of the detector 5320, and emit the third laser after a reference interval from the start time of the third detecting window w3 of the detector 5320

Accordingly, the first time point t1 may be a time point after a reference interval from the start time of the first detecting window w1, the second time point t2 may be a time point after a reference interval from the start time of the second detecting window w2, and the third time point t3 may be a time point after a reference interval from the start time of the third detecting window w3.

The processor 4100 may reduce the temporal dispersion of the data generated by the reflective laser 4310 in the histogram by making the relationship between the laser emitting time point of the emitter 5220 and the photon detecting window of the detector 5320 constant. Accordingly, when the processor 4100 generates the histogram by accumulating the plurality of data sets, the data generated by the reflective laser 4310 included in the histogram may be accumulated in a specific time bin to have a numerical value greater than or equal to a predetermined value or a threshold value.

Figure 48:
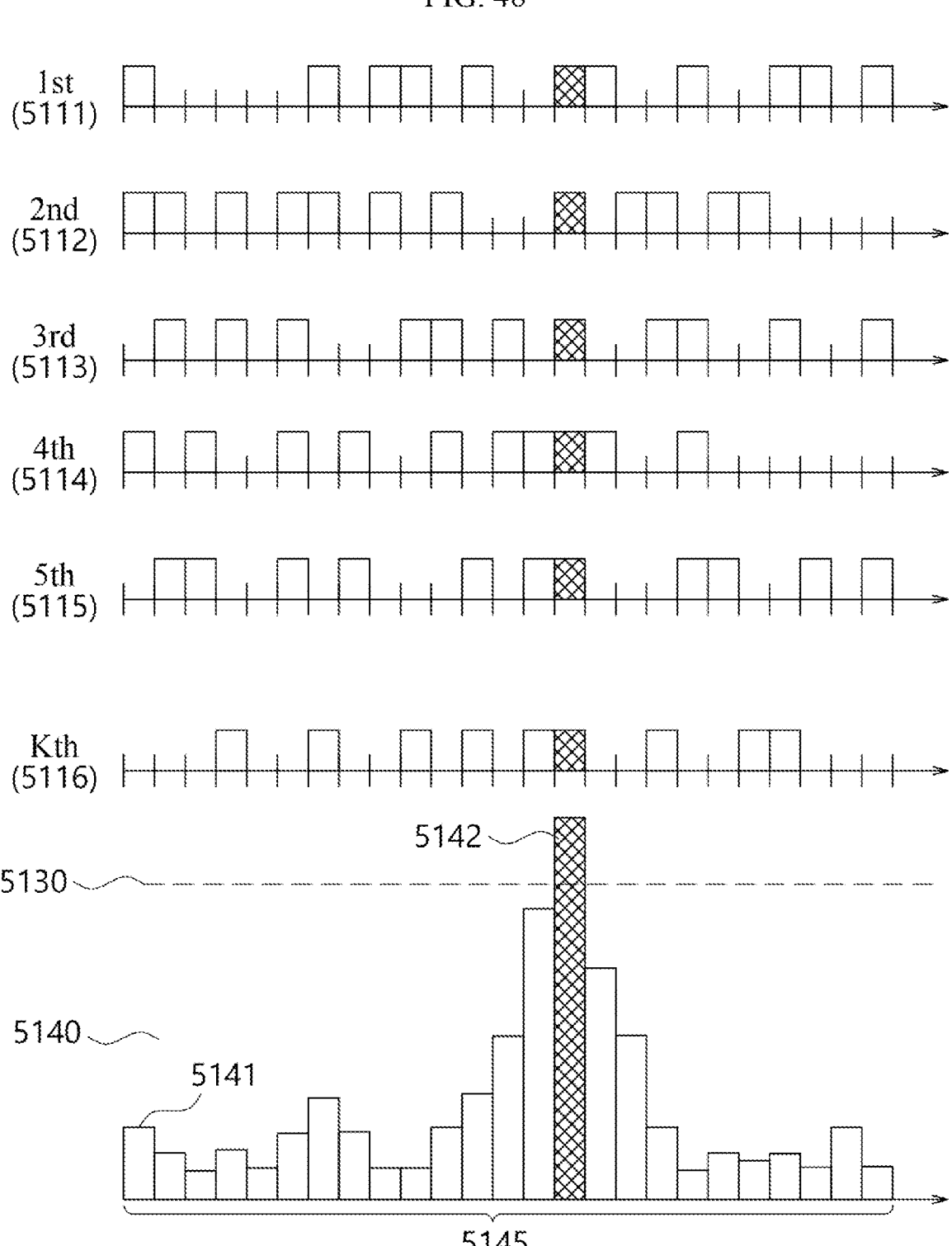
FIG. 48 is a view for describing a histogram in which the plurality of data sets according to still another embodiment are accumulated.

FIG. 48 is a view for describing a histogram in which a plurality of data sets according to still another embodiment are accumulated. The histogram in FIG. 48 is a result of accumulating the plurality of data sets based on the output signal of the detector 5320.

According to one embodiment, a histogram 5140 may include a first data set 5111, a second data set 5112, a third data set 5113, a fourth data set 5114, and a fifth data set 5115 to an Kth data set 5116.

In this case, the first data set 5111, the second data set 5112, the third data set 5113, the fourth data set 5114, the fifth data set 5115 to the Kth data set 5116 may be a set of data generated during each of a plurality of cycles of the detector.

For example, the first data set 5111 may be data generated during a first detecting window w1 which is a detector cycle, the second data set 5112 may be data generated during a second detecting window w2 which is a detector cycle, and the third data set 5113 may be data generated during a third detecting window w3 which is a detector cycle.

Each data set may include data allocated to a plurality of histogram time bins. Specifically, each data set may include data generated by the reflective laser 4310.

For example, the first data set 5111 may include data generated by the reflective laser 4310 in a fifteenth time bin.

The second data set 5112, the third data set 5113, the fourth data set 5114, and the fifth data set 5115 to the Kth data set 5116 may also include data generated in the fifteenth time bin of each data set by the reflective laser 4310.

The histogram 5140 may include a plurality of pieces of accumulated data 5145. Specifically, accumulated data may be allocated to each time bin of the histogram 5140.

For example, first accumulated data 5141 may be allocated to a first time bin of the histogram 5140. Further, for example, second accumulated data 5142, which is data generated by the reflective laser 4310, may be allocated to the fifteenth time bin of the histogram 5140.

The processor 4100 may determine a detecting parameter or extract a detecting time point of the reflective laser 4310 using the plurality of pieces of accumulated data 5145 included in the histogram 5140.

First, the processor 4100 may determine the detecting parameter based on the accumulated data allocated to the first to Nth time bins among the plurality of pieces of accumulated data 5145 included in the histogram 5140.

In this case, the detecting parameter may be a gain or sensitivity of the detector 5320 or a threshold value 5130 of the histogram 5140, but the present disclosure is not limited thereto, and may be another variable according to the detecting environment.

Subsequently, the processor 4100 may extract the detecting time point of the reflective laser 4310 through the accumulated data allocated to time bins after an Mth time bin among the plurality of pieces of accumulated data 5145 included in the histogram 5140 and the detecting parameter. In this case, the time bins after the Mth time bin may include the Mth time bin.

Specifically, the processor 4100 may extract the detecting time point of the reflective laser 4310 through the accumulated data having a numerical value greater than or equal to a predetermined value or a threshold value (which may be included in the detecting parameter) among the accumulated data allocated to the time bins after the Mth time bin.

For example, the processor 4100 may extract the detecting time point of the reflective laser 4310 through second accumulated data 5142 having a numerical value greater than or equal to the threshold value 5130 among the accumulated data allocated to the time bins after the Mth time bin.

Figure 49:
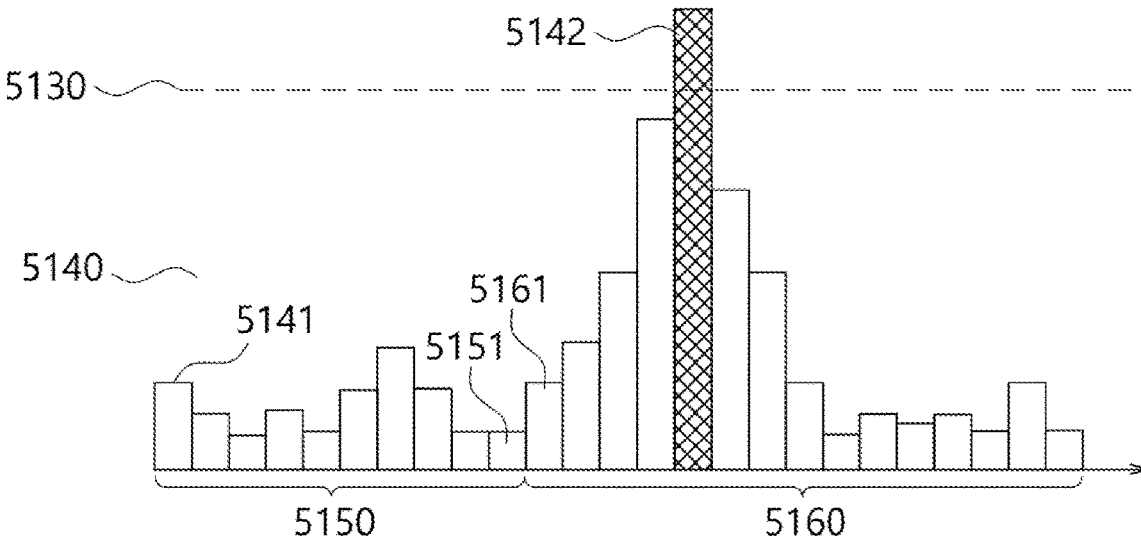
FIG. 49 is a view for describing a histogram and a relationship between a laser emitting time point of the laser emitting unit and a detecting window of the detecting unit according to still another embodiment.
Figure 49:
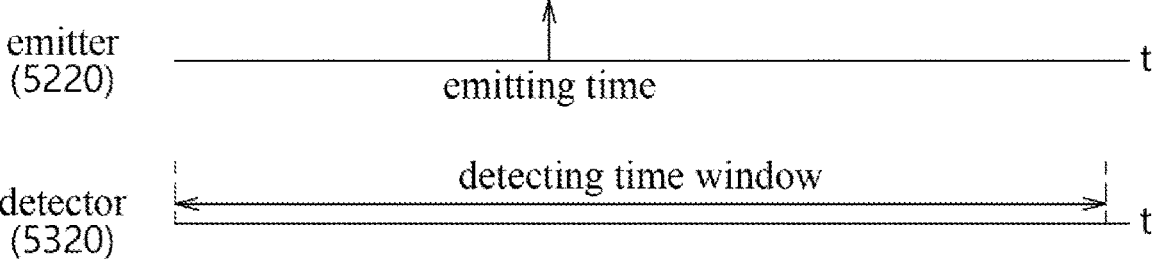

FIG. 49 is a view for describing a histogram and a relationship between a laser emitting time point of the laser emitting unit and a detecting time window of the detecting unit according to still another embodiment.

Referring to FIG. 49, the histogram 5140 according to one embodiment may include at least one or more accumulated data groups. For example, the histogram 5140 may include a first accumulated data group 5150 and a second accumulated data group 5160.

The first accumulated data group 5150 may be a plurality of accumulated data groups including at least one piece of accumulated data allocated to the first to Nth time bins of the histogram 5140. In this case, in the example of the histogram 5140 in FIG. 48, the first accumulated data group 5150 is expressed as a group of accumulated data (that is, a case in which N is 10) including at least some of the accumulated data 5141 allocated to the first time bin to accumulated data 5151 allocated to a tenth time bin, but the present disclosure is not limited thereto, and N may have different numerical values.

The second accumulated data group 5160 may be a plurality of accumulated data groups including at least one piece of accumulated data allocated to the time bin after the Mth time bin of the histogram 5140. In this case, the second accumulated data group 5160 may be a group of the accumulated data allocated to the Mth time bin to the last time bin of the histogram 5140, and may be a group including at least some of the accumulated data allocated to the Mth time bin to the last time bin of the histogram 5140.

In this case, in the example of the histogram 5140 in FIG. 49, the second accumulated data group 5160 is expressed as a group of accumulated data (that is, a case in which M is 11) including at least some of accumulated data 5161 allocated to an eleventh time bin to accumulated data allocated to a twenty-fifth time bin, but the present disclosure is not limited thereto, and M may have different numerical values.

Alternatively, not limited to the above example, the second accumulated data group 5160 may be a group of accumulated data allocated to the eleventh time bin to a twentieth time bin.

Alternatively, not limited to the above example, the second accumulated data group 5160 may be a group of accumulated data allocated to a fourteenth time bin to the twentieth time bin among the data allocated to the eleventh time bin to the twenty-fifth time bin.

According to one embodiment, the processor 4100 may control the laser emitting time point of the emitter 5220 included in the laser emitting unit 4200. In this case, the processor 4100 may control the laser emitting time point of the emitter 5220 so that the data generated by the laser emitted from the emitter 5220 may not be included in the first accumulated data group 5150.

That is, the processor 4100 may control the laser emitting time point of the emitter 5220 so that the data generated by the reflective laser 4310 in which the laser emitted from the emitter 5220 is reflected back from the object may not be included in the first accumulated data group 5150.

In this case, the processor 4100 may control the emitter 5220 to emit the laser after a predetermined time from a start time of a detecting time window section of the detector 5320.

Specifically, the processor 4100 may control the emitter 5220 to emit the laser after the time corresponding to the Nth time bin of the detecting time window of the detector 5320.

For example, in FIG. 48, the processor 4100 may control the emitter 5220 to emit the laser after the time corresponding to the tenth time bin or after the time corresponding to the eleventh time bin among the detecting time window of the detector 5320. In this case, after the time corresponding to the eleventh time bin may include the time corresponding to the eleventh time bin.

Hereinafter, a laser emitting time point according to a relationship between the Nth time bin and the Mth time bin will be looked at in detail.

The relationship between the Nth time bin and the Mth time bin may be divided into the following three cases. A first case is a case in which N and M are the same. A second case is a case in which M is greater than N. A third case is a case in which M is less than N.

First, referring to the first case in which M and N are the same, the first accumulated data group may include at least one piece of accumulated data allocated to the first time bin to the Nth time bin. Further, the second accumulated data group may include at least one piece of accumulated data allocated after the Nth time bin. Accordingly, the first accumulated data group and the second accumulated data group may include overlapping accumulated data (that is, the accumulated data allocated to the Nth time bin).

In this case, the processor 4100 may control the emitter 5220 to emit the laser after the time corresponding to the Nth time bin so that the data generated by the reflective laser 4310 may not be included in the first accumulated data group.

As a specific example, when M and N are ten, the first accumulated data group may include at least one piece of accumulated data allocated to the first to tenth time bins, and the second accumulated data group may include at least one piece of accumulated data allocated after the tenth time bin.

In this case, the processor 4100 may control the emitter 5220 to emit the laser after the time corresponding to the tenth time bin or after the time corresponding to the eleventh time bin.

As a specific example, when the time interval of the time bin is 1 ns and the time section corresponding to the first time bin is 0 ns to 1 ns, the time corresponding to the tenth time bin may be 9 ns to 10 ns, and the time corresponding to the eleventh time bin may be 10 ns to 11 ns.

In this case, the processor 4100 may control the emitter 5220 to emit the laser 10 ns after the start time of the detecting time window of the detector 5320.

Further, referring to the second case in which M is greater than N, the first accumulated data group may include at least one piece of accumulated data allocated to the first time bin to the Nth time bin. Further, the second accumulated data group may include at least one piece of accumulated data allocated after the Mth time bin which is temporally later than the Nth time bin. Accordingly, the first accumulated data group and the second accumulated data group may not include overlapping accumulated data.

In this case, the processor 4100 may control the emitter 5220 to emit the laser after the time corresponding to the Mth time bin so that the data generated by the reflective laser 4310 may not be included in the first accumulated data group.

As a specific example, when M is 11 and N is 10, the first accumulated data group may include at least one piece of accumulated data allocated to the first time bin to the tenth time bin, and the second accumulated data group may include at least one piece of accumulated data allocated after the eleventh time bin.

In this case, the processor 4100 may control the emitter 5220 to emit the laser after the time corresponding to the tenth time bin or after the time corresponding to the eleventh time bin.

As a specific example, when the time interval of the time bin is 1 ns and the time section corresponding to the first time bin is 0 ns to 1 ns, the time corresponding to the tenth time bin may be 9 ns to 10 ns, and the time corresponding to the eleventh time bin may be 10 ns to 11 ns.

In this case, the processor 4100 may control the emitter 5220 to emit the laser 10 ns after the start time of the detecting time window of the detector 5320.

Further, referring to the third case in which M is less than N, the first accumulated data group may include at least one piece of accumulated data allocated to the first time bin to the Nth time bin. Further, the second accumulated data group may include at least one piece of accumulated data allocated after the Mth time bin which is temporally earlier than the Nth time bin. Accordingly, the first accumulated data group and the second accumulated data group may include overlapping accumulated data.

In this case, the processor 4100 may control the emitter 5220 to emit the laser after the time corresponding to the Nth time bin so that the data generated by the reflective laser 4310 may not be included in the first accumulated data group.

As a specific example, when M is 9 and N is 10, the first accumulated data group may include at least one piece of accumulated data allocated to the first time bin to the tenth time bin, and the second accumulated data group may include at least one piece of accumulated data allocated after the ninth time bin.

In this case, the processor 4100 may control the emitter 5220 to emit the laser after the time corresponding to the tenth time bin or after the time corresponding to the eleventh time bin.

As a specific example, when the time interval of the time bin is 1 ns and the time section corresponding to the first time bin is 0 ns to 1 ns, the time corresponding to the tenth time bin may be 9 ns to 10 ns, and the time corresponding to the eleventh time bin may be 10 ns to 11 ns.

In this case, the processor 4100 may control the emitter 5220 to emit the laser 10 ns after the start time of the detecting time window of the detector 5320.

Accordingly, regardless of the relationship between M and N, the processor 4100 may control the emitter 5220 to emit the laser after the time corresponding to the Nth time bin. However, M may be greater than N so that the first accumulation data group and the second accumulation data group may not include the overlapping accumulation data, but the present disclosure is not limited thereto, and M and N may be determined according to the purpose of the processor 4100.

According to one embodiment, the processor 4100 may control the laser emitting time point of the laser emitting unit 4200 so that the laser emitted from the laser emitting unit 4200 may not affect an environment for measuring the detecting parameter.

For example, the processor 4100 may not emit the laser during the section in which the detecting parameter is measured, and may emit the laser after the section.

Accordingly, the histogram generated by the processor 4100 by accumulating the plurality of data sets based on the output signal of the detecting unit 4300 may include a first section which measures the detecting parameters and a second section including the data generated by the reflective laser 4310.

In this case, the first accumulated data group 5150 may include at least some of the accumulated data in the first section, and the second accumulated data group 5160 may include at least some of the accumulated data in the second section.

Accordingly, data for determining the detecting parameter should be generated before the laser emitting unit 4200 emits the laser. Accordingly, the processor 4100 may control the laser emitting unit 4200 to emit the laser after at least a partial section from the start time of the detecting time window of the detector 5320.

The processor 4100 may determine the detecting parameter of the detecting unit 4300 through the data of the first accumulated data group 5150. Alternatively, the processor 4100 may adjust a preset detecting parameter of the detecting unit 4300 through the data of the first accumulated data group 5150.

According to one embodiment, the processor 4100 may calculate a representative value of the accumulated data of the first accumulated data group 5150. The processor 4100 may determine the detecting parameter by comparing the representative value with a predetermined reference value. In this case, the representative value may be a value having the largest numerical value, an average value, a median value, or the like.

For example, when the representative value is greater than the reference value, the detecting environment may be an environment in which external noise is easily sensed by the detecting unit 4300. In this case, the processor 4100 may reduce the sensitivity of the detector 5320 included in the detecting unit 4300 or the gain of the detecting unit 4300.

Further, for example, when the average value is greater than or equal to the threshold value 5130, the detecting environment may be an environment in which it is difficult for the detector 5320 to sense the reflective laser 4310 due to external noise. In this case, the processor 4100 may increase the threshold value 5130 used to extract the data generated by the reflective laser 4310.

The processor 4100 may extract the detecting time point of the reflective laser 4310 through the data of the second accumulated data group 5160. Specifically, the processor 4100 may extract the detecting time point of the reflective laser 4310 based on the detecting parameter acquired through the data of the first accumulated data group 5150 and the data of the second accumulated data group 5160.

According to one embodiment, the processor 4100 may extract the detecting time point of the reflective laser 4310 through data having a numerical value greater than or equal to the threshold value 5130 among the data of the second accumulated data group 5160. In this case, the threshold value 5130 may be a value determined or adjusted through the data of the first accumulated data group 5150.

For example, in FIG. 49, the processor 4100 may extract the detecting time point of the reflective laser 4310 through the second accumulated data 5142 having a numerical value greater than or equal to the threshold value 5130 from among the data (e.g. counting value) of the second accumulated data group 5160.

The method in which the processor 4100 extracts the detecting time point of the reflective laser 4310 through the data having a numerical value greater than or equal to the threshold value 5130 among the data of the histogram may overlap the above-described description, and thus the detailed description will be omitted.

Figure 50:
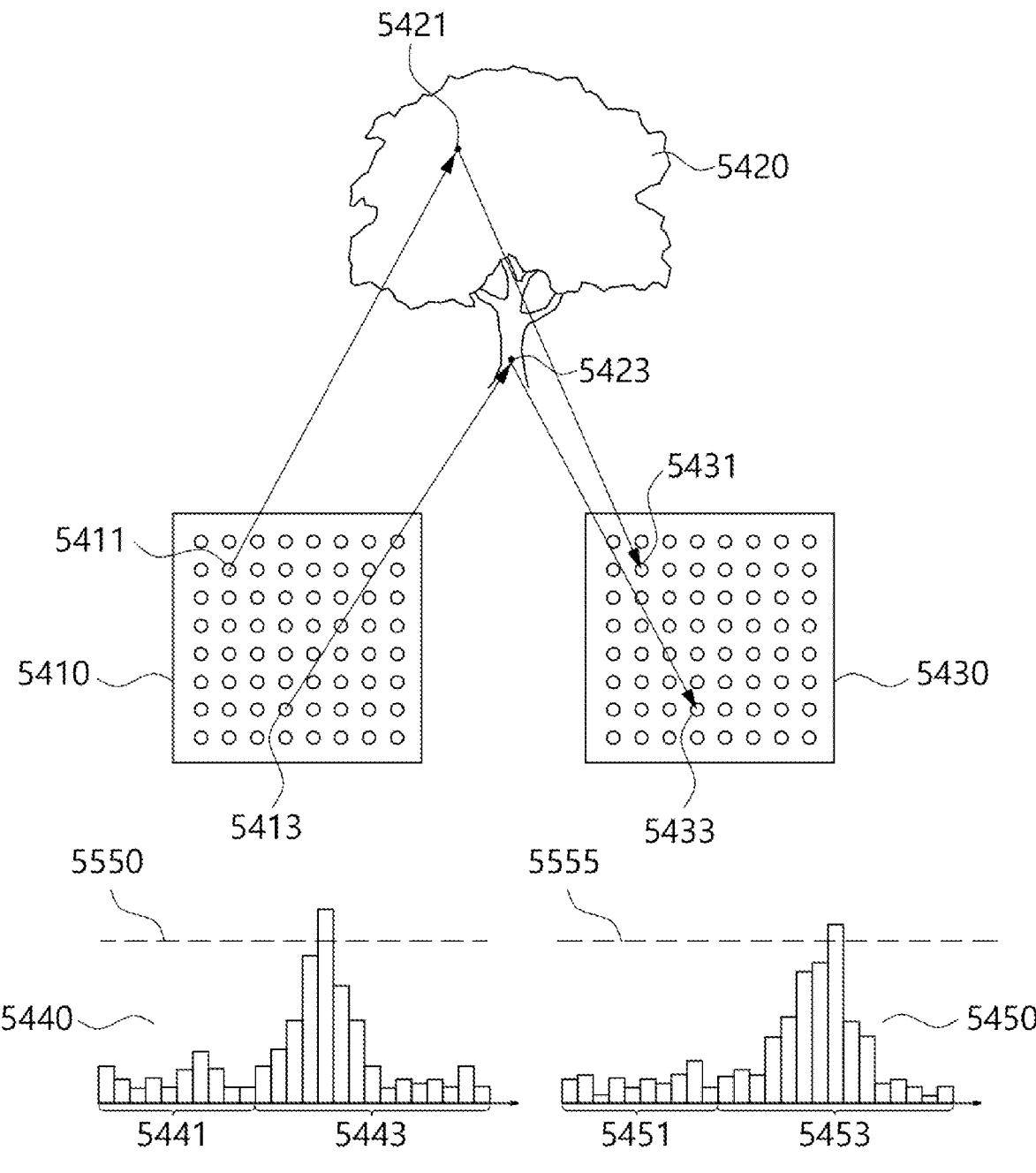
FIG. 50 is a view for describing an example of forming a histogram for each region of an object.

FIG. 50 is a view for describing an example of forming a histogram for each region of an object.

Referring to FIG. 50, the LiDAR device 4000 may irradiate a laser to an object 5420 through a laser emitting unit 5410, and sense reflective laser reflected from the object 5420 through a detecting unit 5430. In this case, the processor 4100 of the LiDAR device 4000 may generate a plurality of histograms 5440 and 5450 based on an output signal of the detecting unit 5430 which senses the laser.

The laser emitting unit 5410 may include a plurality of emitters. For example, the laser emitting unit 5410 may include a first emitter 5411 and a second emitter 5413.

In this case, the emitter may be a laser diode (LD), a solid-state laser, a high-power laser, a light entitling diode (LED), a vertical cavity surface emitting laser (VCSEL), and an external cavity diode laser (ECDL), or the like, but the present disclosure is not limited thereto.

The detecting unit 5430 may include a plurality of detectors. For example, the detecting unit 5430 may include a first detector 5431 and a second detector 5433.

In this case, the detector may be a PN photodiode, a phototransistor, a PIN photodiode, an avalanche photodiode (APD), a single-photon avalanche diode (SPAD), a silicon photomultiplier (SiPM), a time to digital converter (TDC), a comparator, a complementary metal-oxide semiconductor (CMOS), a charge coupled device (CCD), or the like, but the present disclosure is not limited thereto.

According to one embodiment, the first emitter 5411 and the second emitter 5413 may simultaneously emit lasers, but are not limited thereto, and may not simultaneously emit the lasers. For example, after the first emitter 5411 emits a laser, the second emitter 5413 may emit a laser.

Alternatively, a laser emission period of the first emitter 5411 and a laser emission period of the second emitter 5413 may be the same, but are not limited thereto and may also be different. For example, the first emitter 5411 may emit a laser with a first period, and the second emitter 5413 may emit a laser with a second period greater than the first period.

According to one embodiment, sizes of detecting time windows of the first detector 5431 and the second detector 5433 may be the same, but are not limited thereto and may also be different. For example, the detecting time window of the first detector 5431 may be a first time interval, and the detecting time window of the second detector 5433 may be a second time interval greater than the first time interval.

According to one embodiment, the first emitter 5411 may irradiate a laser to a first region 5421 of the object 5420. In this case, the laser reflected from the first region 5421 may be sensed by the first detector 5431.

Further, the second emitter 5413 may irradiate a laser to a second region 5423 of the object 5420. In this case, the laser reflected from the second region 5423 may be sensed by the second detector 5433.

In this case, a position of the emitter in the laser emitting unit 5410 may correspond to a position of the detector in the detecting unit. For example, a position of the first emitter 5411 in the laser emitting unit 5410 may correspond to a position of the first detector 5431 in the detecting unit 5430. Also, for example, a position of the second emitter 5413 in the laser emitting unit 5410 may correspond to a position of the second detector 5433 in the detecting unit 5430.

As a specific example, the first emitter 5411 may be an emitter arranged at a position (2, 2) among a plurality of emitters of the laser emitting unit 5410 arranged in a matrix form, and the first detector 5431 may be a detector arranged at a position (2, 2) among a plurality of detectors of the detecting unit 5430 arranged in a matrix form.

Further, As a specific example, the second emitter 5413 may be an emitter arranged at a position (7, 4) among the plurality of emitters of the laser emitting unit 5410 arranged in a matrix form, and the second detector 5433 may be a detector arranged at a position (7, 4) among the plurality of detectors of the detecting unit 5430 arranged in a matrix form.

However, a case in which the positions of the emitter and the detector correspond to each other is not limited to the above embodiment in which position values of the emitter and the detector are the same, and may be all cases in which the detector which senses the laser emitted from the emitter may also be specified as the emitter of the laser emitting unit 5410 is specified.

The processor 4100 may generate a histogram based on the output signal of the detecting unit 5430 which senses a photon. Specifically, the processor 4100 may generate a histogram by accumulating a plurality of data sets based on the output signal of the detecting unit 5430 which senses a photon.

In this case, the processor 4100 may generate a histogram for each region of the object. Specifically, the processor 4100 may irradiate a laser to each region of the object through the laser emitting unit 5410. The laser reflected from each region may be sensed by the detecting unit 5430, and the detecting unit 5430 may generate an output signal according to a result of detecting the photon for each region.

In this case, the processor 4100 may generate a histogram for each region based on the output signal. For example, the processor 4100 may generate a first histogram 5440 based on an output signal of the first detector 5431 which senses the laser reflected from the first region 5421 among the lasers emitted from the first emitter 5411.

Further, for example, the processor 4100 may generate a second histogram 5450 based on an output signal of the second detector 5433 which senses the laser reflected from the second region 5423 among the lasers emitted from the second emitter 5413.

The processor 4100 may determine a detecting parameter corresponding to a detecting environment of each region for each region of the object. Accordingly, the detecting parameter may be different for each region.

According to one embodiment, the processor 4100 may determine a first detecting parameter based on the first histogram 5440 generated for the first region 5421, and may determine a second detecting parameter based on the second histogram 5450 generated for the second region 5423.

For example, the first region 5421 may be a region having a lot of sunlight noise, and the second region 5423 may be a region having less sunlight noise than the first region 5421. In this case, when threshold values of the first region 5421 and the second region 5423 are the same, in accuracy of detecting time point extraction of the reflective laser reflected from each region, accuracy in the first region 5421 may be lower than accuracy in the second region 5423.

Accordingly, the processor 4100 needs to differently determine a detecting parameter such as a threshold value or the like for each region of the object.

The processor 4100 may determine the first detecting parameter based on data of a first accumulated data group 5441 of the first histogram 5440. In this case, the processor 4100 may determine a characteristic of the first region 5421 based on the first detecting parameter and data of a second accumulated data group 5443 of the first histogram 5440.

For example, the processor 4100 may determine a distance, position coordinates, reflectance, material information, a speed, a direction of movement, and the like of the first region 5421 based on the first detecting parameter and the data of the second accumulated data group 5443 of the first histogram 5440.

The processor 4100 may determine the second detecting parameter based on data of a first accumulated data group 5451 of the second histogram 5450. In this case, the processor 4100 may determine a characteristic of the second region 5423 based on the second detecting parameter and data of a second accumulated data group 5453 of the first histogram 5440.

For example, the processor 4100 may determine a distance, position coordinates, reflectance, material information, a speed, a direction of movement, and the like of the second region 5423 based on the second detecting parameter and the data of the second accumulated data group 5453 of the second histogram 5450.

The processor 4100 may determine a detecting parameter for each region. Accordingly, the processor 4100 may determine a characteristic of each region according to a detecting environment of each region, and thus it is possible to improve the accuracy of the determined characteristic.

Figure 51:
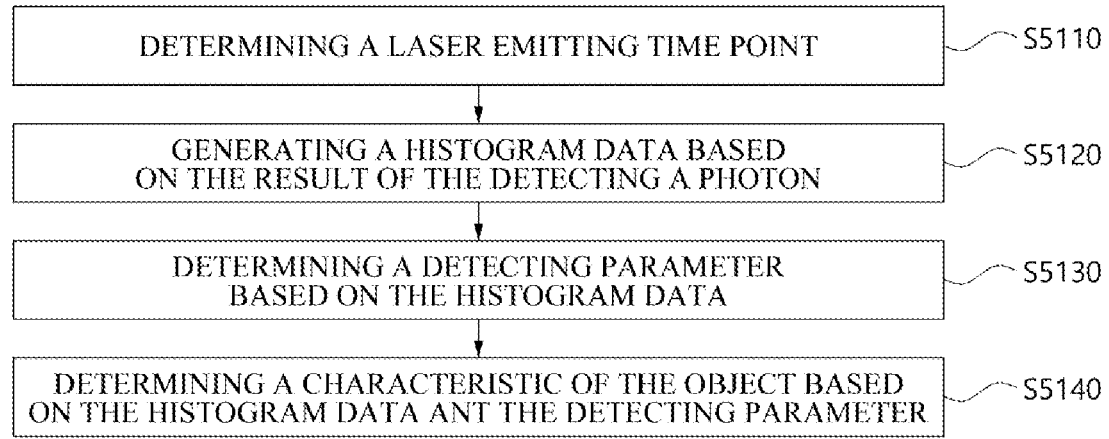
FIG. 51 is a view for describing a method of controlling a LiDAR device according to another embodiment.

FIG. 51 is a view for describing a method of controlling a LiDAR device according to another embodiment.

Referring to FIG. 51, the method of controlling the LiDAR device according to another embodiment may include an operation of emitting a laser (S5110), an operation of generating a histogram based on a photon detecting result (S5120), an operation of determining a detecting parameter based on data of the histogram (S5130), and an operation of determining a characteristic of an object based on the data of the histogram and the detecting parameter (S5140).

According to one embodiment, the operation of emitting the laser (S5110) may include an operation of emitting the first laser at the first time point t1, emitting the second laser at the second time point t2, and emitting the third laser at the third time point t3 in FIG. 47. The detailed description may overlap the description in FIG. 47, and thus will be omitted. In this case, the first laser, the second laser, and the third laser may be irradiated to the same region or irradiated in the same direction.

According to one embodiment, the operation of generating the histogram based on the photon detecting result (S5120) may include an operation of generating the histogram 5140 by accumulating the first data set 5111, the second data set 5112, the third data set 5113, the fourth data set 5114, the fifth data set 5115 to the Kth data set 5116. The detailed description may overlap the description in FIG. 48, and thus will be omitted.

The operation of determining the detecting parameter based on the data of the histogram according to one embodiment (S5130) may include an operation of adjusting, calculating, or determining the detecting parameter based on the first accumulated data group 5150 of the histogram 5140 in FIG. 49. The detailed description may overlap the description in FIG. 49, and thus will be omitted.

The operation of determining the characteristic of the object based on the data of the histogram and the detecting parameter according to one embodiment (S5140) may include an operation of determining the characteristic of the object based on the second accumulated data group 5160 of the histogram 5140 and the detecting parameter in FIG. 49. The detailed description may overlap the description in FIG. 49, and thus will be omitted.

Figure 52:
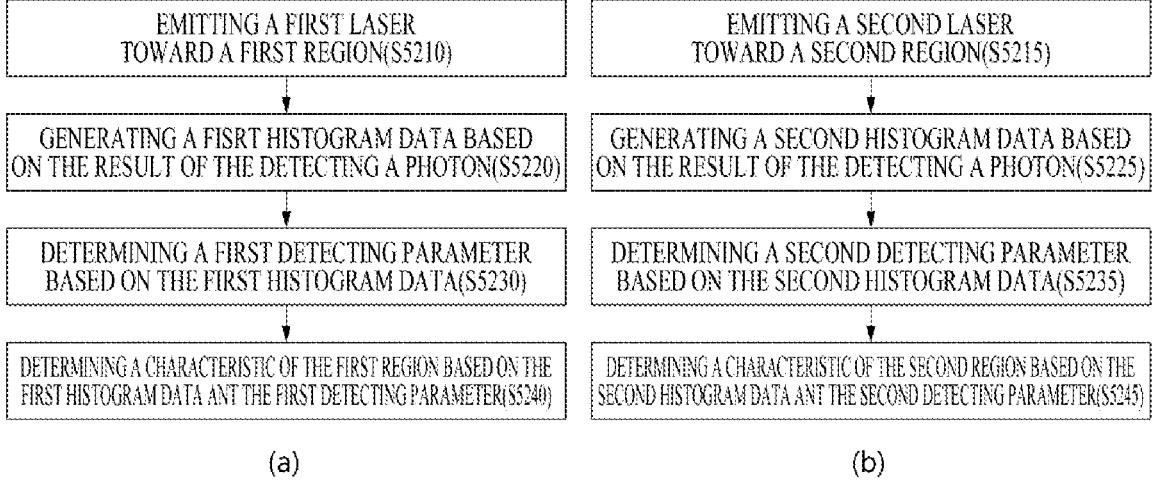
FIG. 52 is a view for describing a method of controlling a LiDAR device according to still another embodiment.

FIG. 52 is a view for describing a method of controlling a LiDAR device according to still another embodiment.

Referring to FIG. 52A, the method of controlling the LiDAR device according to still another embodiment may include an operation of emitting a first laser to a first region (S5210), an operation of generating a first histogram based on a photon detecting result (S5220), an operation of determining a first detecting parameter based on data of the first histogram (S5230), and an operation of determining a characteristic of the first region based on the data of the first histogram and the first detecting parameter (S5240).

Referring to FIG. 52B, the method of controlling the LiDAR device according to still another embodiment may include an operation of emitting a second laser to a second region (S5215), an operation of generating a second histogram based on a photon detecting result (S5225), an operation of determining a second detecting parameter based on data of the second histogram (S5235), and an operation of determining a characteristic of the second region based on the data of the second histogram and the second detecting parameter (S5245).

FIG. 52A shows a method of controlling the LiDAR device for determining the characteristic of the first region, and FIG. 52B shows a method of controlling the LiDAR device for determining the characteristic of the second region.

The method of FIG. 52A and the method of FIG. 52B may be simultaneously performed, but the present disclosure is not limited thereto, and may not be simultaneously performed. For example, the LiDAR device may simultaneously determine characteristics for the first region and the second region. Further, for example, the LiDAR device may determine the characteristic of the second region after determining the characteristic of the first region.

Alternatively, for example, the LiDAR device may determine the characteristics of the first region and the second region after determining the detecting parameter of the first region and the detecting parameter of the second region.

Since the descriptions for FIG. 52A and FIG. 52B may overlap the above description and the description for FIG. 51, the detailed descriptions will be omitted.

The method according to the embodiment may be implemented in the form of program instructions that can be executed through various computer means and recorded in a computer-readable medium. The computer-readable medium may include program instructions, data files, data structures, etc. alone or in combination. The program instructions recorded in the medium may be specially designed and configured for embodiments, or may be known and usable to those skilled in computer software. Examples of computer-readable recording media include hardware devices specially configured to store and execute program instructions, for example, magnetic media such as hard disks, floppy disks and magnetic tapes, optical media such as CD-ROM and DVD, magneto-optical media such as a floptical disk, and ROM, RAM, flash memory, etc. Examples of the program instructions include not only machine language codes such as those produced by a compiler, but also high-level language codes that can be executed by a computer using an interpreter or the like. The above-described hardware device may be configured to operate as one or more software modules to perform the operation of an embodiment, and vice versa.

According to one embodiment of the present disclosure, a LiDAR device capable of measuring a distance by controlling a laser emission timing of a laser emitting unit and minimizing interference due to disturbances can be provided.

According to one embodiment of the present disclosure, a LiDAR device which increases the accuracy of distance measurement of each region by varying a detecting parameter according to an environment for each region can be provided.

Effects of the present disclosure are not limited to the above-mentioned effects, and other effects which are not mentioned may be apparently understood by those skilled in the art from the specification and the accompanying drawings.

Although the present disclosure has been described with reference to specific embodiments and drawings, it will be appreciated that various modifications and changes can be made from the disclosure by those skilled in the art. For example, appropriate results may be achieved although the described techniques are performed in an order different from that described above and/or although the described components such as a system, a structure, a device, or a circuit are combined in a manner different from that described above and/or replaced or supplemented by other components or their equivalents.

Therefore, other implementations, embodiments, and equivalents are within the scope of the following claims.

What is claimed is:

1. A light detection and ranging (LiDAR) device for determining distance information of an object, the LiDAR device comprising:

a laser emitting unit configured to emit a laser to the object aperiodically at a controlled emitting time;

a detecting unit configured to detect a reflected laser which is reflected by the object aperiodically during at a controlled detecting window and generate detecting signals; and a processor configured to:

control the laser emitting unit to emit at least a first laser at a first emitting time, a second laser at a second emitting time and a third laser at a third emitting time such that:

a first time gap between the first emitting time and the second emitting time is different from a second time gap between the second emitting time and the third emitting time, and control the detecting unit to:

detect a first set of photons during a first detecting time window and generate a first set of signals having a start time synchronized with a first reference time point, detect a second set of photons during a second detecting time window and generate a second set of signals having a start time synchronized with a second reference time point, and detect a third set of photons during a third detecting time window and generate a third set of signals having a start time synchronized with a third reference time point,

wherein a third time gap between the first reference time point and the second reference time point is different from, and precedes, a fourth time gap between the second reference point and the third reference point, the processor further configured to control the detecting unit to cause that:

a start time of the first detecting time window is synchronized with the first emitting time such that a time gap between the start time of the first detecting time window and the first emitting time, having a predetermined value, has an end point synchronized with the first reference time point, the first detecting time window ends before the second emitting time, a start time of the second detecting time window is synchronized with the second emitting time such that a time gap between the start time of the second detecting time window and the second emitting time, having the predetermined value, has an end point synchronized with the second reference time point, the second detecting time window ends before the third emitting time, and a start time of the third detecting time window is synchronized with the third emitting time such that a time gap between the start time of the third detecting time window and the third emitting time, having the predetermined value, has an end point synchronized with the third reference time point, the processor further configured to determine the distance information of the object based on at least the first set of signals, the second set of signals and the third set of signals.

2. The LiDAR device of claim 1, wherein the processor is configured to:

control the laser emitting unit to emit the first laser, the second laser, and the third laser consecutively.

3. The LiDAR device of claim 1, wherein the processor is configured to:

control the laser emitting unit not to emit a laser during a period between the first emitting time and the second emitting time, and not to emit a laser during a period between the second emitting time and the third emitting time.

4. The LiDAR device of claim 1, wherein the start time of the first detecting time window is apart from the first emitting time by the predetermined value, wherein the start time of the second detecting time window is apart from the second emitting time by the predetermined value, and wherein the start time of the third detecting time window is apart from the third emitting time by the predetermined value.

5. The LiDAR device of claim 1, wherein the predetermined value is 0, such that:

the start time of the first detecting time window is the same as the first emitting time, the start time of the second detecting time window is the same as the second emitting time, and the start time of the third detecting time window is the same as the third emitting time.

6. The LiDAR device of claim 1, wherein the processor is configured to:

transmit trigger signals to the laser emitting unit to operate the laser emitting unit.

7. The LiDAR device of claim 6, wherein the processor is configured to:

74 generate the trigger signals at equal time intervals, and provide a jitter to each of the trigger signals to delay a time in which each of the trigger signals is received by the laser emitting unit.

8. The LiDAR device of claim 1, wherein the processor is further configured to:

generate a histogram based on at least the first set of signals, the second set of signals and the third set of signals, and determine the distance information of the object based on the histogram.

9. The LiDAR device of claim 1, wherein the laser emitting unit includes a vertical-cavity-surface-emitting laser (VCSEL), and wherein the detecting unit includes a single-photon avalanche diode (SPAD).

10. A light detection and ranging (LiDAR) device for determining distance information of an object, the LiDAR device comprising a laser emitting unit configured to emit a laser to the object aperiodically at a controlled emitting time;

a detecting unit configured to detect a reflected laser which is reflected by the object during at a controlled detecting window and generate detecting signals; and a processor configured to:

(i) during a first cycle, control the laser emitting unit to emit at least a first laser at a first emitting time, and control the detecting unit to detect a first set of photons during a first detecting time window and generate a first set of signals, wherein a start time of the first detecting time window is synchronized with the first emitting time such that a time gap between the start time of the first detecting time window and the first emitting time, having a predetermined value, precedes the first detecting time window;

(ii) during a second cycle immediately following the first cycle, control the laser emitting unit to emit at least a second laser at a second emitting time, and control the detecting unit to detect a second set of photons during a second detecting time window and generate a second set of signals, wherein a start time of the second detecting time window is synchronized with the second emitting time such that a time gap between the start time of the second detecting time window and the second emitting time, having the predetermined value, precedes the second detecting time window, wherein the second emitting time starts after the first detecting time window ends;

(iii) during a third cycle immediately following the second cycle, control the laser emitting unit to emit at least a third laser at a third emitting time, and control the detecting unit to detect a third set of photons during a third detecting time window and generate a third set of signals, wherein a start time of the third detecting time window is synchronized with the third emitting time such that a time gap between the start time of the third detecting time window and the third emitting time, having the predetermined value, precedes the third detecting time window, wherein the third emitting time starts after the second detecting time window ends, and wherein a first time gap between the first emitting time and the second emitting time is different from a second time gap between the second emitting time and the third emitting time; and determine the distance information of the object based on histogram accumulated by at least the first set of signals, the second set of signals and the third set of signals which were obtained respectively from a plurality of cycles comprising at least the first, second and third cycles.

11. The LiDAR device of claim 10, wherein the processor is configured to:

control the laser emitting unit to emit the first laser, the second laser, and the third laser consecutively.

12. The LiDAR device of claim 10, wherein the processor is configured to:

control the laser emitting unit not to emit a laser during a period between the first emitting time and the second emitting time, and not to emit a laser during a period between the second emitting time and the third emitting time.

13. The LiDAR device of claim 10, wherein the start time of the first detecting time window is apart from the first emitting time by the predetermined value, wherein the start time of the second detecting time window is apart from the second emitting time by the predetermined value, and wherein the start time of the third detecting time window is apart from the third emitting time by the predetermined value.

14. The LiDAR device of claim 10, wherein the predetermined value is 0, such that:

the start time of the first detecting time window is the same as the first emitting time, the start time of the second detecting time window is the same as the second emitting time, and the start time of the third detecting time window is the same as the third emitting time.

15. The LiDAR device of claim 10, wherein the processor is configured to:

transmit trigger signals to the laser emitting unit to operate the laser emitting unit.

16. The LiDAR device of claim 10, wherein the processor is configured to:

generate the trigger signals at equal time intervals, and provide a jitter to each of the trigger signals to delay a time in which each of the trigger signals is received by the laser emitting unit.

17. The LiDAR device of claim 10, wherein the processor is further configured to:

generate a histogram based on at least the first set of signals, the second set of signals and the third set of signals, and determine the distance information of the object based on the histogram.

18. The LiDAR device of claim 10, wherein the laser emitting unit includes a vertical-cavity-surface-emitting laser (VCSEL), and wherein the detecting unit includes a single-photon avalanche diode (SPAD).

* * * * *